US012500823B2

(12) United States Patent
Crabtree et al.

(10) Patent No.: US 12,500,823 B2
(45) Date of Patent: Dec. 16, 2025

(54) SYSTEM AND METHOD FOR ENTERPRISE-WIDE DATA UTILIZATION TRACKING AND RISK REPORTING

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/359,895

(22) Filed: Jul. 27, 2023

(65) Prior Publication Data
US 2025/0039067 A1  Jan. 30, 2025

Related U.S. Application Data

(63) Continuation-in-part of application No. 18/359,883, filed on Jul. 27, 2023.

(51) Int. Cl.
H04L 43/028 (2022.01)
G06F 21/62 (2013.01)
(Continued)

(52) U.S. Cl.
CPC ........ *H04L 43/028* (2013.01); *G06F 21/6218* (2013.01); *H04L 43/04* (2013.01); *H04L 63/1416* (2013.01); *H04L 67/535* (2022.05)

(58) Field of Classification Search
CPC ..... H04L 43/028; H04L 43/04; H04L 67/535; H04L 63/1416; G06F 21/6218
See application file for complete search history.

(56) References Cited

U.S. PATENT DOCUMENTS 5,669,000 A   9/1997 Jessen et al.
6,256,544 B1  7/2001 Weissinger
(Continued)

FOREIGN PATENT DOCUMENTS

CN   105302532 B    6/2018
WO   2014159150 A1  10/2014
WO   2017075543 A1   5/2017

OTHER PUBLICATIONS

Hutton et al. "Crowdsourcing Evaluations of Classifying Interpretability".

*Primary Examiner* — Rachel J Hackenberg
(74) *Attorney, Agent, or Firm* — Galvin Patent Law LLC; Brian R Galvin

(57) ABSTRACT

A system and method for comprehensive data utilization and tracking comprising an ontological engine which in some embodiments is configured to create and curate various industry-specific ontologies which can be used to provide deeper context to an enterprise's network traffic and data transmission. The system and method further comprise a tagging and tracking engine configured to inspect network packets, apply a first tag associated with an authentication object, apply a second tag associated with an identified ontology, and track the tagged packets as they traverse the enterprise network, generating data utilization tracking information as the packets move through the network. A scoring engine may leverage the data utilization tracking information in combination with user entity and behavior data to compute a risk score associated with data utilization on the enterprise network.

8 Claims, 40 Drawing Sheets

(51) Int. Cl.
*H04L 9/40* (2022.01)
*H04L 43/04* (2022.01)
*H04L 67/50* (2022.01)

(56) References Cited

U.S. PATENT DOCUMENTS

| | | | |
|---|---|---|---|
| 6,477,572 | B1 | 11/2002 | Elderton et al. |
| 6,857,073 | B2 | 2/2005 | French et al. |
| 7,072,863 | B1 | 7/2006 | Phillips et al. |
| 7,171,515 | B2 | 1/2007 | Ohta et al. |
| 7,657,406 | B2 | 2/2010 | Tolone et al. |
| 7,698,213 | B2 | 4/2010 | Lancaster |
| 7,739,653 | B2 | 6/2010 | Venolia |
| 8,006,303 | B1 | 8/2011 | Dennerline et al. |
| 8,065,257 | B2 | 11/2011 | Kuecuekyan |
| 8,132,260 | B1 | 3/2012 | Mayer et al. |
| 8,145,761 | B2 | 3/2012 | Liu et al. |
| 8,166,185 | B2 | 4/2012 | Samuel et al. |
| 8,281,121 | B2 | 10/2012 | Nath et al. |
| 8,516,594 | B2 | 8/2013 | Bennett et al. |
| 8,516,596 | B2 | 8/2013 | Sandoval et al. |
| 8,583,639 | B2 | 11/2013 | Chitnis et al. |
| 8,595,240 | B1 | 11/2013 | Otey et al. |
| 8,615,800 | B2 | 12/2013 | Baddour et al. |
| 8,677,473 | B2 | 3/2014 | Dennerline et al. |
| 8,725,597 | B2 | 5/2014 | Mauseth et al. |
| 8,726,393 | B2 | 5/2014 | Macy et al. |
| 8,788,306 | B2 | 7/2014 | Delurgio et al. |
| 8,793,758 | B2 | 7/2014 | Raleigh et al. |
| 8,914,878 | B2 | 12/2014 | Burns et al. |
| 8,949,960 | B2 | 2/2015 | Berkman et al. |
| 8,997,233 | B2 | 3/2015 | Green et al. |
| 9,134,966 | B2 | 9/2015 | Brock et al. |
| 9,141,360 | B1 | 9/2015 | Chen et al. |
| 9,210,185 | B1 | 12/2015 | Wood et al. |
| 9,231,962 | B1 * | 1/2016 | Yen .................... H04L 63/1425 |
| 9,306,965 | B1 * | 4/2016 | Grossman ........... H04L 63/1425 |
| 9,319,430 | B2 | 4/2016 | Bell, Jr. et al. |
| 9,558,220 | B2 | 1/2017 | Nixon et al. |
| 9,571,510 | B1 | 2/2017 | Shen et al. |
| 9,602,530 | B2 | 3/2017 | Ellis et al. |
| 9,654,495 | B2 | 5/2017 | Hubbard et al. |
| 9,672,355 | B2 | 6/2017 | Titonis et al. |
| 9,686,308 | B1 | 6/2017 | Srivastava |
| 9,712,553 | B2 | 7/2017 | Nguyen et al. |
| 9,762,443 | B2 | 9/2017 | Dickey |
| 9,774,616 | B2 | 9/2017 | Flores et al. |
| 9,887,933 | B2 | 2/2018 | Lawrence, III |
| 9,946,517 | B2 | 4/2018 | Talby et al. |
| 10,061,635 | B2 | 8/2018 | Ellwein |
| 10,102,480 | B2 | 10/2018 | Dirac et al. |
| 10,176,217 | B1 | 1/2019 | Dang et al. |
| 10,185,832 | B2 | 1/2019 | Cam |
| 10,210,246 | B2 | 2/2019 | Stojanovic et al. |
| 10,210,255 | B2 | 2/2019 | Crabtree et al. |
| 10,210,470 | B2 | 2/2019 | Ray |
| 10,212,184 | B2 | 2/2019 | Sweeney et al. |
| 10,242,406 | B2 | 3/2019 | Kumar et al. |
| 10,248,910 | B2 | 4/2019 | Crabtree et al. |
| 10,318,882 | B2 | 6/2019 | Brueckner et al. |
| 10,320,828 | B1 | 6/2019 | Derbeko et al. |
| 10,367,829 | B2 | 7/2019 | Huang et al. |
| 10,462,112 | B1 | 10/2019 | Makmel et al. |
| 10,511,498 | B1 | 12/2019 | Narayan et al. |
| 10,754,820 | B2 | 8/2020 | Khanna et al. |
| 11,005,824 | B2 | 5/2021 | Crabtree et al. |
| 11,012,441 | B2 | 5/2021 | Totale et al. |
| 11,916,947 | B2 * | 2/2024 | Kapoor ............... G06F 16/9024 |
| 2003/0041254 | A1 | 2/2003 | Challener et al. |
| 2003/0145225 | A1 | 7/2003 | Bruton et al. |
| 2004/0010491 | A1 | 1/2004 | Riedinger |
| 2005/0000165 | A1 | 1/2005 | Dischinat et al. |
| 2005/0094190 | A1 | 5/2005 | Condon et al. |
| 2005/0289072 | A1 | 12/2005 | Sabharwal |
| 2006/0149575 | A1 | 7/2006 | Varadarajan et al. |
| 2007/0012161 | A1 | 1/2007 | Lyles |
| 2007/0021955 | A1 | 1/2007 | Tolone et al. |
| 2007/0036314 | A1 | 2/2007 | Kloberdans et al. |
| 2007/0150744 | A1 | 6/2007 | Cheng et al. |
| 2007/0226796 | A1 | 9/2007 | Gilbert et al. |
| 2008/0027690 | A1 | 1/2008 | Watts |
| 2008/0172353 | A1 | 7/2008 | Lim et al. |
| 2008/0221949 | A1 | 9/2008 | Delurgio et al. |
| 2008/0270203 | A1 | 10/2008 | Holmes et al. |
| 2009/0064088 | A1 | 3/2009 | Barcia et al. |
| 2009/0089227 | A1 | 4/2009 | Sturrock et al. |
| 2009/0182672 | A1 | 7/2009 | Doyle |
| 2009/0199002 | A1 | 8/2009 | Erickson |
| 2009/0222562 | A1 | 9/2009 | Liu et al. |
| 2009/0293128 | A1 | 11/2009 | Lippmann et al. |
| 2010/0042846 | A1 | 2/2010 | Trotter et al. |
| 2010/0125900 | A1 | 5/2010 | Dennerline et al. |
| 2010/0180337 | A1 | 7/2010 | Bajekal |
| 2010/0205588 | A1 | 8/2010 | Yu et al. |
| 2010/0228693 | A1 | 9/2010 | Dawson et al. |
| 2011/0060821 | A1 | 3/2011 | Loizeaux et al. |
| 2011/0087888 | A1 | 4/2011 | Rennie |
| 2011/0154341 | A1 | 6/2011 | Pueyo et al. |
| 2011/0185432 | A1 | 7/2011 | Sandoval et al. |
| 2011/0208681 | A1 | 8/2011 | Kuecuekyan |
| 2011/0302640 | A1 | 12/2011 | Liu et al. |
| 2012/0116743 | A1 | 5/2012 | Ayala et al. |
| 2012/0137367 | A1 | 5/2012 | Dupont et al. |
| 2012/0266244 | A1 | 10/2012 | Green et al. |
| 2012/0303396 | A1 | 11/2012 | Winkler et al. |
| 2013/0041921 | A1 | 2/2013 | Cooper et al. |
| 2013/0055404 | A1 | 2/2013 | Khalili |
| 2013/0073062 | A1 | 3/2013 | Smith et al. |
| 2013/0097706 | A1 | 4/2013 | Titonis et al. |
| 2013/0111592 | A1 | 5/2013 | Zhu et al. |
| 2013/0117852 | A1 | 5/2013 | Stute |
| 2013/0132149 | A1 | 5/2013 | Wei et al. |
| 2013/0191416 | A1 | 7/2013 | Lee et al. |
| 2013/0246996 | A1 | 9/2013 | Duggal et al. |
| 2013/0304623 | A1 | 11/2013 | Kumar et al. |
| 2013/0346354 | A1 | 12/2013 | Mizell et al. |
| 2013/0347116 | A1 | 12/2013 | Flores et al. |
| 2014/0074826 | A1 | 3/2014 | Cooper et al. |
| 2014/0156806 | A1 | 6/2014 | Karpistsenko et al. |
| 2014/0244612 | A1 | 8/2014 | Bhasin et al. |
| 2014/0279762 | A1 | 9/2014 | Xaypanya et al. |
| 2014/0359552 | A1 | 12/2014 | Misra et al. |
| 2015/0020199 | A1 | 1/2015 | Neil et al. |
| 2015/0095303 | A1 | 4/2015 | Sonmez et al. |
| 2015/0106941 | A1 | 4/2015 | Muller et al. |
| 2015/0149979 | A1 | 5/2015 | Talby et al. |
| 2015/0163242 | A1 | 6/2015 | Laidlaw et al. |
| 2015/0169294 | A1 | 6/2015 | Brock et al. |
| 2015/0186427 | A1 | 7/2015 | Logothetis et al. |
| 2015/0195192 | A1 | 7/2015 | Vasseur et al. |
| 2015/0236935 | A1 | 8/2015 | Bassett |
| 2015/0281225 | A1 | 10/2015 | Schoen et al. |
| 2015/0317481 | A1 | 11/2015 | Gardner et al. |
| 2015/0339263 | A1 | 11/2015 | Ata et al. |
| 2015/0347414 | A1 | 12/2015 | Xiao et al. |
| 2015/0365437 | A1 | 12/2015 | Bell, Jr. et al. |
| 2015/0379424 | A1 | 12/2015 | Dirac et al. |
| 2016/0004858 | A1 | 1/2016 | Chen et al. |
| 2016/0006629 | A1 | 1/2016 | Ianakiev et al. |
| 2016/0028758 | A1 | 1/2016 | Ellis et al. |
| 2016/0072845 | A1 | 3/2016 | Chiviendacz et al. |
| 2016/0078361 | A1 | 3/2016 | Brueckner et al. |
| 2016/0092557 | A1 | 3/2016 | Stojanovic et al. |
| 2016/0099960 | A1 | 4/2016 | Gerritz et al. |
| 2016/0105454 | A1 | 4/2016 | Li et al. |
| 2016/0140446 | A1 | 5/2016 | Adderly et al. |
| 2016/0140519 | A1 | 5/2016 | Trepca et al. |
| 2016/0164905 | A1 | 6/2016 | Wood et al. |
| 2016/0179945 | A1 | 6/2016 | Diaz et al. |
| 2016/0275123 | A1 | 9/2016 | Lin et al. |
| 2016/0285732 | A1 | 9/2016 | Brech et al. |
| 2016/0342606 | A1 | 11/2016 | Mouel et al. |
| 2016/0350442 | A1 | 12/2016 | Crosby |
| 2016/0364307 | A1 | 12/2016 | Garg et al. |

(56) References Cited

U.S. PATENT DOCUMENTS

| | | |
|---|---|---|
| 2017/0019678 A1 | 1/2017 | Kim et al. |
| 2017/0032130 A1 | 2/2017 | Durairaj et al. |
| 2017/0034205 A1 | 2/2017 | Canedo et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0279844 A1 | 9/2017 | Bower, III et al. |
| 2017/0299633 A1* | 10/2017 | Pietrowicz .......... H04L 63/0254 |
| 2017/0322959 A1 | 11/2017 | Tidwell et al. |
| 2017/0323089 A1 | 11/2017 | Duggal et al. |
| 2018/0115519 A1 | 4/2018 | Bonomi et al. |
| 2018/0197128 A1 | 7/2018 | Carstens et al. |
| 2018/0225382 A1* | 8/2018 | Crabtree ................ G06F 15/76 |
| 2018/0288087 A1 | 10/2018 | Hittel et al. |
| 2018/0300930 A1 | 10/2018 | Kennedy et al. |
| 2019/0036970 A1* | 1/2019 | Shih ...................... H04L 67/141 |
| 2019/0082305 A1 | 3/2019 | Proctor |
| 2019/0095533 A1 | 3/2019 | Levine et al. |
| 2020/0235935 A1 | 7/2020 | Cerna, Jr. |
| 2020/0252411 A1 | 8/2020 | Inforzato et al. |
| 2021/0217007 A1 | 7/2021 | Menon |
| 2021/0385214 A1 | 12/2021 | Jain et al. |
| 2022/0200971 A1 | 6/2022 | Vigneswaran |
| 2022/0345459 A1* | 10/2022 | Tseng .................. H04L 63/1441 |
| 2023/0195901 A1 | 6/2023 | Allen |
| 2023/0370334 A1* | 11/2023 | Mannengal ............. H04L 43/04 |
| 2023/0388332 A1* | 11/2023 | Cunningham ........ G06F 21/552 |

\* cited by examiner

Exemplary Matrix of Organization-Specific Penalty Functions

2211

2212

|        | without logging or viz | with WEL | with logging/ heuristics | without stateful validation | without stateful validation |
|--------|------------------------|----------|--------------------------|-----------------------------|-----------------------------|
| NTML    | -2                     | -1       |                          |                             |                             |
| Kerberos | -0.75                 |          | +1                       |                             | +1                          |
| SAML    | -0.75                  |          | +1                       | +1                          |                             |

SYSTEM AND METHOD FOR ENTERPRISE-WIDE DATA UTILIZATION TRACKING AND RISK REPORTING

CROSS-REFERENCE TO RELATED APPLICATIONS

Priority is claimed in the application data sheet to the following patents or patent applications, each of which is expressly incorporated herein by reference in its entirety:
Ser. No. 18/359,883

BACKGROUND OF THE INVENTION

Field of the Art

The disclosure relates to the field of computer systems, and more particularly to the field of cybersecurity and threat analytics for risk identification, prevention, detection, response, and recovery operations of computer networks.

Discussion of the State of the Art

NTLM, Kerberos and SAML/OAuth2 are authentication protocols that allow users to authenticate to a network or application. Authentication is the primary security control within any modern computing system. If these authentication protocols are compromised or abused, an attacker (either insider or external) could impersonate a legitimate user, gain access to sensitive data, or execute malicious actions undetected. User and entity behavior analytics (UEBA) systems rely on accuracy and reliability of authentication logs and events to detect abnormal behavior and suspicious activity since the attribution of behaviors and actions are ultimately dependent on the link to authentication stages of their interactions. If the authentication logs are inaccurate or manipulated, the UEBA system may learn based on compromised data, generate false positives, or miss actual threats (false negatives), leading to ineffective or inadequate detection and response actions.

Therefore, verifying the integrity and validity of NTLM, Kerberos and SAML/OAuth2 authentication objects is crucial to ensure that the data used by the UEBA system is reliable and accurate, and that the resulting analytics and insights are trustworthy and effective at detecting and responding to cybersecurity threats. Where possible, linking this to additional observability information from application performance monitoring and even distributed tracing can further aid in increasing the fidelity of analysis and improve any resulting decisions or actions taken by human, machine or human-machine processes.

Rigorous use of ontologies and data tagging can play a significant role in improving cybersecurity by enhancing the understanding, analysis, and management of security-related information. Ontologies and data tagging provide a structured and semantic foundation for cybersecurity analysis, information sharing, and automation that is vendor agnostic and supports both symbolic and analytic reasoning. When properly utilized, they enhance the understanding, interoperability, and analysis of operational and security-related data, contributing to more effective threat detection, incident response, and vulnerability management.

What is needed is a system and method for comprehensive data characterization and utilization tracking which leverages observability, security, administrative data along with data contracts to provide an ontologically useful understanding of data existence and ultimately utilization across an enterprise network and applications.

SUMMARY OF THE INVENTION

Accordingly, the inventor has conceived and reduced to practice, a system and method for comprehensive data characterization and utilization tracking comprising an ontological engine which in some embodiments is configured to create and curate various industry-specific ontologies which can be used to provide deeper context to an enterprise's network traffic and data transmission, utilization, and resulting operational risk and compliance considerations. The system and method further comprise a tagging and tracking engine configured to inspect network packets, apply a first tag associated with an authentication object, apply a second tag associated with an identified ontology, and track the tagged packets as they traverse the enterprise network, generating data utilization tracking information as the packets move through the network. A scoring engine may leverage the data utilization tracking information in combination with user entity and behavior data to compute a risk score associated with data presence, characteristics, and utilization on the enterprise network and applications.

According to a preferred embodiment, a system for comprehensive data utilization tracking is disclosed, comprising: a computing device comprising a memory, a processor, and a non-volatile data storage device; a tagging and tracking engine comprising a first plurality of programming instructions stored in the memory which, when operating on the processor, causes the computing device to: capture a network packet, the network packet comprising a payload; analyze the captured network packet to identify an ontology associated with the payload; add a first metadata tag to the network packet, the first metadata tag comprising an authentication object; add a second metadata tag to the network packet, the second metadata tag being associated with the identified ontology; obtain data utilization tracking information, the data utilization tracking information comprising tracking data associated with the tagged network packet as the tagged network packet traverses a network; and send the data utilization tracking information to a scoring engine; and the scoring engine comprising a second plurality of programming instructions stored in the memory which, when operating on the processor, causes the computing device to: receive the data utilization tracking information from the tagging and tracking engine; obtain user entity and behavior analysis (UEBA) data; and use the data utilization tracking information and the UEBA data as inputs to determine a data utilization risk score According to another preferred embodiment, a method for comprehensive data utilization tracking is disclosed, comprising the steps of: capturing a network packet, the network packet comprising a payload; analyzing the captured network packet to identify an ontology associated with the payload; adding a first metadata tag to the network packet, the first metadata tag comprising an authentication object; adding a second metadata tag to the network packet, the second metadata tag being associated with the identified ontology; obtaining data utilization tracking information, the data utilization tracking information comprising tracking data associated with the tagged network packet as the tagged network packet traverses a network; sending the data utilization tracking information to a scoring engine; receiving the data utilization tracking information from a tagging and tracking engine; obtaining user entity and behavior analysis (UEBA) data; and using the data utilization tracking information and the UEBA data as inputs to determine a data utilization risk score According to an aspect of an embodiment, an authentication object database stored on the non-volatile data storage device, the authentication object database comprising a plurality of unique authentication objects, wherein each of the unique authentication objects is associated with a user; and wherein the authentication object is selected from the authentication object database.

According to an aspect of an embodiment, an ontology engine comprising a third plurality of programming instructions stored in the memory which, when operating on the processor, causes the computing device to: obtain a plurality of data contracts; analyze the plurality of data contracts to identify commonalities and differences in the way data is organized, wherein the commonalties comprise identified key concepts and relationships; create a common vocabulary by mapping and aligning terms used in the plurality of data contracts based on the identified key concepts and relationships; and store the common vocabulary as an ontology in a database.

According to an aspect of an embodiment, the ontology may be industry-specific.

According to an aspect of an embodiment, one or more ontologies stored in the database are used to identify the ontology associated with the payload of the network packet.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 22 shows an exemplary matrix of organization-specific penalty functions.

DETAILED DESCRIPTION OF THE INVENTION

Figure 1:
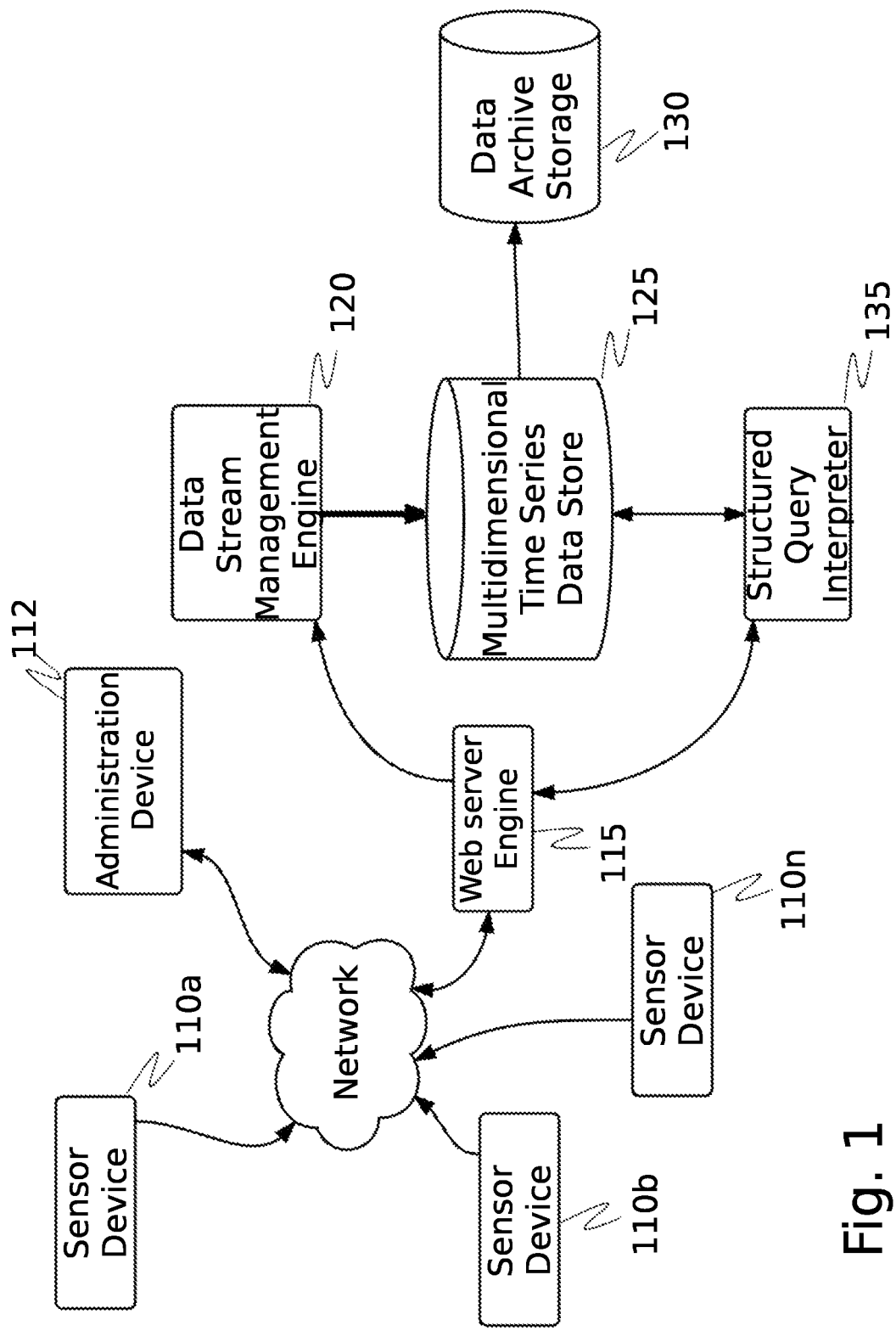
FIG. 1 is a diagram of an exemplary architecture of a system for the capture and storage of time series data from sensors with heterogeneous reporting profiles according to a preferred aspect of the invention.

The inventor has conceived, and reduced to practice, a system and method for comprehensive data utilization and tracking comprising an ontological engine which in some embodiments is configured to create and curate various industry-specific ontologies which can be used to provide deeper context to an enterprise's network traffic and data transmission. The system and method further comprise a tagging and tracking engine configured to inspect network packets, apply a first tag associated with an authentication object, apply a second tag associated with an identified ontology, and track the tagged packets as they traverse the enterprise network, generating data utilization tracking information as the packets move through the network. A scoring engine may leverage the data utilization tracking information in combination with user entity and behavior data to compute a risk score associated with data utilization on the enterprise network.

The ability to comprehensively track data utilization refers to the capability of monitoring and recording how data is accessed, processed, and utilized within a system (e.g., enterprise network) or organization. It involves tracking the lifecycle of data, including its creation, modification, storage, sharing, and deletion, as well as capturing information about who accesses the data, when, and for what purpose. Comprehensive data utilization tracking offers several benefits.

Audit and Compliance: by tracking data utilization, organizations can demonstrate compliance with regulatory requirements and industry standards. It allows for auditing data usage practices, ensuring adherence to privacy regulations, data protection laws, and security policies.

Data Governance: tracking data utilization helps establish effective data governance practices. It enables organizations to understand and manage data assets, including their quality, accessibility, and usage patterns. Data governance frameworks can be developed based on insights gained from comprehensive data utilization tracking.

Security Monitoring: monitoring data utilization aids in detecting and mitigating security threats. It allows organizations to identify unauthorized access, unusual data usage patterns, or suspicious activities that may indicate a potential data breach or cyberattack.

Resource Optimization: understanding how data is utilized can help organizations optimize their resources. By tracking data usage, organizations can identify data that is underutilized or no longer needed, leading to efficient storage management, cost savings, and improved data lifecycle management.

Performance Analysis: data utilization tracking provides insights into how data flows and is processed within systems. It helps identify performance bottlenecks, optimize data processing workflows, and improve overall system performance.

A data contract is a formal agreement or specification that defines the structure, format, and rules for exchanging data between two parties. It establishes a set of rules and guidelines that govern the interaction and communication of data between systems, applications, or components. In software development, data contracts are commonly used in the context of web services, where different systems or applications need to communicate with each other over a network. The data contract specifies the data elements, their types, and any constraints or rules that should be followed when sending or receiving data. Data contracts often leverage standardized formats such as Extensible Markup Language (XML) or JavaScript Object Notation (JSON) to define the structure of the data being exchanged. These formats allow for easy serialization and deserialization of data across different programming languages and platforms. By defining a data contract, parties involved in the data exchange can ensure that the data is understood and processed correctly. It helps to establish a common understanding of the data elements, their meanings, and the expected behavior when interacting with the data.

Tracking and tracing data, users, services, or attackers through a network is an essential aspect of cybersecurity. It involves monitoring and analyzing network traffic, logs, and various data sources to identify and investigate potential security incidents. There are several techniques and technologies used for tracking and tracing in cybersecurity, and distributed tracing of complex systems can play a significant role in the process. Network monitoring tools are used to capture and analyze network traffic. These tools can track the flow of data packets and identify the source and destination of network connections. By analyzing network logs and traffic patterns the system can trace the path of data and identify any anomalies or suspicious activities. In addition, logging and auditing mechanisms record various activities and events within a network or system. By reviewing logs, the system can track user actions, service activities, and system events to identify an unauthorize or malicious activities. This can help in tracing the source of an attack or identifying the user or service responsible for a particular action.

The system can monitor network traffic and system activities in real-time to detect and prevent malicious activities. The system analyzes network packets and system logs, utilizing an array of techniques (e.g., signature-based, behavioral-based, etc.) to identify known attack patterns or anomalous behaviors. Endpoint detection and response (EDR) system data which focuses on monitoring and securing individual endpoints, such as desktops, laptops, or servers, may be collected and analyzed, including system logs, process information, software (e.g., execution trees), and network connections, to detect and respond to security incidents. By tracing the activities and connections of compromised endpoints, EDR data can help identify the attackers and track their movements within a network.

Distributed tracing of complex system plays a crucial role in tracking and tracing activities across multiple components and services within a network. In modern distributed systems, applications are often composed of numerous microservices or components that communicate with each other. Distributed tracing enables the monitoring and analysis of the flow of requests and responses across these distributed components. By instrumenting code and adding tracing metadata to requests, the system can track the path and timing of requests as they traverse various components. This allows for end-to-end visibility into the behavior of complex systems, helping in identifying performance bottlenecks, troubleshooting issues, and detecting security incidents. In the context of cybersecurity, distributed tracing can be leveraged to trace the flow of data and identify potential security vulnerabilities or breaches. It can assist in understanding the sequence of events leading to a security incident, identifying the entry points and compromised components, and tracking the activities of attackers within the distributed system (e.g., a network).

In some implementations, the system and methods provided may be used to provide end-to-end distributed tracing of a complex system (e.g., a distributed (or not) network) wherein various types of transactions are monitored to understand the flow of requests and responses across the system. Some exemplary types of transactions can include, but are not limited, user transactions, service-to-service transactions, external service transactions, and internal service transaction, to name a few.

User transactions can include (but is not limited to): a user registration by tracking the transaction flow when a user registers for an account or signs up for a service, a user login by monitoring the transaction flow when a user logs into the system, including authentication and authorization processes, and a user profile update by tracing the transaction flow when a user updates their profile information, such as changing their password or updating personal details.

Service-to-service transactions can include (but is not limited to): an application programming interface (API) request/response by tracking the transaction flow when one service makes an API request to another service and receives a response, a database query by monitoring transaction flow when a service interacts with database by issuing queries and receiving query results, and message queue processing by tracing the transaction flow when services communicate through a message queue or event bus, passing messages and processing them.

External service transactions can include (but is not limited to): payment processing by tracking the transaction flow when a system integrates with a payment gateway or processor to handle payment transaction; a third-party API integration by monitoring the transaction flow when a system interacts with external APIs for services like geolocation, weather data, or social media integration; and email delivery by tracing the transaction flow when a system sends emails using external email delivery services, tracking the request and response for email delivery.

Internal system transactions can include (but is not limited to): system caching by monitoring the transaction flow when a system utilizes a caching mechanism to store and retrieve data, tracking cache hits and misses; file storage/retrieval by tracing transaction flow when a system interacts with a file storage system to upload, download or manipulate files; and background jobs/processing by tracking the transaction flow when a system performs background tasks or asynchronous processing, such as generating reports or performing periodic updates.

These examples illustrate the diverse range of transactions that can be monitored during end-to-end distributed tracing. By capturing and analyzing the transaction flow across the complex system, organizations can gain insights into the performance, reliability, and security aspects of their distributed applications and network, enabling effective troubleshooting, optimization, and identification of potential issues or bottlenecks.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

As used herein, a "network flow" or "netflow" refers to a sequence of related network packets that share common characteristics or attributes. It represents the movement of data packets from a source destination across a network. A network flow is typically defined by a set of key fields that describe the characteristics of the packets, such as source IP address, destination IP address, source port, destination port, protocol type, and other relevant metadata.

Conceptual Architecture

FIG. 1 is a diagram of an exemplary architecture of a system for the capture and storage of time series data from sensors with heterogeneous reporting profiles according to a preferred aspect of the invention 100. In this embodiment, a plurality of sensor devices 110a-n stream data to a collection device, in this case a web server acting as a network gateway 115. These sensors 110a-n can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 125 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second(s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
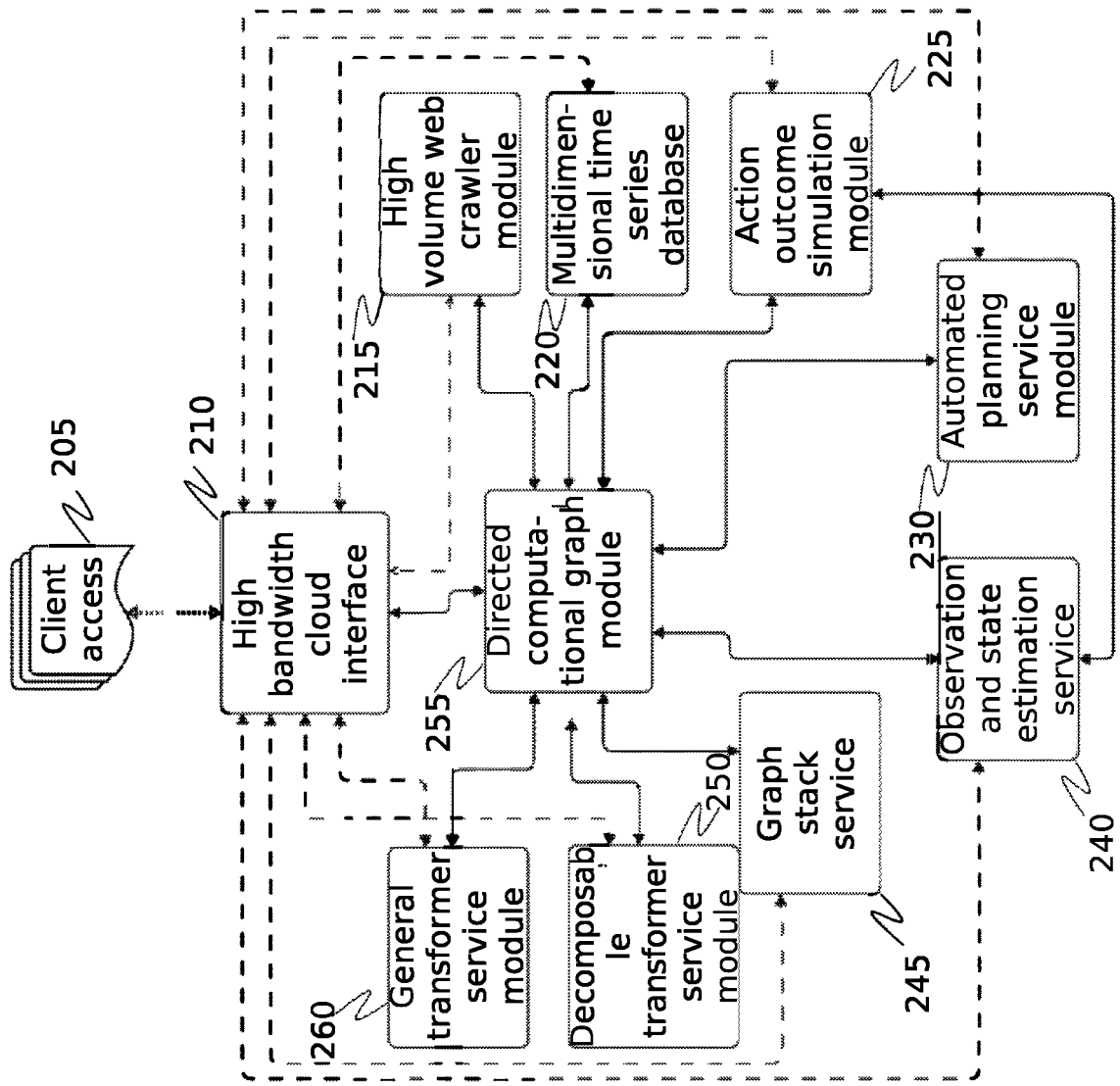
FIG. 2 is a diagram of an exemplary architecture of a business operating system according to a preferred aspect of the invention.

FIG. 2 is a diagram of an exemplary architecture of a business operating system 200 according to a preferred aspect. Client access to the system 205 both for system control and for interaction with system output such as automated predictive decision making and planning and alternate pathway simulations, occurs through the system's highly distributed, very high bandwidth cloud interface 210 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 210, data being passed to the analysis and transformation components of the system, the directed computational graph module 255, high volume web crawling module 215 and multidimensional time series database 220. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 260 for linear data transformation as part of analysis or decomposable transformer service 250 for branching or iterative transformations that are part of analysis. The directed computational graph 255 represents all data as directed graphs where the transformations are nodes and the result messages between transformations edges of the graph. These graphs which contain considerable intermediate transformation data are stored and further analyzed within graph stack module 245. High volume web crawling module 215 uses multiple server hosted preprogrammed web spiders to find and retrieve data of interest from web based sources that are not well tagged by conventional web crawling technology. Multiple dimension time series database module 220 receives data from a large plurality of sensors that may be of several different types. The module is designed to accommodate irregular and high volume surges by dynamically allotting network bandwidth and server processing channels to process the incoming data. Data retrieved by the multidimensional time series database 220 and the high volume web crawling module 215 may be further analyzed and transformed into task optimized results by the directed computational graph 255 and associated general transformer service 250 and decomposable transformer service 260 modules.

Results of the transformative analysis process may then be combined with further client directives, additional business rules and practices relevant to the analysis and situational information external to the already available data in the automated planning service module 230 which also runs powerful predictive statistics functions and machine learning algorithms to allow future trends and outcomes to be rapidly forecast based upon the current system derived results and choosing each a plurality of possible business decisions. Using all available data, the automated planning service module 230 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 225 coupled with the end user facing observation and state estimation service 240 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 200 has data from them, which no one really studied due to the great volume of columnar figures, so the alternative courses 225, 240 of action are run. The system, based on all available data predicts that the fouled sensor or pump are unlikely the root cause this time due to other available data and the contractor is dispatched. She finds a small breach in the pipeline. There will be a small cleanup and the pipeline needs to be shut down for repair, but multiple tens of millions of dollars have been saved. This is just one example of a great many of the possible use of the business operating system, those knowledgeable in the art will easily formulate more.

Figure 3:
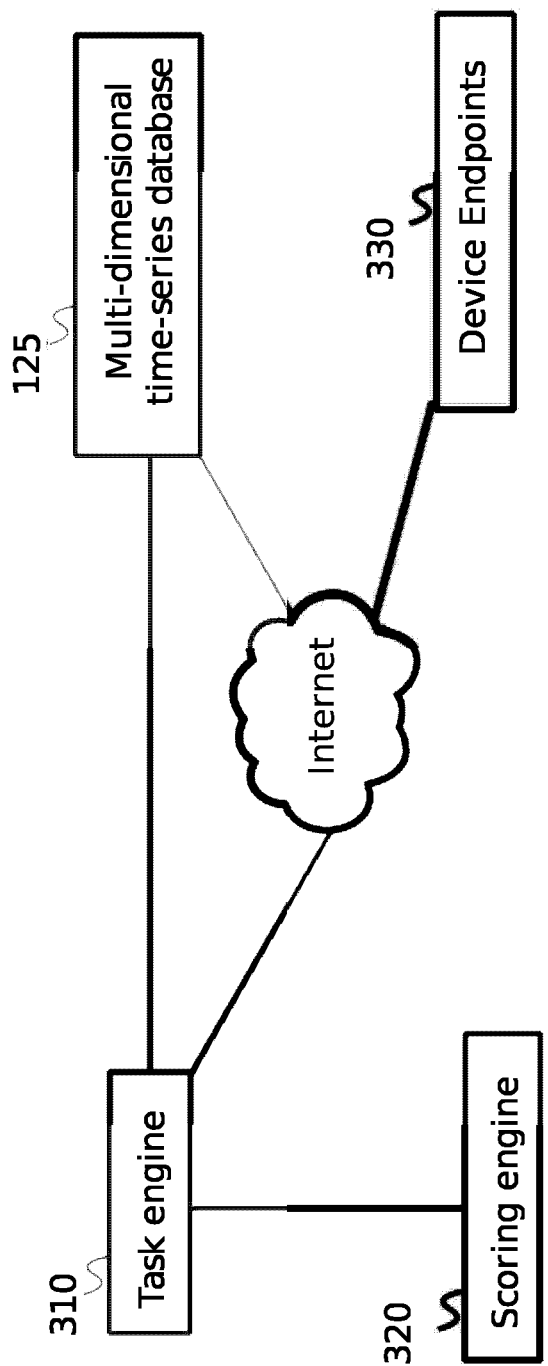
FIG. 3 is a diagram of an exemplary architecture of a cybersecurity analysis system according to a preferred aspect of the invention.

FIG. 3 is a system diagram, illustrating the connections between crucial components, according to an aspect of the invention. Core components include a scheduling task engine 310 which will run any processes and continue with any steps desired by the client, as described in further methods and diagrams in the disclosure. Tasks may be scheduled to run at specific times, or run for certain given amounts of time, which is commonplace for task scheduling software and systems in the art. This task engine 310 is then connected to the internet, and possibly to a single or plurality of local Multi-Dimensional Time-Series Databases (MDTSDB) 125. It is also possible to be connected to remotely hosted and controlled MDTSDB's 125 through the Internet, the physical location or proximity of the MDTSDB for this disclosure not being a limiting factor. In such cases as the MDTSDB 125 is not hosted locally, it must also maintain a connection to the Internet or another form of network for communication with the task engine 310. Device endpoints 330, especially Internet-of-Things (IoT) devices, are also by definition connected to the internet, and in methods described in later figures will be used for cybersecurity analysis and risk assessment. The task engine 310 which will perform the scheduling and running of the methods described herein also maintains a connection to the scoring engine 320, which will be used to evaluate data gathered from the analysis and reconnaissance tasks run by the task scheduling engine 310.

Figure 4:
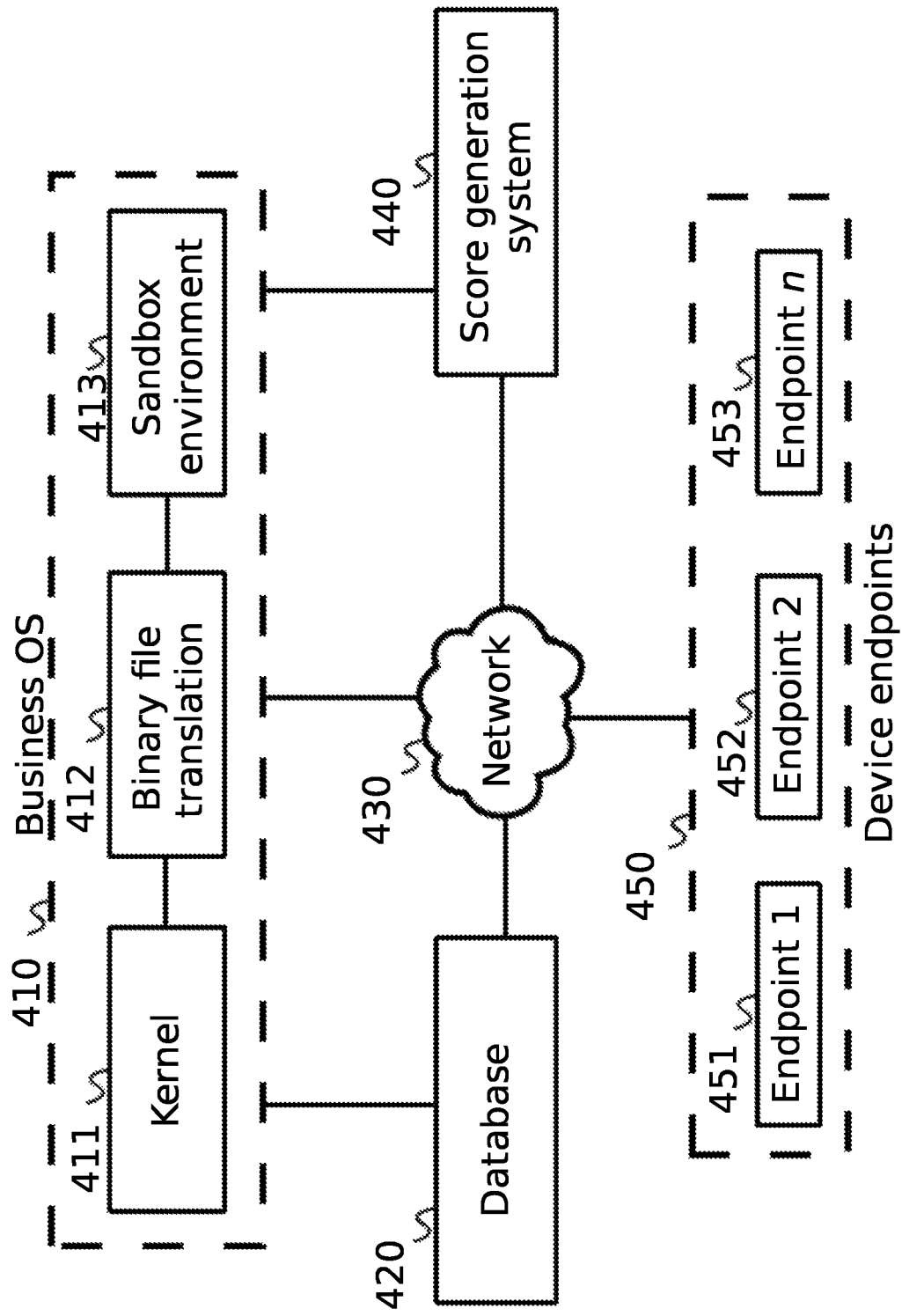
FIG. 4 is a system diagram illustrating connections between important components for analyzing software and network-connected endpoints.

FIG. 4 is a system diagram illustrating connections between important components for analyzing software and network-connected endpoints. A business operating system (OS) 410 operates on a system outlined in FIG. 2, with key components including the OS kernel 411 which is a component common to all operating systems, and on that kernel, aside from other pieces of software for other purposes, are two important engines, a binary file translator 412 and a sandbox simulation environment 413. A binary file translator 412 may convert any given file or set of input data into executable machine code, and a sandbox environment 413 is a simulation environment which may execute machine code in a closed-off environment, similar in purpose to an experiment carried out in a sealed room. This may be done in a variety of ways, including emulator software for specific system architectures and open source code executors. Such an OS 410 would be connected to a database 420, which may be formatted in Structured Query Language (SQL) form, formatted raw text, encrypted text, or no-SQL forms, and may be used in conjunction with management software such as APACHE HADOOP™ for increased performance. This connection may be either a direct physical connection, or the OS 410 and database 420 may be located on the same physical machine, or they may be connected over a network 430, including the Internet or other kinds of computer networks. Similarly, a score generation system 440 may be connected to the operating system 410, either through a network 430, or through a direct physical connection, or by operating on the same machine as the operating system 410 itself. This scoring engine is used in later figures to prioritize software vulnerabilities and exploits. A variety of device endpoints 450 may be connected over a network 430 and accessible to the operating system 410, by use of endpoint instrumentation such as OSQUERY™, and these device endpoints may be varied in form, including laptop computers, desktops, mobile phones, and various Internet of Things (IoT) devices. It is possible for only one endpoint 451 to be connected, and it is similarly possible for a multitude of various different endpoints to be connected 452, 453.

Figure 5:
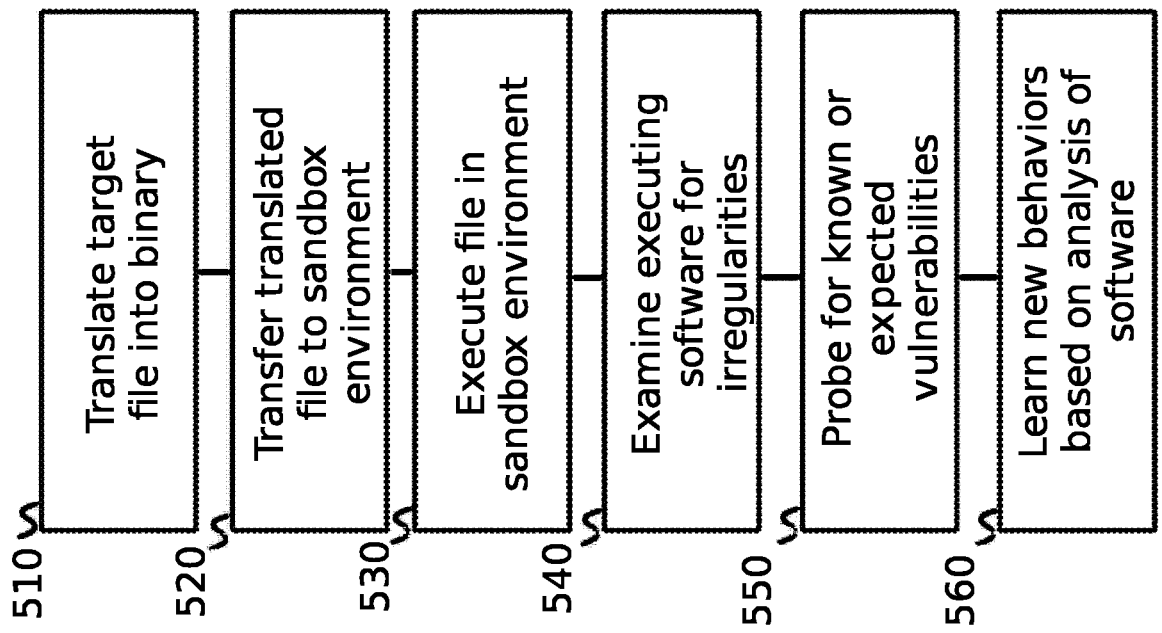
FIG. 5 is a method diagram illustrating important steps in detecting and analyzing software exploits or vulnerabilities of the invention.

FIG. 5 is a method diagram illustrating important steps in detecting and analyzing software exploits or vulnerabilities of the invention. A file that is targeted for analysis may be translated into executable binary code 510 by use of a binary translation engine 412, and this executable binary code may then be transferred to a sandbox environment 520, 413, for analysis. The specific environment in use may vary depending on the code generated by the binary translation engine 412, including hardware emulators, operating system emulators, and more. The executable binary code is then executed in the simulated environment 530, and the operating system then may examine the executing software for any irregularities 540. Irregularities include activities not normally performed by benign software including memory scanning, and deletion of the executable binary during execution (but the executing code remaining in memory), which are known patterns of malware to avoid detection and elimination. Attempted access of system files, permissions, settings, or network adapters in suspicious ways may also be classified as "irregularities," though the characterization and scope of what the operating system 410 looks for may grow and change over time as cybersecurity and malware both advance. The operating system may also probe the executing software for vulnerabilities and exploits 550, which will often be known forms of attack, such as the Heartbleed exploit in OPENSSL™, and are known to many skilled in the art of cybersecurity. The types of vulnerabilities and exploits probed for may change and grow as cybersecurity advances as a field. The operating system 410 may then learn new behaviors 560 according to the results of analysis, for example the operating system 410 may probe for the Heartbleed exploit 550 in a piece of software to see if it is prone to that exploit, and if it is, the operating system may be trained look for similar execution patterns in future software analyses to determine if a piece of software is likely to be vulnerable to the same exploit, an example of reinforcement learning 560. This may be achieved in numerous ways common in the art including neural networks, a basic decision weight system, and more, all common concepts in computer science and software development as a whole.

Figure 6:
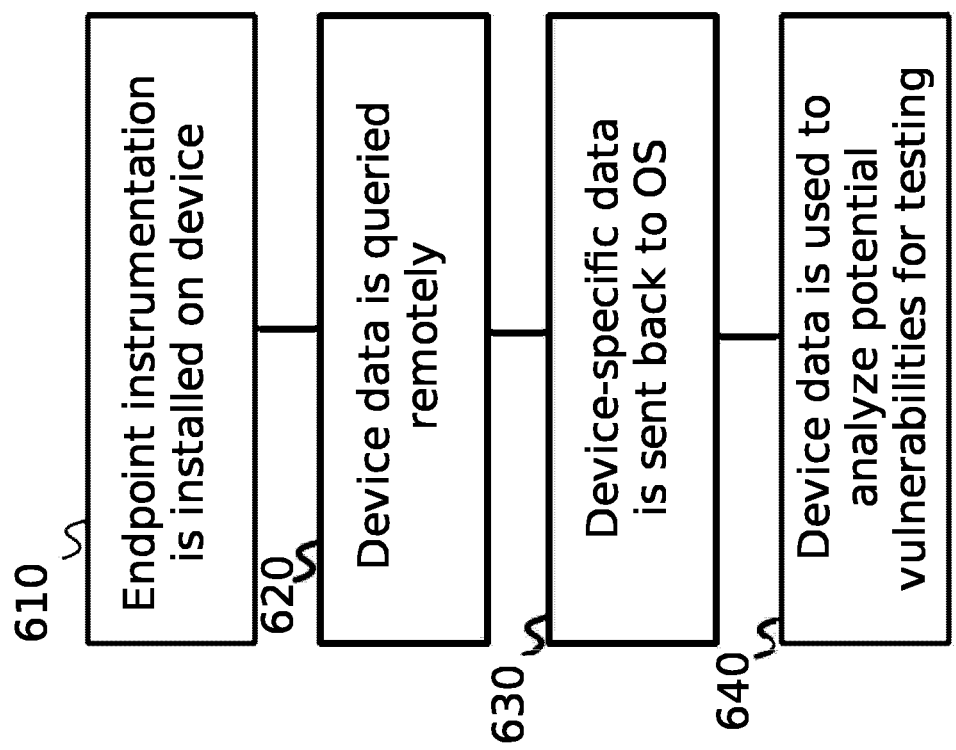
FIG. 6 is a method diagram illustrating the use of advanced endpoint instrumentation to collect data on endpoint devices across a network.

FIG. 6 is a method diagram illustrating the use of advanced endpoint instrumentation to collect data on endpoint devices across a network. First, the network endpoint must have the instrumentation installed before it can be utilized 610, and some common instrumentations include OSQUERY™ and open source fleet management software including "doorman," an open source fleet management suite for OSQUERY™. Software such as OSQUERY™ allows devices to be queried and scanned similar to data files or databases, so that property and/or relational data about the device may be scanned easily and swiftly by an authorized user, in this case the business operating system 410. Once a form of instrumentation software is installed onto the endpoints used in the system 610, device data may be remotely queried by the business operating system 620, similar to a database query over the internet. Device data is then sent back to the machine hosting the business operating system 630, which is then analyzed for potential vulnerability profiling 640. For example, certain phones that may be used in this system have various exploits and vulnerabilities that are exclusive to each other, as do many older operating systems for personal computers, and this information would be able to be queried for analysis 640.

Figure 7:
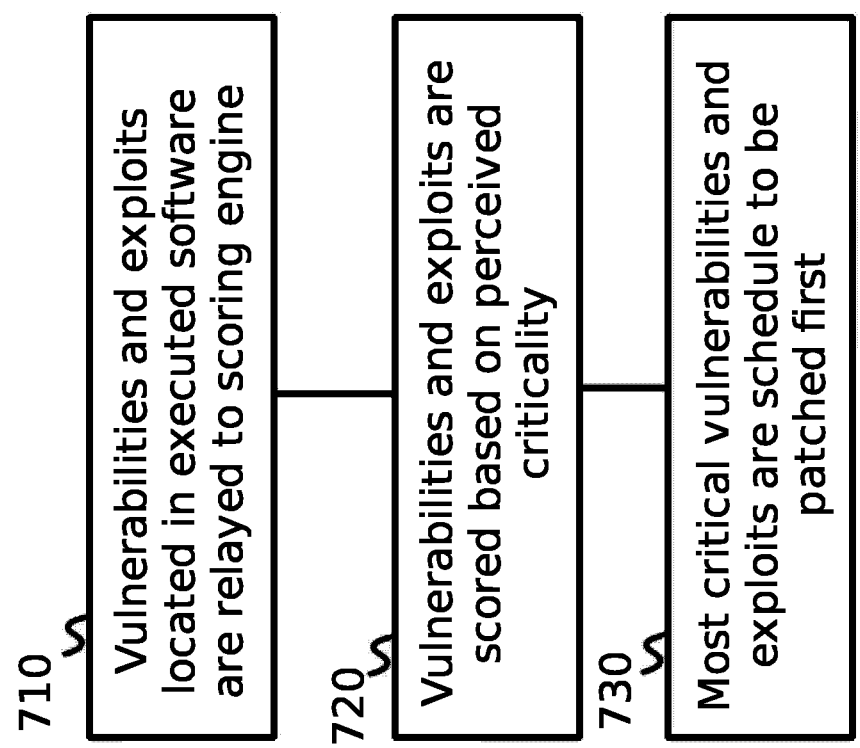
FIG. 7 is a method diagram illustrating the prioritization of software flaws and exploits according to a preferred aspect.

FIG. 7 is a method diagram illustrating the prioritization of software flaws and exploits according to a preferred aspect. Vulnerabilities and exploits found in software executed in the sandbox environment 413 are relayed to the scoring engine 440, 710, which may be either a connection over a network 430 or a direct physical connection between only the two machines, or both the scoring engine 440 and operating system 410 may be operating on the same computing device. The vulnerabilities and exploits found in the software execution may then be scored by the scoring engine 720, which will assign a higher risk level to exploits which may involve deleting system critical files, highly evasive code techniques which may evade most forms of antivirus software, and more, using a scoring methodology which may be specified and changed at any time by the user of the software. The scoring methodology may be arbitrary or follow any given set of rules specified by the user of the software, the importance of this being that as cybersecurity and malware advance, the need for a changing and advancing ranking of threats is obvious and immediate-what was considered a horrible computer virus 15 years ago may be easily detectable today, and similarly, what is considered incredibly high-risk today may be of no consequence to antivirus software 15 years from now, and therefore be categorized as a low threat to most devices. Regardless, at the time of execution, the scoring engine 440 will then inform the operating system 410 of a ranking of the found vulnerabilities or threats in the executed software 730, ranking the issues found from most dangerous or pressing, to least dangerous or pressing.

Figure 8:
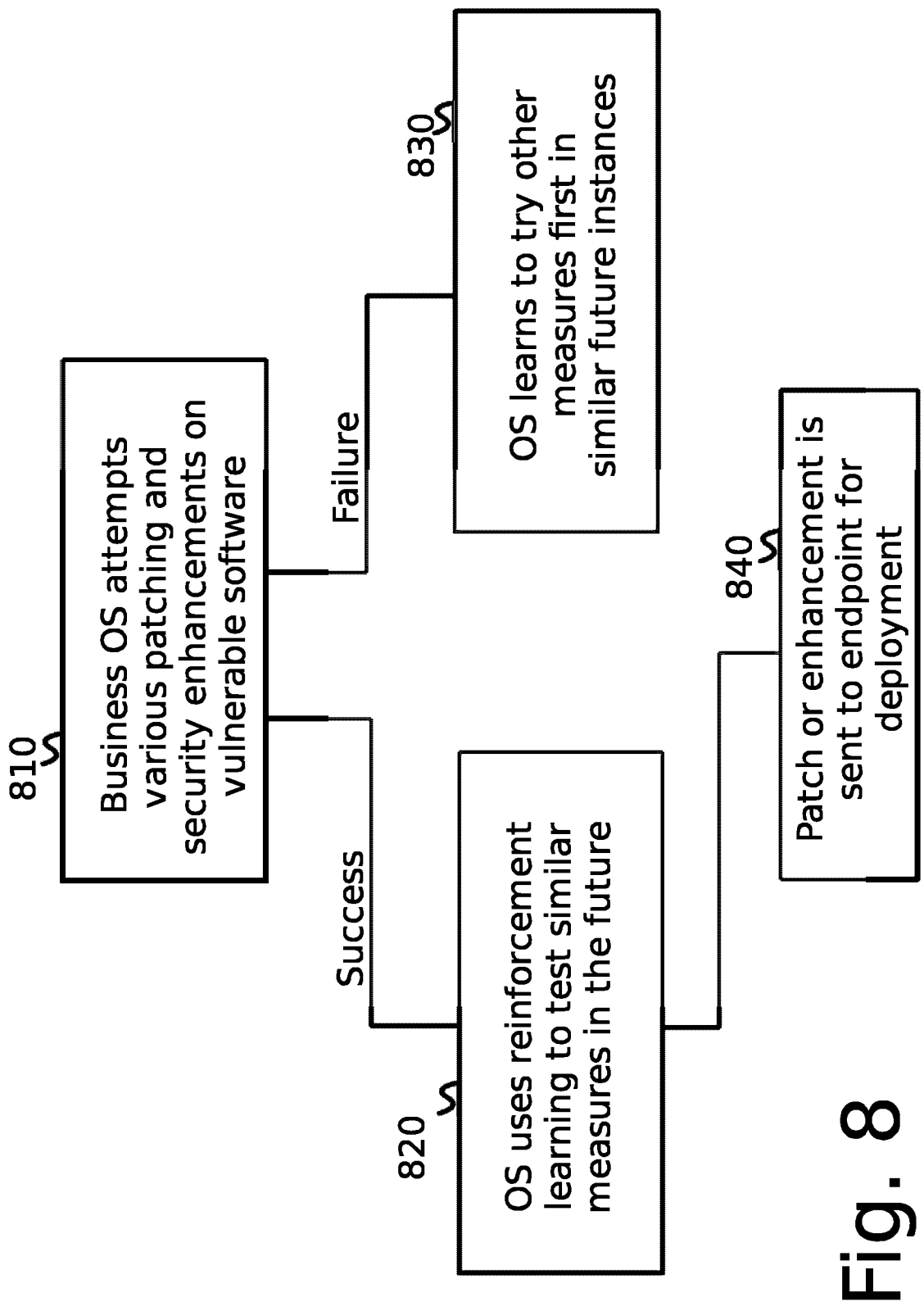
FIG. 8 is a method diagram illustrating the basic steps for patching exploits and vulnerabilities in analyzed software, according to an aspect.

FIG. 8 is a method diagram illustrating the basic steps for patching exploits and vulnerabilities in analyzed software, according to an aspect. After receiving a list of exploitable or dangerous behaviors from a simulated piece of software 730, the business operating system 410 will attempt to make any of various changes or limitations implementable at the kernel level to the software's execution 810, to "patch" the vulnerability or threat. Such measures may include techniques such as Address Space Layout Randomization (ASLR), a memory protection process which randomizes the location in computer memory where system executable code is loaded, and measures used to patch undesirable behavior or vulnerabilities may include other techniques including data execution prevention (DEP), which prevents certain sectors of memory from being executed, protecting potentially important system processes from attack. There are a large variety of security measures that may be implemented in an effort to patch software behavior, and the importance of noting that it is to patch behavior is that the system is not analyzing the code itself and re-writing code in software to be permanently patched, but rather it is changing system behavior based on observed software behavior to protect against any behavior that is either vulnerable to exploitation, or is itself malware. If an implemented patch does not solve the undesired behavior or vulnerability in the tested software, and is deemed a failure, then the operating system 410 may learn through reinforcement learning algorithms to try different measures first, if the same behavior occurs during analysis of a different piece of software 830. If the implemented patch or hotfix does stop the undesirable behavior, and is deemed a success, the operating system 410 learns, conversely to the previous situation, that this patch is an effective measure against such behaviors, and will try it sooner than other (either untested or possibly ineffective) measures that it may have tried 820. This patch or enhancement to the software's functionality is then sent to the endpoint 450, 840 which hosted this file or piece of software that was being analyzed, so that the undesired behavior or vulnerability is effectively mitigated.

Figure 9:
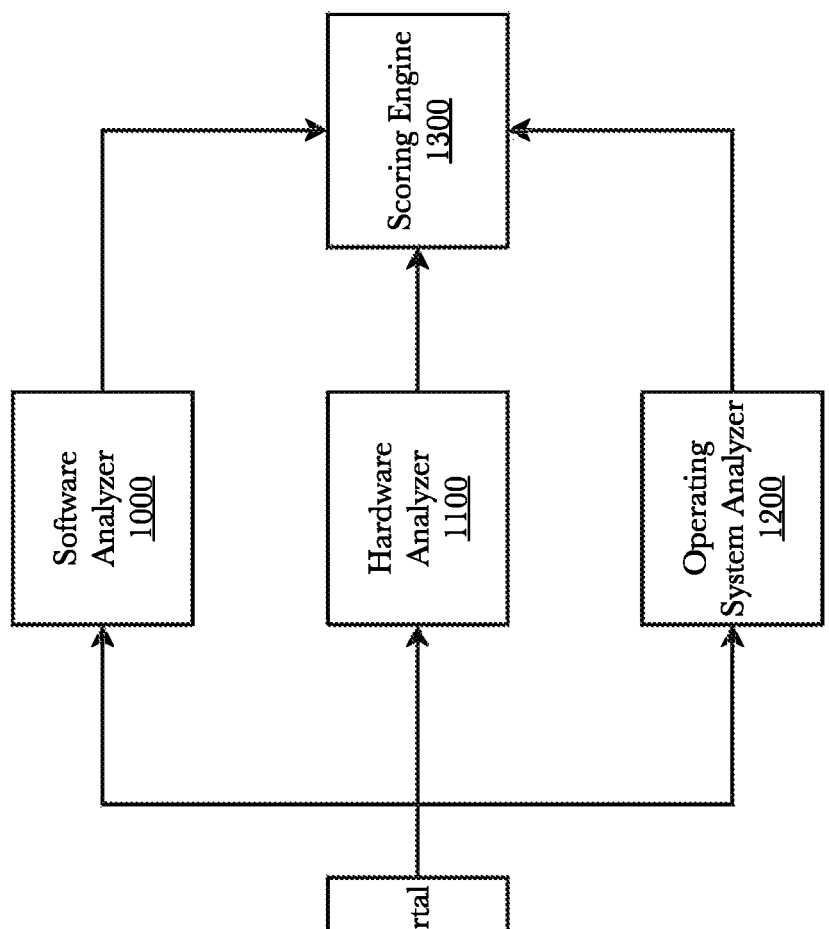
FIG. 9 is a block diagram showing an exemplary overall system architecture for a holistic computer system cybersecurity evaluation and scoring system.

FIG. 9 is a block diagram showing an exemplary overall system architecture for a holistic computer system cybersecurity evaluation and scoring system 900. In this embodiment, the system comprises a system definition portal 901, a software analyzer 1000, a hardware analyzer 1100, an operating system analyzer 1200, and a scoring engine 1300. The system definition portal 901 provides the means for a user to define the system to be tested (also known as the "system under test") in terms of its hardware, software, and operating system components. The software analyzer 1000 receives the definition of the software component of the system under test and analyzes it for cybersecurity issues. The hardware analyzer 1100 receives the definition of the hardware component of the system under test and analyzes it for cybersecurity issues. The operating system analyzer 1200 receives the definition of the software component of the system under test and analyzes it for cybersecurity issues. The scoring engine 1000 receives the analyses from the software analyzer 1000, hardware analyzer 1100, and operating system analyzer 1200, performs additional checking and testing of the system under test as a whole, and assigns a cybersecurity rating or score to the system under test as a whole computing environment. Note that an operating system is a type of software, so references to software may include operating systems where the context allows.

With respect to the system definition portal 901, in this embodiment the system definition portal 901 is a stand-alone portal allowing for definition of the entire system under test, but in other embodiments, it may simply be an input component of the software analyzer 1000, hardware analyzer 1100, and operating system (OS) analyzer 1200. Each of the software, hardware, and operating components of the system under test can be defined in several ways. One primary method of definition is specification of the component's parameters. For the hardware component, for example, the hardware may be defined by specifying the particular components that make up the hardware (e.g., the central processing unit (CPU), memory, storage, system bus, etc.), including details such as the manufacturer, date of manufacture, model number, serial number, etc., from which the performance characteristics of each part can be obtained. Alternatively, the hardware may be defined directly in terms of performance characteristics, for example specifying the bit width (or word length) of the architecture (e.g., 32-bit, 64-bit, etc.), the processor clock speed, the bus speed, and other characteristics that determine the hardware's performance. For hardware, in particular, definitions by specification may be useful as the actual hardware may not be available or may be difficult to obtain, yet can often be emulated using an emulator or virtual machine. Similar definitions by specification can be made of software and operating systems, for example specifying the software name, version, etc., from which operating characteristics may be identified, or by directly specifying the operating characteristics. While it is possible to emulate or simulate the operation of software, this is typically not done as the software is usually readily available. A second method of definition is provision of the actual software, hardware, and/or OS to be tested. For example, software and operating systems can be uploaded, the actual hardware to be tested may be provided, and in some cases the entire system may be provided for testing with the software and operating system already installed on the hardware. Where physical hardware is used to define the hardware under test, the actual physical computing device may be used as the hardware under test. In some cases, the physical hardware may be physically transported (e.g., delivery, drobox, etc.), while in other cases the physical hardware may be accessed and operated locally (i.e., onsite), while in yet other cases the physical hardware may be accessed and operated remotely (e.g., via a terminal associated with the physical hardware, remote device control using a different computer, screen-sharing, etc.).

A further aspect of the system definition portal 901 is that information about the usage of the computer system under test may be specified for scoring purposes. For example, the domain in which the computer system will be used, the use to which the computer system will be put, the criticality of the computer system to overall operations of a business or larger network of computers, and the magnitude of losses that would occur if the system was compromised may all be entered to more precisely define the parameters of the evaluation and scoring. This list is not intended to be exhaustive, and other such information and parameters may be used.

Figure 10:
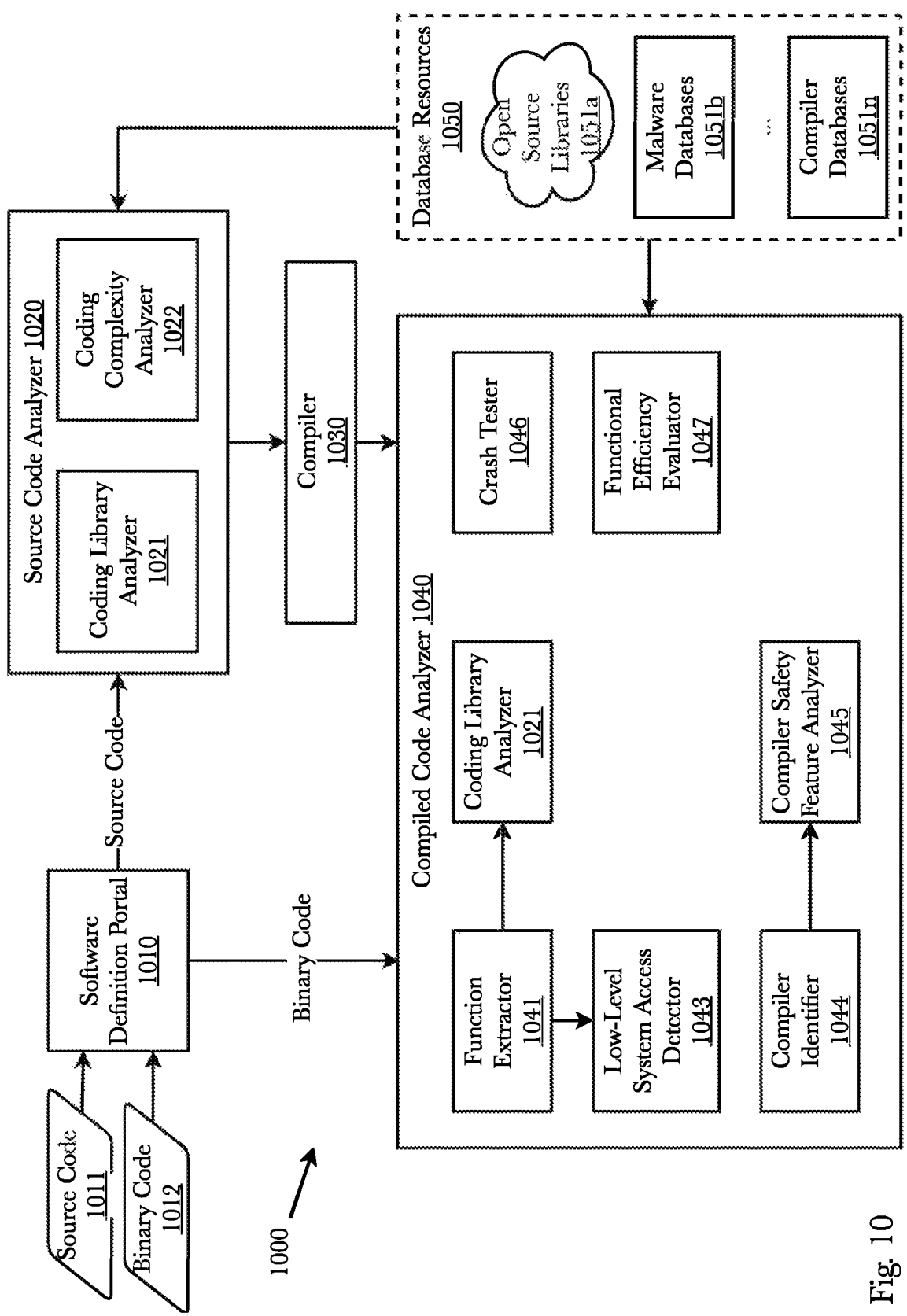
FIG. 10 is a block diagram showing an exemplary architecture for a software analyzer for a holistic computer system cybersecurity evaluation and scoring system.

FIG. 10 is a block diagram showing an exemplary architecture for a software analyzer 1000 for a holistic computer system cybersecurity evaluation and scoring system. In this embodiment, the software analyzer 1000 comprises a software definition portal 1010, a source code analyzer 1020, a compiler 1030, a compiled code analyzer 1040, and one or more database resources 1050. The software definition portal 1010 receives either uncompiled, human-readable source code 1011, or compiled machine-readable binary code 1012 to define the software component of the system under test. In this example, definition by specification is not used, and it is assumed that the software to be tested is provided. If source code 1011 is provided, the software definition portal 1010 forwards the source code 1011 to the source code analyzer 1020 for coding analysis prior to compiling.

The source code analyzer 1020 comprises a coding library analyzer 1021 and a coding complexity analyzer 1022. The coding library analyzer searches the code for functions, classes, modules, routines, system calls, and other portions of code that rely on or incorporate code contained in code libraries developed by a different entity than the entity that developed the software under test. Code libraries are collections of code that have been developed for use in specific circumstances, such as standardized classes developed for an object-oriented coding language (e.g., C++, JAVA, etc.), tools developed for a particular integrated development environment (e.g., Code::Blocks, Eclipse), common libraries for interacting with the operating system, templates, subroutines, etc., that are designed to help speed up, standardize, or make easier the coding of applications. The code in such libraries is of varying quality, complexity, usability, security, etc. Code in open source libraries is particularly variable, depending on the skill and knowledge of the (usually part-time, volunteer) contributors, and subject to deprecation if maintenance of the code slows or stops. The source code analyzer 1021 uses this information to determine which code libraries are used, what code from the libraries is used, and the security level of that code, and the security level of the source code 1011 as a result of using code from those libraries. The coding library analyzer 1021 may access one or more database resources 1050 such as open source libraries 1051*a*, malware databases 1051*b*, lists of deprecated or out of date software, etc.

The coding complexity analyzer 1022 analyzes the level of additional cybersecurity risk due to the complexity of the code. As an illustrative example, the cyclomatic complexity of a particular software package is a strong indicator of the number of errors that are likely to be in the code. The cyclomatic complexity of a piece of software is a quantitative measure of the number of linearly independent paths through a program's source code.

After the source code analyzer 1020 has completed analysis of the source code 1011, the source code 1011 is compiled by a compiler 1030 for operational testing. The compiler 1030 used will depend on the language in which the source code 1011 was written. Many different compilers 1030 may be available for any given coding language.

Binary code 1012, whether received directly by the software definition portal 1010 or compiled by the compiler 1030 from source code 1011, is sent to a compiled code analyzer 1040 which analyzes the software while it is in operation (i.e., running) on hardware under an operating system. While the software is running, a function extractor 1041 monitors which operations are performed by the software, the order of such operations, and which system resources are accessed by the software, which can disclose the functions, subroutines, etc., that are being executed by the compiled code. The characteristics of those functions, subroutines, etc., can be matched to similar functions, subroutines, etc., in coding libraries and such that the function extractor can identify code from code libraries that are contained in, and being used by, the compiled software. This information about the binary code 1012 can be sent to the coding library analyzer 1021 for analysis (typically where such analysis has not already been performed by the source code analyzer 1020). Further, a low-level system access detector 1043 will simultaneously monitor the running software to identify access of, or attempted access of, low-level system resources (e.g., kernel, stack, heap, etc.) that may indicate cybersecurity concerns. A compiler identifier 1044 can be used to identify the compiler used to create the binary code 1012 and certain information about the settings used when during compilation. In many cases, compilers embed information in the compiled code such as the compiler identification, version number, settings, etc., in a comment section composed of ASCII text. The binary can be scanned for such textual information. Alternatively, the binary file can be "decompiled" or "disassembled" in an attempt to match the inputs and outputs of known compilers. The compiler identifier 1044 may access one or more database resources 1050 to make its determination, such as a database of compilers 1051*n* and their identifications. An important aspect of cybersecurity analysis of software is determining whether or not a compiler's safety features were enabled, which is done by the compiler safety feature analyzer 1045. Modern compilers have the ability to substitute insecure functions called for in the source code with more secure versions that perform the same functions. However, if this feature is not enabled, the functions will not be substituted. Enablement of the safety features can be determined using the same methods as for compiler identification. A crash tester 1046 may be used to determine the robustness of the software to bad inputs or attempts to crash or hang the software by intentionally inputting improper or unexpected information. Further, a functional efficiency evaluator 1047 may be used to evaluate whether the software does what it purports to do, and its level of efficiency in doing so. For example, if the software is a malware detector, the functional efficiency evaluator 1047 may determine whether it functions as such, and evaluate what percentage of malware introduced into the computer system it detects and quarantines.

Figure 11:
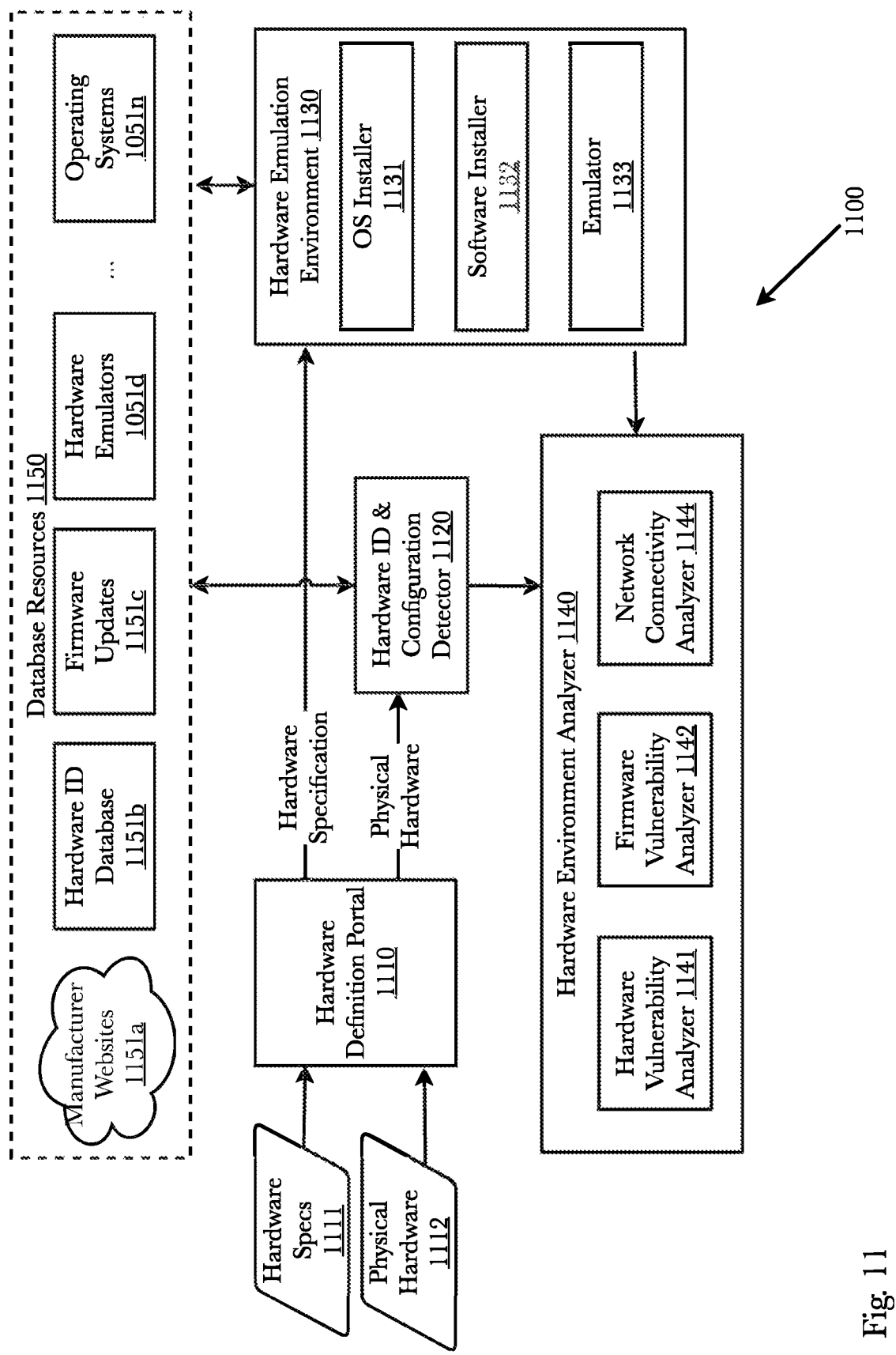
FIG. 11 is a block diagram showing an exemplary architecture for a hardware analyzer for a holistic computer system cybersecurity evaluation and scoring system.

FIG. 11 is a block diagram showing an exemplary architecture for a hardware analyzer 1100 for a holistic computer system cybersecurity evaluation and scoring system. In this embodiment, the hardware analyzer 1100 comprises a hardware definition portal 1110, a hardware identification and configuration detector 1120, a hardware emulation environment 1130, a hardware environment analyzer 1140, and one or more database resources 1150. The hardware definition portal 1110 receives either hardware specifications 1111 to define the hardware under test or physical computer hardware 1112 (e.g., via delivery, a drobox, etc.) as the hardware under test.

Where the hardware is defined by specification 1111, the hardware may be defined by specifying the particular components that make up the hardware (e.g., the central processing unit (CPU), memory, storage, system bus, etc.), including details such as the manufacturer, date of manufacture, model number, serial number, etc., from which the performance characteristics of each part can be obtained. Alternatively, the hardware may be defined directly in terms of performance characteristics, for example specifying the bit width (or word length) of the architecture (e.g., 32-bit, 64-bit, etc.), the processor clock speed, the bus speed, and other characteristics that determine the hardware's performance. The operation of hardware defined by specification can be emulated using an emulator or virtual machine. Where physical hardware is used to define the hardware under test 1112, the actual physical computing device may be used as the hardware under test. In some cases, the physical hardware may be physically transported (e.g., delivery, drobox, etc.), while in other cases the physical hardware may be accessed and operated locally (i.e., onsite), while in yet other cases the physical hardware may be accessed and operated remotely (e.g., via a terminal associated with the physical hardware, remote device control using a different computer, screensharing, etc.).

Where the hardware is defined by specification 1111, the hardware definition portal 1110 sends the hardware specification 1111 to a hardware emulation environment 1130. The hardware emulation environment 1130 is a computing device configured to emulate the operation of the hardware defined by the specification 1111. Emulation is usually performed by running emulation software on a computer that is more powerful than the hardware being emulated, to account for the additional processing overhead of the emulator itself in addition to the processing within the emulated hardware. The hardware emulation environment 1130 comprises an operating system installer 1131, a software installer 1132, and the emulator 1133. In some embodiments, the OS installer 1131 and software installer 1132 will be part of the emulator 1133. The OS installer 1131 installs the operating system under which certain software will run. The software installer 1132 installs software to run on the hardware. When testing the hardware platform separately, this software may or may not be the software under test. For example, in some tests, the software may be a benchmarking application designed to generate artificial loads, or other functional application designed to test the operation of the hardware under test. Once the OS and software are installed, and the emulator 1133 is operating, the emulator acts as the hardware under test, and can be analyzed by the hardware environment analyzer 1140, just as physical hardware would be. The hardware emulation environment 1130 may use one or more database resources 1150 such as databases of downloadable hardware emulators 1051*d*, operating systems 1051*n*, etc. In some embodiments, emulation is not required at the hardware analysis stage (but may be used in a later stage when the system is evaluated as a whole), and the hardware specifications 1111 are passed directly to the hardware environment analyzer 1140.

Where physical hardware is used to define the hardware under test 1112, a hardware identification and configuration detector 1120 is run, which automatically identifies the type of hardware, its components, its performance specifications, and its configuration. Modern operating systems conduct a series of port checks and queries of hardware components attached to a computer system each device returns its device identifier (e.g., CPU ID, MAC address, etc.), which is then matched against lists of such identifiers to determine various characteristics of that hardware component (e.g., type of hardware, manufacturer, performance characteristics, size of storage, etc.). The hardware components and their characteristics can generally be obtained by querying the operating system about hardware that makes up the computer system. Where the operating system cannot identify a hardware component, the hardware component can be queried directly, and database resources 1150 external to the operating system may be used to identify the hardware component such as manufacturer websites 1151*a*, hardware ID databases 1151*b*, etc. Once the hardware and its configuration have been identified by the hardware ID and configuration detector 1120, operation passes to the hardware environment analyzer 1140.

The hardware environment analyzer 1140 conducts one or more analyses of the hardware. The hardware vulnerability analyzer 1141 can conduct either static evaluations or dynamic testing of the hardware for vulnerabilities. For example, the hardware vulnerability analyzer 1141 may search a number of database resources 1050 such as manufacturer websites 1151*a*, hardware ID databases 1151*b*, etc., to identify known vulnerabilities in the physical configuration of the hardware. For example, the most notorious hardware security flaw to date (commonly known as Spectre and Meltdown, which are variants on the flaw) was identified in 2018 and affected nearly every computer chip manufactured in the two decades prior to 2018. The flaw involved exploiting speculative execution and caching to gain access to information that was supposed to be secure. Where database results cannot be used or are inconclusive, the operation of the hardware can be tested by running operations on the hardware associated with known hardware exploits to determine whether the hardware is susceptible to such exploits. The firmware vulnerability analyzer 1142, operating system analyzer 1143, and network connectivity analyzer 1144 operate similarly, first checking database resources 1150 such as firmware updates 1151*c*, operating systems, updates, and patches 1051*n*, etc., to determine known vulnerabilities based on hardware components identified in the hardware under test, and performing operational testing of the hardware components in cases where the database results cannot be used or are inconclusive.

Figure 12:
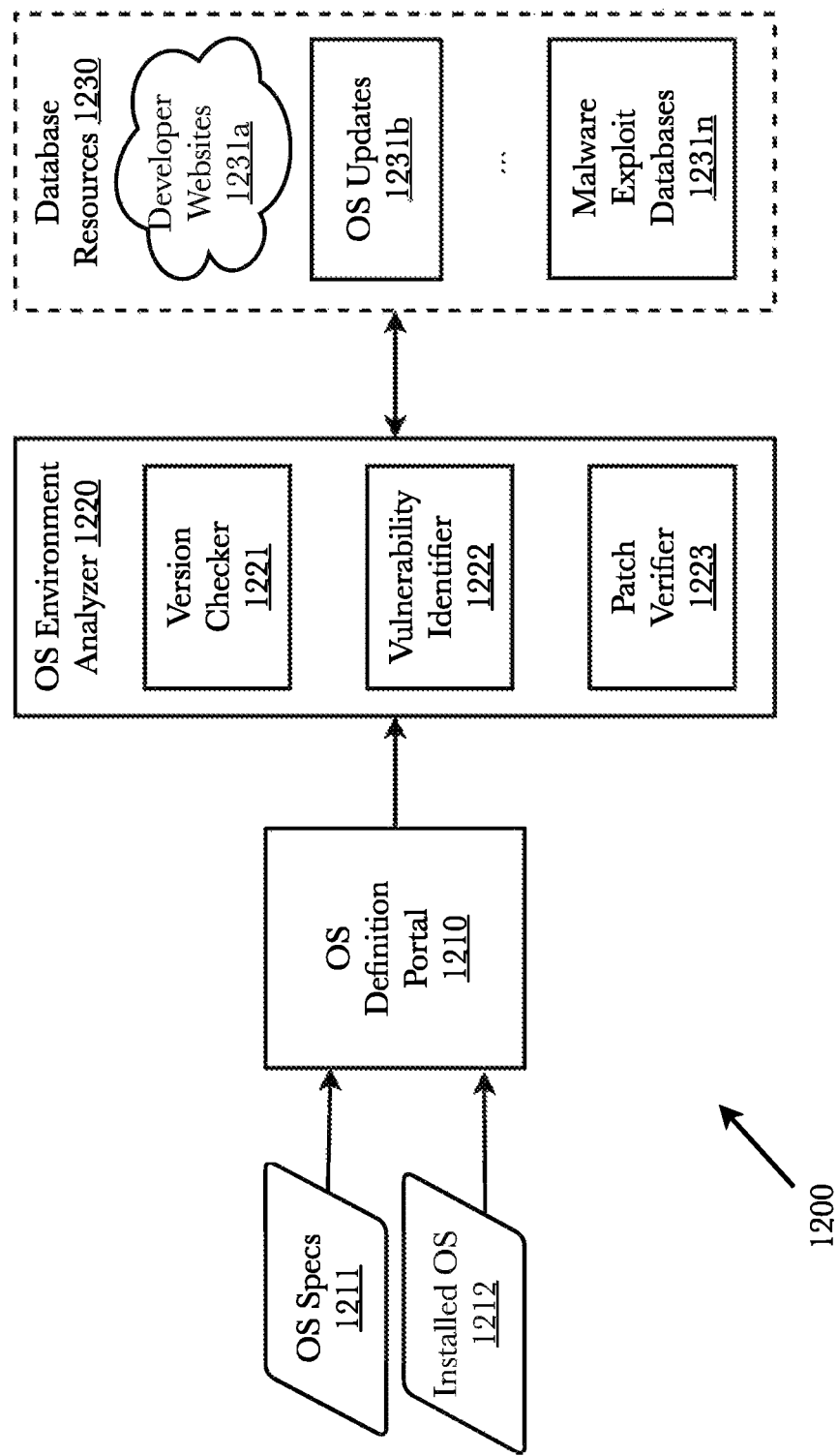
FIG. 12 is a block diagram showing an exemplary architecture for an operating system analyzer for a holistic computer system cybersecurity evaluation and scoring system.

FIG. 12 is a block diagram showing an exemplary architecture for an operating system analyzer 1200 for a holistic computer system cybersecurity evaluation and scoring system. In this embodiment, the operating system (OS) analyzer 1200 comprises an OS definition portal 1210, an OS environment analyzer 1220, and one or more database resources 1230. The OS definition portal 1210 receives either operating system specifications 1211 or uses an installed operating system to define the operating system component of the system under test. In this example, definition by installation 1212 is not used, and it is assumed that the definition of the operating system 1211 will be sufficient to conduct the analysis. However, in some embodiments, testing on an installed operating system may be performed as is the case for hardware analysis above. While operating systems are software, they provide low-level functionality to allow applications to operate on the hardware.

The OS definition portal 1210 forwards the OS specifications 1211 to an operating system environment analyzer 1220, whose functions are similar in nature to those of the hardware environment analyzer 1140. The version checker 1221 may search a number of database resources 1230 such as developer websites 1231*a*, OS update databases 1231*b*, malware exploit databases 1231*n*, etc., to identify known vulnerabilities in the operating system. A patch verifier 1223 can determine whether patches are available and/or installed for any identified vulnerabilities. Where database results cannot be used or are inconclusive, the security of the operating system can be tested by running operations on the hardware associated with known hardware exploits to determine whether the hardware is susceptible to such exploits. One area in which this capability is particularly useful is in industrial control systems, which often have older and customized/proprietary hardware and operating systems installed which cannot be upgraded without major upgrades throughout the facility. In such cases, operating tests can be conducted by the vulnerability identifier 1222 to identify security issues common on such older and/or customized systems such as whether any passwords or authentications at all are required, password length, use of group-based passwords, transmission of plain (unencrypted) text, case of user access to low-level system operations, application access to low-level system components like the kernel, stack, and heap, and the like.

Figure 13:
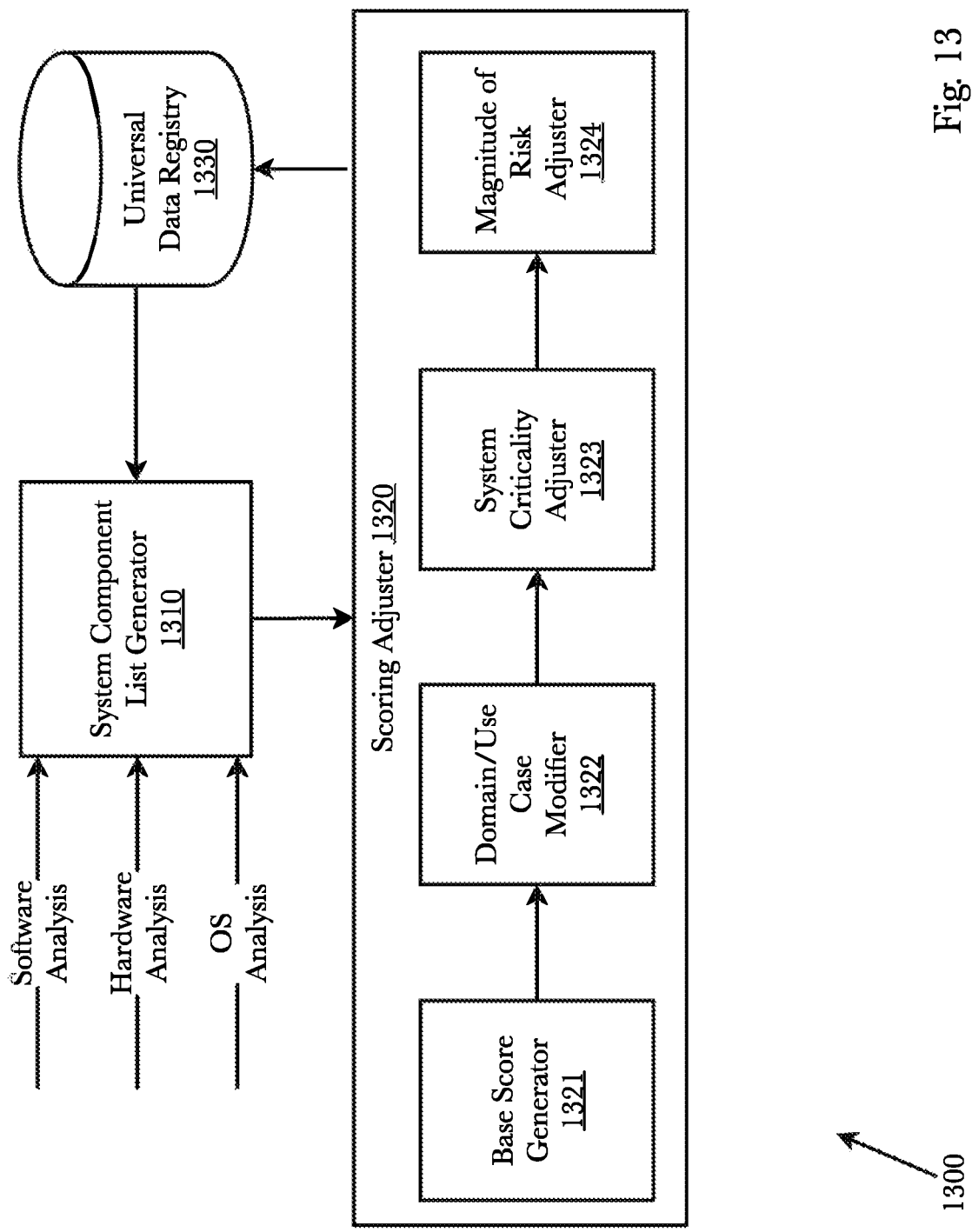
FIG. 13 is a block diagram showing an exemplary architecture for a scoring engine for a holistic computer system cybersecurity evaluation and scoring system.

FIG. 13 is a block diagram showing an exemplary architecture for a scoring engine 1300 for a holistic computer system cybersecurity evaluation and scoring system. The separate software, hardware, and operating system analyses are fed into a system component list generator 1310, which compiles a comprehensive list of all system components (in a manner similar, for example, to a bill of materials for manufactured or constructed projects). This comprehensive list can be compared with a universal data registry 1330 to determine whether similar or identical systems have been evaluated and scored in the past, in which case the prior evaluation and scoring may be used to speed up the analysis or avoid some or all of the evaluation process. In some embodiments, the system component list generator 1310 receives a list of all identified software, hardware, and operating system components before the software, hardware, and operating system analyses are conducted, and allowing for scoring to be based on prior analyses of some or all of the components of the system under test without having to repeat those analyses. The system component list generator 1310 sends the comprehensive list of system components, the results of the software, hardware, and OS analyses and any prior evaluations and scoring from the universal data registry 1330 to a scoring adjuster 1320 for scoring.

The scoring adjuster 1320 comprises a base score generator 1321, a domain and use case modifier 1322, a system criticality 1323 adjuster, and a magnitude of risk adjuster 1324. The base score generator 1321 calculates a base cybersecurity score for the system as a whole, based on all information received by the scoring adjuster 1320. The domain and use case modifier 1322 modify the score to account for the domain and/or use case in which the system will be used. For example, the base score of a given computer system may be adjusted downward if that computer system is to be used in the finance industry, where a greater level of security is required, and adjusted upward if the computer system is to be used in the retail industry where it will be used for the less critical purpose of tracking inventory. The system criticality 1323 adjuster may further adjust the score to account for the criticality of the system in overall operations. For example, even in the finance industry, a given computer system used primarily for document production will be less critical that the same system used to manage account passwords. Finally, the magnitude of risk adjuster 1324 may be used to further adjust the score based on the magnitude of the losses and/or damage that would occur if the computer system were compromised. For example, a small, desktop computer that stores passwords for access to online financial accounts would have a very large impact if compromised, so the score storage of such passwords on that computer cause the score to be reduced. The evaluation and scoring, component lists, and other information may be stored in the universal data registry 1330 for evaluations and comparisons with other systems.

Figure 14:
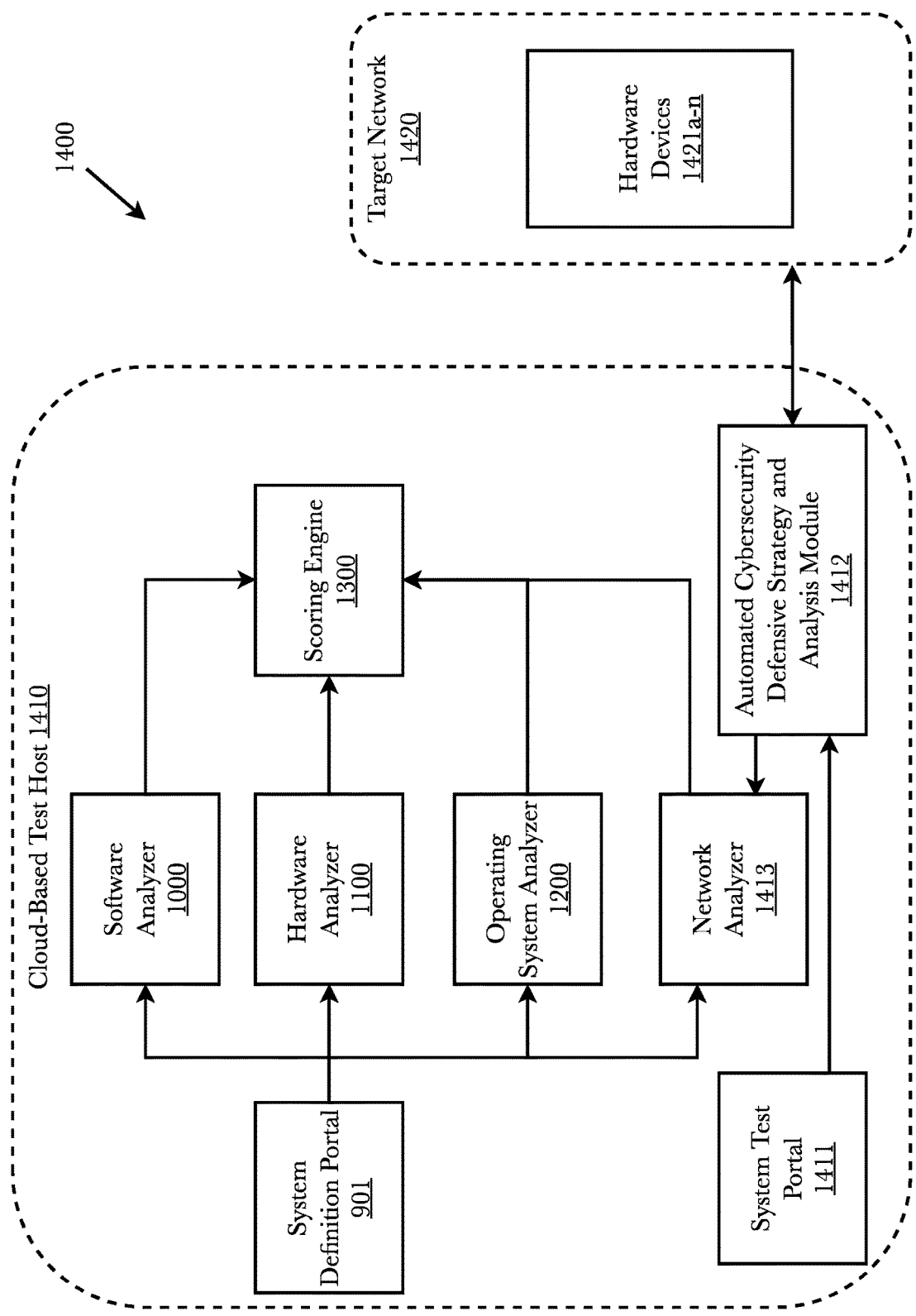
FIG. 14 is a block diagram illustrating an exemplary architecture for an embodiment of a holistic network cybersecurity evaluation and scoring system configured to provide hardware exploit testing on external networks utilizing virtualized network testing.

FIG. 14 is a block diagram illustrating an exemplary architecture for an embodiment of a holistic computer system cybersecurity evaluation and scoring system configured to provide hardware exploit testing on external networks utilizing virtualized network testing. In this embodiment, the system 1400 comprises a cloud-based test host 1410 which applies hardware emulation techniques described herein to a target network 1420 while operating outside of the target network. The cloud-based test host 1410 may be a specifically configured and/or augmented embodiment of a holistic computer system cybersecurity evaluation and scoring system which, based on the configuration, provides target network 1420 virtualized testing of an entire target network comprising a plurality of hardware devices 1421a-n and the physical and logical connections between and among the plurality of hardware devices 1421a-n via a hardware emulator. Cloud-based test host 1410 may function as a single computing device on which to emulate an entire target network 1420, or it may function as distributed system wherein two or more computing devices are used to provide target network testing and scoring. In a distributed architecture, the two or more computing devices may be disposed in a single location (e.g., data center) or the two or more computing devices may be operating in two separate locations (e.g., a first data center and a second data center). By utilizing a cloud-based architecture, system 1400 can dynamically adapt and quickly scale to meet the processing needs that may be required to emulate an entire target network 1420.

According to the embodiment, cloud-based test host 1410 may comprise a system definition portal 901, a software analyzer 1000, a hardware analyzer 1100, an operating system analyzer 1200, and a scoring engine 1300. For more details on these system components, please refer to FIG. 9. FIG. 10, FIG. 11, FIG. 12, and FIG. 13 respectively. The system definition portal 901 provides the means for a user to define the system to be tested (also known as the "system under test") in terms of its hardware, software, and operating system components. The software analyzer 1000 receives the definition of the software component of the system under test and analyzes it for cybersecurity issues. The hardware analyzer 1100 receives the definition of the hardware component of the system under test and analyzes it for cybersecurity issues. The operating system analyzer 1200 receives the definition of the software component of the system under test and analyzes it for cybersecurity issues. The network analyzer 1413 receives the definition of the hardware and the definition of the target network 1420 and analyzes it for cybersecurity issues. The scoring engine 1000 receives the analyses from the software analyzer 1000, hardware analyzer 1100, operating system analyzer 1200, and network analyzer 1413 performs additional checking and testing of the system under test as a whole, and assigns a cybersecurity rating or score to the system under test as a whole computing environment. Note that an operating system is a type of software, so references to software may include operating systems where the context allows.

With respect to the system definition portal 901, in this embodiment the system definition portal 901 is a stand-alone portal allowing for definition of the entire system under test (i.e., target network 1420), but in other embodiments, it may simply be an input component of the software analyzer 1000, hardware analyzer 1100, operating system (OS) analyzer 1200, and network analyzer 1413. Each of the software, hardware, and operating components of the system under test can be defined in several ways. One primary method of definition is specification of the component's parameters. For the hardware component, for example, the hardware may be defined by specifying the particular components that make up the hardware (e.g., the central processing unit (CPU), memory, storage, system bus, etc.), including details such as the manufacturer, date of manufacture, model number, serial number, etc., from which the performance characteristics of each part can be obtained. Alternatively, the hardware may be defined directly in terms of performance characteristics, for example specifying the bit width (or word length) of the architecture (e.g., 32-bit, 64-bit, etc.), the processor clock speed, the bus speed, and other characteristics that determine the hardware's performance. The hardware may be defined using memory maps. Memory maps are used to associate hardware components of a physical hardware system (e.g., hardware devices 1421a-n) and memory locations of the virtualized system. In other words, a memory map reproduces the memory locations used by the physical hardware of the target network 1420 to exchange information while also describing the connections between components of the physical hardware system of target network 1420 from a memory interface perspective. For example, a memory map can represent locations of information for memory registers of hardware devices 1421 of the target network 1420 as an offset from the starting memory address. Furthermore, a hardware device may be defined by the interrupt logic which can be information describing the interrupt functionality of the hardware devices 1421a-n.

For hardware, in particular, definitions by specification may be useful as the actual hardware may not be available or may be difficult to obtain, yet can often be emulated using an emulator or virtual machine. Similar definitions by specification can be made of software and operating systems, for example specifying the software name, version, etc., from which operating characteristics may be identified, or by directly specifying the operating characteristics. While it is possible to emulate or simulate the operation of software, this is typically not done as the software is usually readily available. A second method of definition is provision of the actual software, hardware, and/or OS to be tested. For example, software and operating systems can be uploaded, the actual hardware to be tested may be provided, and in some cases the entire system may be provided for testing with the software and operating system already installed on the hardware. Where physical hardware is used to define the hardware under test, the actual physical computing device may be used as the hardware under test. In some cases, the physical hardware may be physically transported (e.g., delivery, drobox, etc.), while in other cases the physical hardware may be accessed and operated locally (i.e., onsite), while in yet other cases the physical hardware may be accessed and operated remotely (e.g., via a terminal associated with the physical hardware, remote device control using a different computer, screensharing, etc.).

Cloud-based test host 1410 further comprises a system test portal 1411 an automated defensive strategy and analysis module 1412. System test portal 1411 provides the means for a user to define the test case to be tested on the target network 1420. Additionally, or alternatively, system test portal 1411 can allow for a user to configure a virtual machine and upload it to cloud-based test host 1410. Cloud-based test host 1410 can create a plurality of virtual machines based on the user configuration, thereby enabling the system 1400 to dynamically scale with the size of the target network. In some implementation, a set of clones of an emulated device, system, or network are created, and tools are injected in each clone for testing. Automated cybersecurity defensive strategy analysis and recommendation module 1412 may be utilized to perform various tasks. For example, automated cybersecurity defensive strategy (ACDS) analysis and recommendation module may be leveraged to provide simulated/emulated representations of a target network under test; a network score based on test results and analysis thereof; and the capture of system characteristics and information about the operation of the network under test during exploit testing. ASDS module 1412 may comprise a reconnaissance engine configured to capture network information about a target network 1420. The network information may comprise system information and characteristics generated by target network 1420 nodes (i.e., hardware devices, resources) associated with the target network 1420. ACDS module 1412 may leverage a cyber-physical graph which is used to represent a completer picture of an organization's infrastructure and operations, including, importantly, the organization's computer network infrastructure. Target network information captured by reconnaissance engine and the device classifications it generates may be used by hardware emulator or a machine learning simulator to create an accurate virtualized model of the target network 1420. ACDS module 1412 may also function as a centralized test generation and deployment mechanism wherein ACDS module 1412 can receive user submitted test cases from system test portal 1411 or use a plurality of tests and tools stored in the module to perform exploit testing on the target network 1420. In some implementations, the exploit testing comprises penetration testing.

Target network information may be used to define a target network and sent to network analyzer 1413 which may also receive hardware definitions from system definition portal 901 and use this information to establish a network cybersecurity score. The network cybersecurity score may be used an input into scoring engine 1300 to generate an overall cybersecurity score for a target network 1420. In some implementations, network analyzer 1413 or the functionality it provides may be integrated with ACDS module 1412, wherein the ACDS module 1412 performs automated testing and analyzes an entire virtualized target network's response to the test, and outputs a risk score which measures the vulnerability of the target network to an exploit or compromise. The risk score can be used as a network cybersecurity score which can then be fed into scoring engine 1300 as an input to determine an overall cybersecurity score for the target network 1420. For more detailed information regarding ACDS module 1412 please refer to U.S. Patent Application No. 17/567,060, the entirety of which is included herein by reference.

According to the embodiment, the system is configured to provide hardware exploit testing on external networks. In some implementations, the hardware exploit testing on external networks is provided by applying the hardware emulation techniques described herein to networks from testing hosts operating outside the target network. Testing the hardware components of a network (e.g., modems, Ethernet hubs, network switches, routers, etc.) and the connections between and among the hardware components can provide a few benefits. For example, using an external testing host 1410 provides case of management and case of deployment because it does not require a network connected resource (e.g., a computing device, hardware component, etc.) to be identified to be used as a host for the emulated environment and as a result there is no need to create tests on the machine where the emulation will occur. System 1400 leverages the fact that while emulation of hardware components is host-specific; test case needs are not. As a result, system can provide for centralized test generation and deployment to one or more target networks and/or one or more hosts in a target network.

Centralized test generation and deployment can be used to scale up the testing capabilities of the system as well as to provide test cases to various and/or multiple targets. In some implementations, system can implement modular test case components such that a user can create a test case. Examples of modular test case components may include, but are not limited to, known exploits the user wishes to test for and against, known hardware the user wants to include or not include in a test case, plug-and-play hardware configurations using known components (configurations may be user inputted, or obtained from database resources 1150 which provide hardware configuration information), and/or preconfigured rules that indicate dependencies and processes that govern interaction between hardware, software, and/or applications (e.g., Operating System, etc.). The test cases may be stored in a database and retrieved when a particular test case has been selected to be used to test the target network. Test cases can be used on various/multiple targets to improve testing speed and throughput. For example, system can allow for testing of multiple hosts in a target network with a single test case, allow for the testing of multiple networks using a single test case, or allow for scheduled testing to see if countermeasures (e.g., output recommendations) are working or if the patches have been deployed properly. In some implementations, a user, such as a customer of a cloud service, can configure an initial test virtual machine on a cloud platform. One or more components of the cloud architecture can then scale to test the service/software/hardware by creating multiple tenant virtual machines with the user configuration, can run tests, and can report results.

According to the embodiment, system 1400 is configured to provide virtualized network testing by emulating a target network 1420 hardware 1421*a-n* and connections (e.g., both physical and logical) between and among the network hardware. A hardware emulator or machine learning simulator can be leveraged to virtualize entire networks in a testing environment (e.g., cloud-based test host 1410) which provides an isolated, virtualized sandbox, then safely attack them using various attack and exploit vectors. Emulating network hardware allows the same hardware exploit testing as described herein, but with specialized hardware components and embedded system. Network emulations enable broad testing of network attacks and various compromises such as, for example, Kerberos attacks, database attacks, and man-in-the-middle attacks, to name a few. Additionally, using virtual hardware and virtual networking gives a more complete picture with a virtualized sandbox. For example, a user (e.g., individual or enterprise) may wish to know how different attacks work together to compromise a network, which is difficult if not near impossible to tell from testing a single virtual machine. As another example, using only discrete testing of virtual hardware to identify how an attacker would daisy-chain attacks to get what they want is impossible because to properly test for this scenario multiple virtual machines are needed with different hardware all connected as they would be in a live system.

Figure 15:
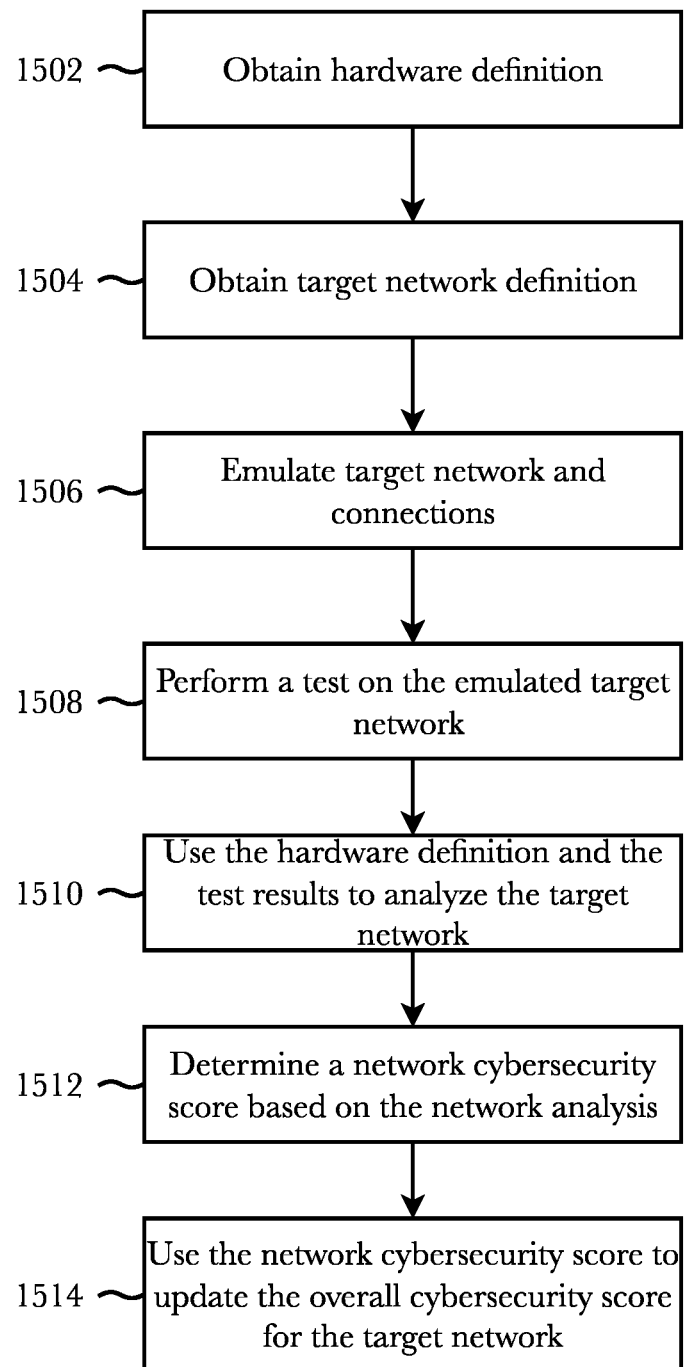
FIG. 15 is a flow diagram illustrating an exemplary method for emulating, testing, and scoring a target network using a cloud-based test host.

FIG. 15 is a flow diagram illustrating an exemplary method for emulating, testing, and scoring a target network using a cloud-based test host. According to the embodiment, the process begins at step 1502 when a hardware emulator receives, retrieves, or otherwise obtains hardware definition(s) for a plurality of hardware devices 1421*a-n* of a target network 1420. Hardware definitions may comprise operating components, performance characteristics, and/or memory maps associated with one or more of the plurality of hardware devices 1421*a-n*. Hardware emulator may also receive, retrieve, or otherwise obtain target network definitions from ACDS module 1412 or one of its components such as a reconnaissance engine at step 1504. Target network definitions may comprise network information and characteristics. Target network definitions may be used to create a cyber-physical graph representation of the target network, wherein the nodes of the graph represent hardware devices 1421*a-n* and resources, and wherein the edges of the graph represent connection and dependencies between and among the hardware devices of the target network. At step 1506 hardware emulator uses the hardware definitions and network definitions to emulate the target network in secure, isolated virtual test environment (i.e., cloud-based test host 1410). The emulated target network may be represented on a virtual machine or machines operating in a cloud environment of a cloud-based service provider. Once the entire target network, including the plurality of hardware devices 1421*a-n* and the connections between and among the network devices, have been emulated the next step 1508 is to perform a test on the emulated target network. Tests may be configured to execute an attack associated with a known hardware exploit on the emulated target network. In some implementations, the test performed on the emulated target network may comprise a penetration test. Furthermore, a penetration test may be performed on a live network and the response by the live network to the penetration test may be used as an input to create a network definition, which can then be used to emulate a virtualized version of the live network (i.e., the target network 1420).

Hardware emulator at step 1510 can use the hardware definition and the test results to analyze the target networks response to a hardware exploit test. Based on this analysis, hardware emulator can determine a network cybersecurity score at step 1512, which can be sent to scoring engine 1300 to be used as an input to update the overall cybersecurity score for the target network 1420 at step 1514. According to this embodiment, system 1400 can provide holistic network cybersecurity evaluation and scoring using a test host system operating outside the target network.

Figure 16:
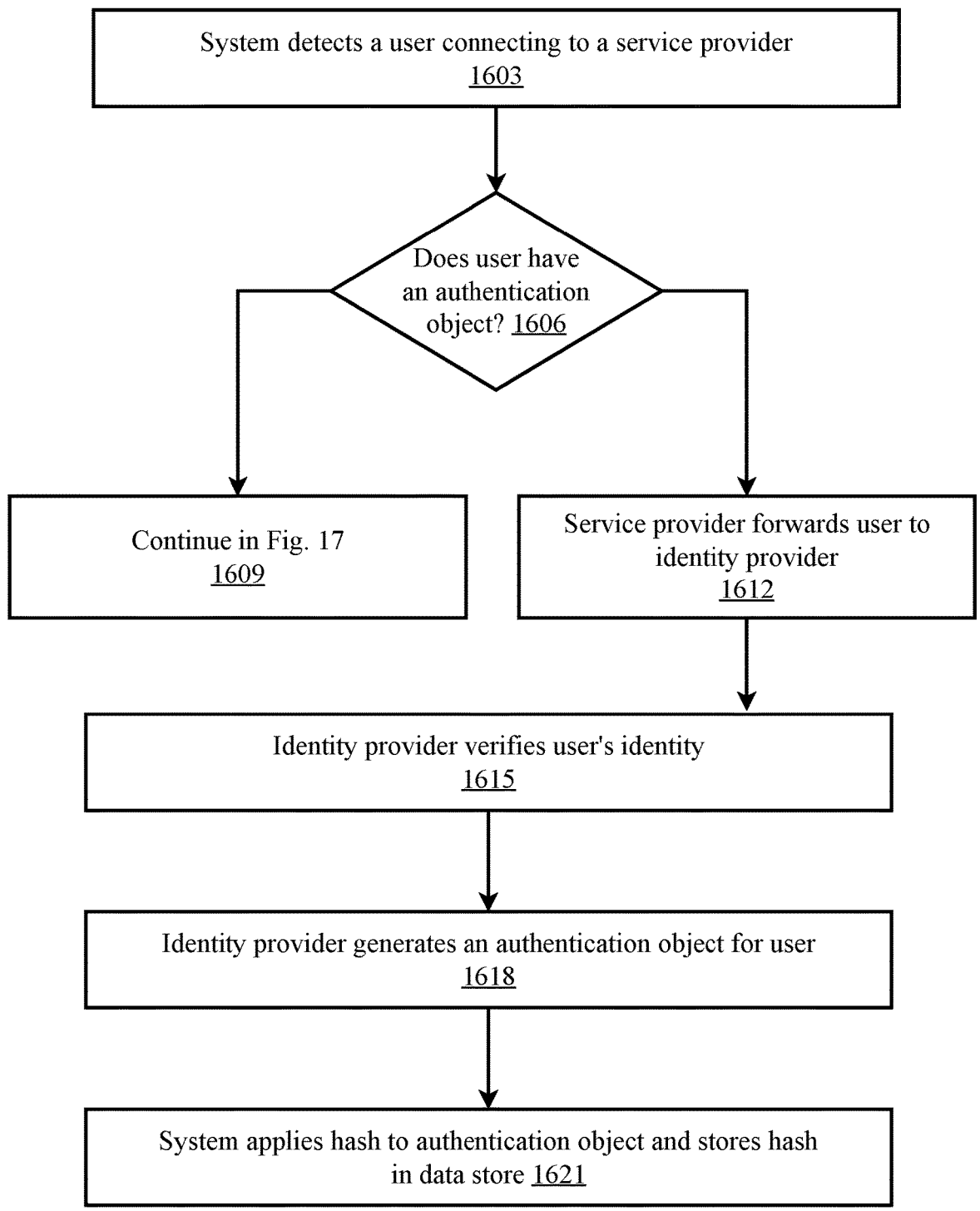
FIG. 16 is a flow diagram illustrating an exemplary method for processing a new user connection, according to one aspect.

FIG. 16 is a flow diagram illustrating an exemplary method 1600 for processing a new user connection, according to one aspect. At an initial step 1603, system detects a user connecting to a monitored service provider. At step 1606, if the user is connecting with an existing AO, the process leads to the method discussed in FIG. 17 at step 1609.

If the user doesn't have an existing AO, the service provider forwards the user to an identity provider at step 1612. At step 1615, the identity provider prompts the user for identifying information, such as a username and password. At step 1618, after successful verification, the IdP generates a unique AO for the user. At step 1621, system 910 retrieves the AO and uses a hashing engine to calculate a cryptographic hash for the newly generated AO, and stores the hash in a data store.

Figure 17:
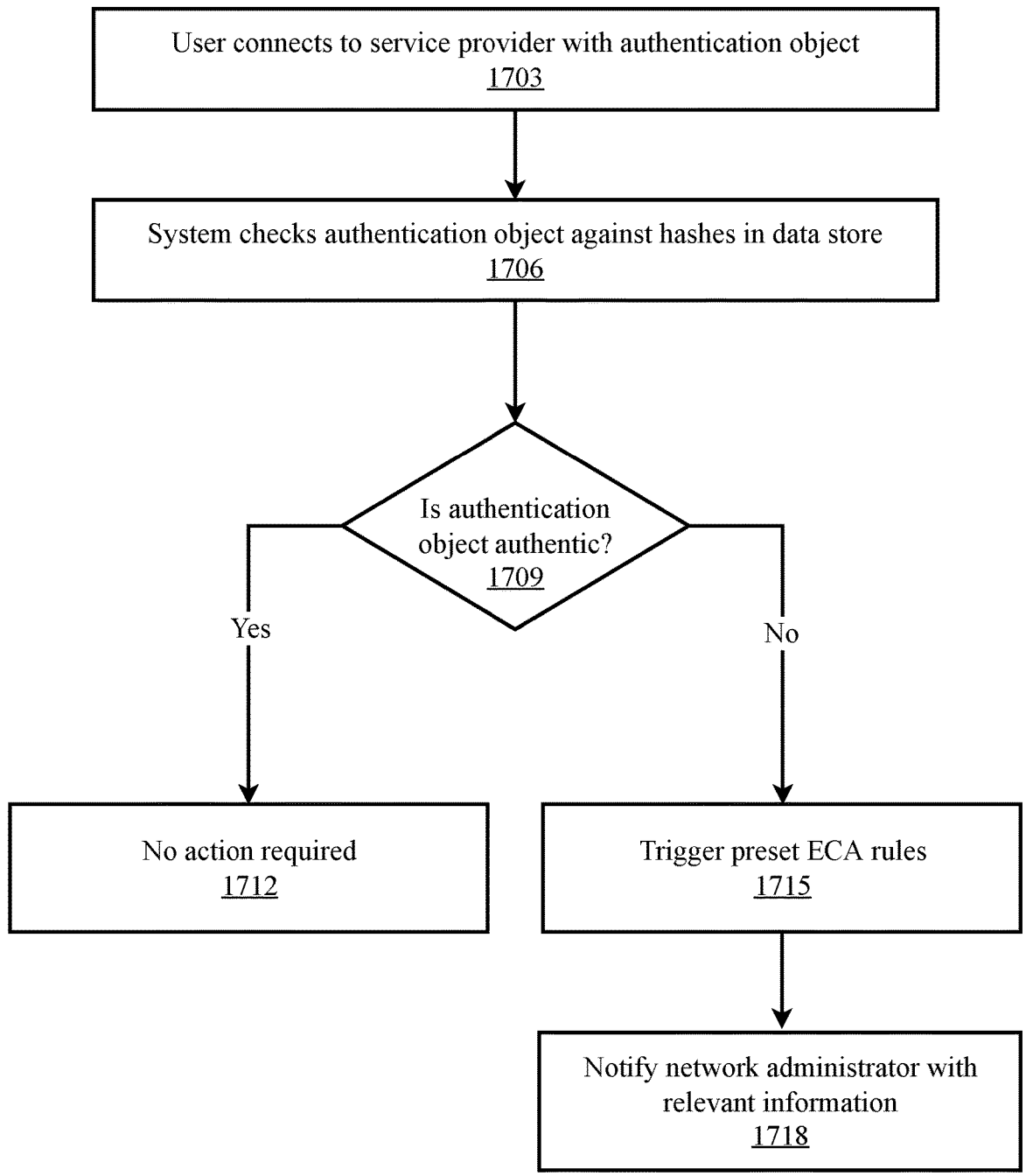
FIG. 17 is a flow diagram illustrating an exemplary method for verifying the authenticity of an authentication object, according to one aspect.

FIG. 17 is a flow diagram illustrating an exemplary method 1700 for verifying the authenticity of an authentication object, according to one aspect. At an initial step 1703, a user with an AO connects to a monitored service provider. At step 1706, system detects the connection request, retrieves the AO, and generates a cryptographic hash for the AO. System may now compare the newly generated hashes with previous generated hashes stored in memory. At step 1709, if the AO is found to be authentic, the connect proceeds as normal and method 1700 ends at step 1712 as no further action for this session is required. If the AO is determined to be forged, method 1700 goes to step 1715 where ECA rules may be triggered to perform their preset functions, and perform "circuit breaker" checks within a user-configurable time period. At step 1718, a network administrator at step may be notified, and sent any relevant information, such as blast radius, access logs for the forged AO connection, and the like.

Figure 18:
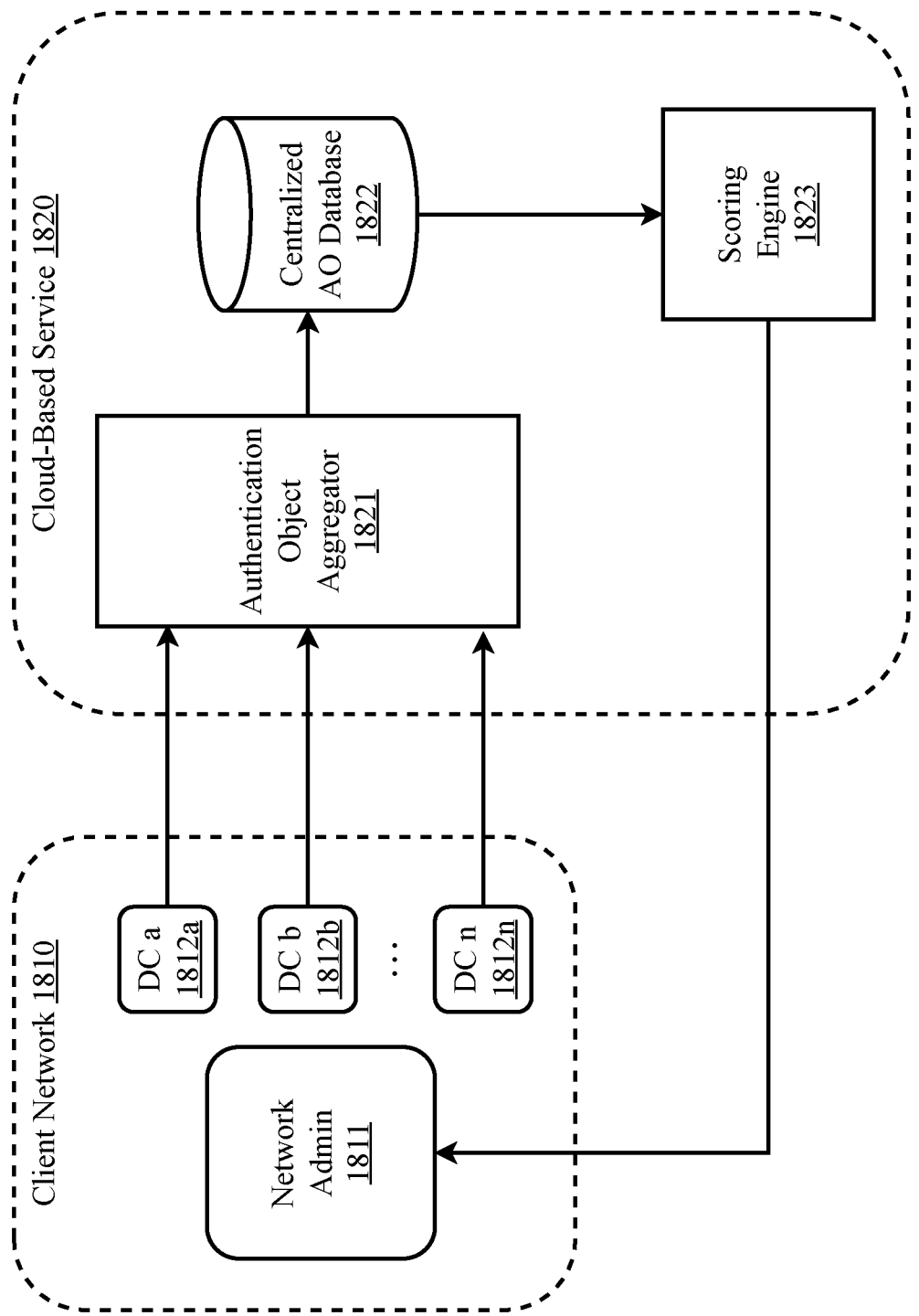
FIG. 18 is a block diagram illustrating an exemplary system architecture for a system for authentication transaction toxicity scoring.

FIG. 18 is a block diagram illustrating an exemplary system architecture for a system for authentication transaction toxicity scoring. In this example, a client network is protected by a cloud-based service 1820 which implements zero trust network security combined with stateful deterministic authentication object tracking and assessment of the level of threat already existing within a network. Client network 1810 comprises one or more domain controllers 1812*a-n*. A network administrator 1811 is responsible for establishing network access controls (NACs) which typically comprise settings for the Active Directory (AD) service for each domain controller 1812*a-n* plus implementation of some authentication protocol such as Kerberos, New Technology LAN Manager (NTML), or Security Assertion Markup Language (SAML), OpenID, OAuth operating on each domain controller 1812*a-n*. Each of these authentication protocols, however, has flaws and vulnerabilities that allow malicious actors to access resources within a network via cyberattacks such as silver ticket attacks and golden ticket attacks, in which the malicious actor is able to forge an authentication object, making it look as though it was issued by the authentication protocol. The malicious actor then uses the forged authentication object to access network resources. For purposes of clarity, Single Sign-On (SSO) is defined as a network security protocol that allows access to network resources within a single domain or organization, while a federated authentication allows access to network resources across domains or organizations. Kerberos and NTML are SSO network security protocols, while SAL, OpenID, and OAuth are federated network security protocols.

An implementation of zero trust network security which uses stateful, deterministic detection of authentication object forgeries provides greater security than heuristic methods, which rely on estimates or guesses as to whether forgeries may exist based on expected network behaviors. To implement a stateful, deterministic method of detecting authentication forgeries, a complete record of every authentication issued by a network must be kept so that the original authentication can be concretely identified for every authentication object presented for every attempted access to a network resource. This makes the detection of authentication forgeries both stateful (in that the current state of every authentication object can be determined) and deterministic (in that the validity of every authentication object presented for every request for access to network resources can be explicitly identified). Stateful, deterministic detection of authentication object forgeries provides greater security than heuristic methods, which rely on estimates or guesses as to whether forgeries may exist based on expected network behaviors.

Thus, cloud-based service 1820 comprises an authentication object aggregator 1821 for gathering of all authentication objects issued by domain controllers 1812*a-n* operating their authentication protocols, a centralized database 1822 for storing a complete record of every authentication issued by a client network 1810 so that the original authentication can be concretely identified for every authentication object presented for every attempted access to a network resource, and a scoring engine 1823 for scoring the completeness of the authentication observations, assessing the quality of the authentication observations, and assigning organization-specific penalty functions.

While this example shows a fully-cloud-based implementation in which authentication object aggregator 1821, centralized database 1822, and scoring engine 1823 are all located on cloud-based service 1820, other locations for these components are possible, including fully on-premise solutions (such as a central office location having its own server network), and hybrid solutions wherein certain components are located on-premise and others are cloud-based. For example, in another embodiment, authentication object aggregator 1821 may be located on premise so as to avoid network traffic bottlenecks, and centralized database 1822 and scoring engine 1823 may be located on cloud-based service 1820, with authentication object aggregator 1821 transmitting issued authentications to centralized database 1822 at off-peak times for network traffic.

Figure 19:
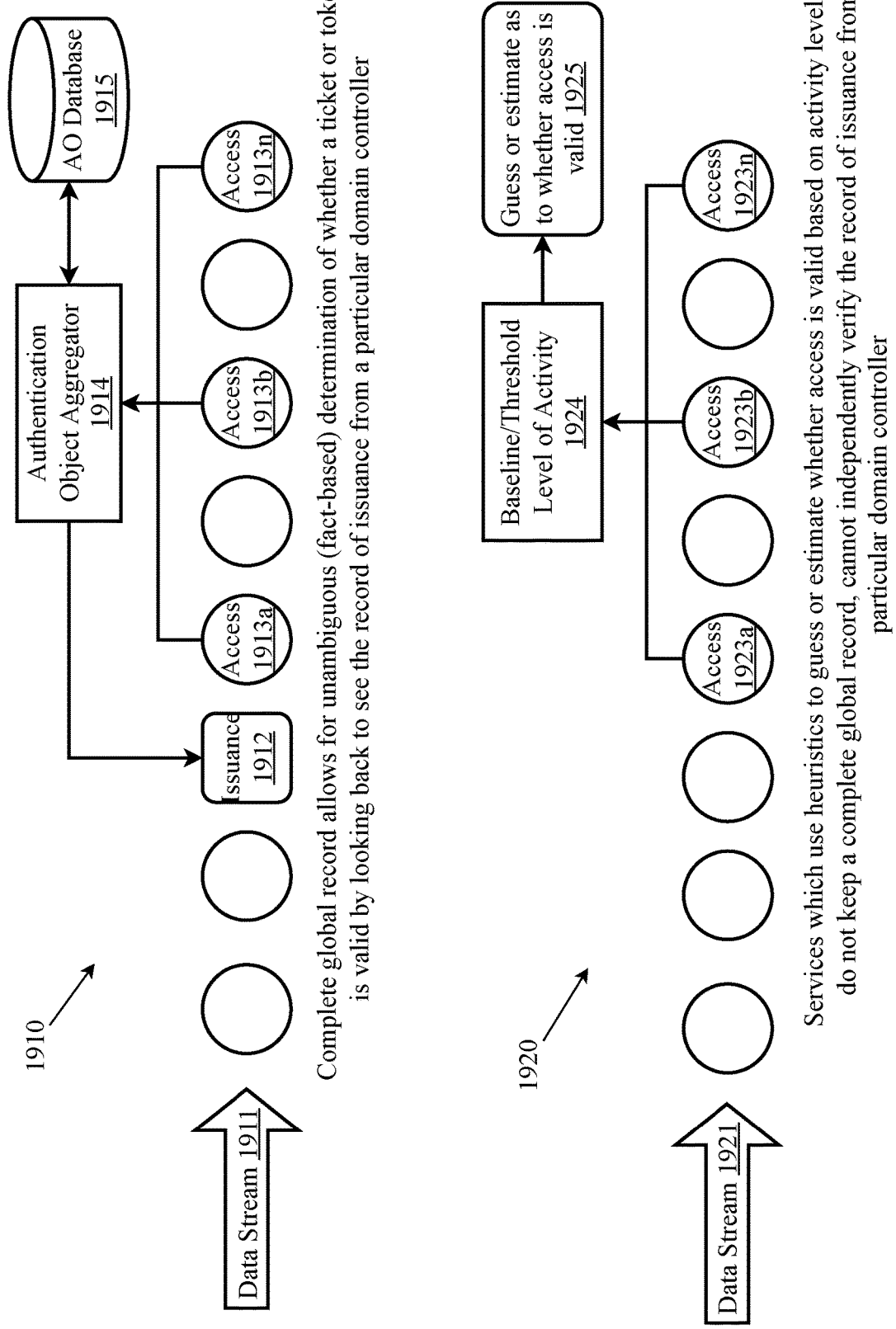
FIG. 19 is a diagram illustrating differences between global authentication record validation versus heuristic assessment validation.

FIG. 19 is a diagram illustrating differences between global authentication record validation versus heuristic assessment validation. To implement a stateful, deterministic method of detecting authentication forgeries, a complete record of every authentication issued by a network must be kept so that the original authentication can be concretely identified for every authentication object presented for every attempted access to a network resource. This makes the detection of authentication forgeries both stateful (in that the current state of every authentication object can be determined) and deterministic (in that the validity of every authentication object presented for every request for access to network resources can be explicitly identified). Stateful, deterministic detection of authentication object forgeries provides greater security than heuristic methods, which rely on estimates or guesses as to whether forgeries may exist based on expected network behaviors.

Here, heuristic detection of authentication object forgeries is contrasted with stateful, deterministic detection of authentication object forgeries. While heuristic detection is useful, it provides a lower level of protection because it relies on assumptions, estimates, and guesses instead of concrete, discretely-determinable facts.

In stateful, deterministic detection of authentication object forgeries as shown at 1910, as streams of data 1911 are received from a network every issuance 1912 of an authentication object from every domain controller of the network is gathered by an authentication object aggregator 1914 and stored in a centralized authentication object database 1915. Each time an authentication object (i.e., ticket or token) is presented for access 1913*a-n* to a network resource, authentication object aggregator 1914 checks authentication object database 1915 for existence in the database of the issuance claimed by that authentication object (i.e., ticket or token). If that issuance 1912 exists in the database, the authentication object is granted access to the requested resource. If the issuance claimed by the authentication object does not exist in the database, then the authentication object is a forgery, which is statefully and deterministically confirmed by fact that no issuance of that authentication object can be found. Thus, in stateful, deterministic detection of authentication object forgeries, the existence of forgeries are facts which can be concretely and explicitly determines.

In heuristic detection of authentication object forgeries as shown at 1920, no independent record of issuance of authentication objects is kept outside of the authentication protocol operating on each domain controller. Thus, as there is no independent, centralized way to confirm the authenticity of authentication objects, forgeries must be detected through application of heuristics (estimates, assumptions, and guesses). As streams of data 1921 are received from a network, activity levels and behaviors of the network are stored 1924 as baselines, and algorithms are applied (e.g., thresholds exceeded, unusual numbers of access requests made, accounts which have been dormant but are suddenly active, etc.) to guess or estimate as to whether access is valid 1925. For example, each time an authentication object (i.e., ticket or token) is presented for access 1923*a-n* to a network resource, that access attempt is stored as a data point. If the activity level of that authentication object suddenly increases, warnings may be issued to network administrators indicating that that authentication object may have been forged. As relies on assumptions, estimates, and guesses instead of concrete, discretely-determinable facts, it provides a lower level of protection than stateful, deterministic detection.

Figure 20:
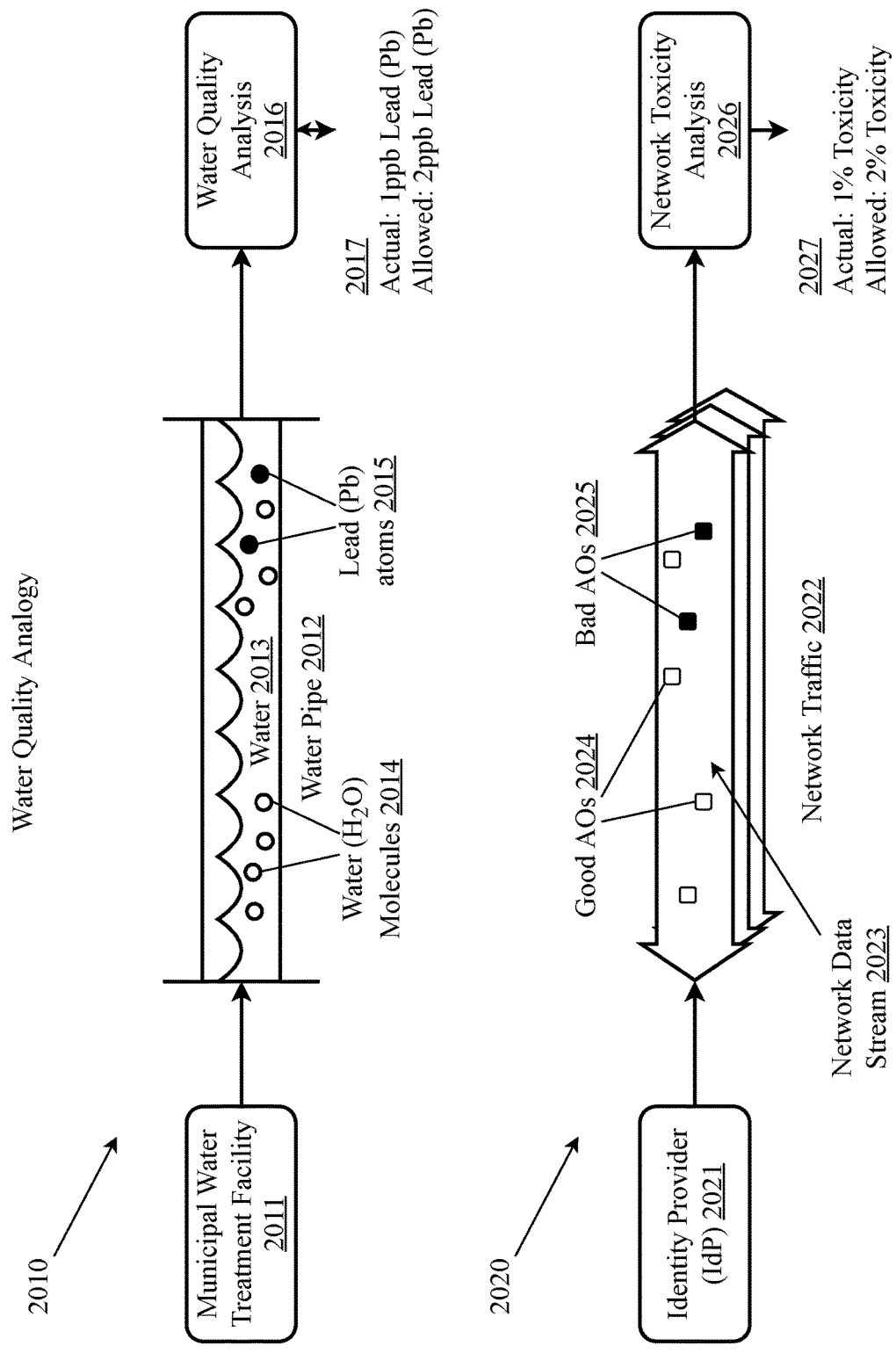
FIG. 20 is a diagram illustrating an analogy between authentication transaction toxicity scoring and water quality.

FIG. 20 is a diagram illustrating an analogy between authentication transaction toxicity scoring and water quality. One of the chief limitations of the zero trust network security paradigm is that network security (NS) and information technology (IT) staff need to consider both "good" and "bad" traffic. Detected attacks are tremendously valuable in this regard, but what is missing is the ability to measure the overall health of the authentication flow of a network. NS and IT staff need to know the ratio of good authentication traffic versus bad authentication traffic (which may be further broken down into known bad, potentially bad, and bad-looking but benign). These measures of the overall health of a network can be used to improve security and to assess the value of different security controls across IAM, PAM, PIM, and ITDR functions. As there is no perimeter security in a zero trust network (or if there is, it can't be relied upon completely), the proportions of good versus bad authentication traffic can help NS and IT staff to identify the relationship between authentication issues and broader events. It can help NS and IT staff reprioritize security information and event management (SIEM), incident investigation, or analysis based on links between identified or suspected bad authentication events and other indicators of instability (e.g., other detections or even crashes/crush dumps), authentication instability, or detected manipulation or authentication forgery.

Accordingly, a useful metric in such analysis is network "toxicity," defined as the proportion of "good" authentications in the network versus "bad" or less secure authentications. In other words, a network's toxicity is what proportion of the network's traffic comprises lower-security protocols, or what proportion of users, devices, and transactions already within a network are threats to the network's security.

Network "toxicity" can be analogized to a water quality report for municipal water systems which identifies the level of toxic substances in drinking water. For example, shown at 2010 is the water quality portion of the analogy. A municipal water system 2011 treats and provides water in accordance with drinking water regulations. Drinking water regulations are legally enforceable primary standards and treatment techniques that apply to municipal water systems. Primary standards and treatment techniques protect public health by limiting the levels of contaminants in drinking water. But having water quality standards does not ensure 100% pure water in a municipal system. In fact, contaminants are allowed to be in drinking water in limited quantities as long as the amount stays under a defined limit that has been determined to be safe for human consumption. For example, in the U.S., the chemical element mercury is highly toxic to humans, but is allowed to exist in drinking water up to 0.002 mg/L or 2 ppb. While it would be ideal not to have any toxic substances at all in municipal water systems, a perfect absence of them is impossible in any real-world water system. Therefore, acceptable limits of such contaminants have been established as a balance between health and practicality. Thus, the water 2013 contained in any given water pipe 2012 or other portion of the water system will have some high proportion of pure water (i.e., water molecules) 2014 and some small proportion of contaminants such as lead (chemical symbol Pb) 2015. A water quality report 2016 is produced on a regular basis showing the levels of contaminants 2017 in this case a lead (Pb) toxicity of 1 part per billion (ppb) actual versus 2 parts per billion (ppb) allowed (meaning that the water meets the standard even though it has some small level of the contaminant). The known levels of contaminants allow the municipal water system to make adjustments to its water treatment systems and procedures.

The levels of contaminants allowed may be different for small-scale systems (e.g., single family wells) versus large-scale systems (e.g., major municipal water systems) as they have different materials, lengths of pipe, storage capacities, and treatment methods. As a perfect absence of toxic substances is impossible or highly impractical, a balance must be struck between ensuring that water is generally safe for use within the reasonable operational constraints and associated degree of economic/life exposed to its underlying operating assumptions. However, that balance cannot be struck unless the level of contaminants (i.e., the level of toxicity) in the water is known.

The situation is similar for zero trust network security. In manner analogous to the public's reliance on the municipal water authority for provision of clean water, NS and IT professionals rely on standard Identity Providers (IdPs) 2021 to ensure that traffic within the network is clean (i.e., that only the users that are authenticated and authorized have access to data). NS and IT professionals trust that traffic is clean because it is authenticated by a trusted source. Single Sign-on (SSO) in computer networks is loosely analogous to opening a faucet on a municipal water system. We trust the water that comes out of the faucet because we trust the water source in the same way that network services trust SSO tickets and tokens presented because they come from a trusted IdP. In both cases, we have previously established trust, but in both cases do not verify quality for every ounce of water or data transaction. When we request data or resources from a Service Provider (SP), whether it's an on premise file share or cloud service, it allows us access because we provide proof from an Identity Provider, a previously trusted source, that we're allowed to do so.

Similarly, to having acceptable levels of contaminants in drinking water, there is some percentage of authentications in network traffic 2022 that may also be "contaminated" in one way or another. As with water in municipal water systems, there will be a high proportion of "good" authentications in the network data streams 2023, and a low proportion of "bad" authentication objects 2025 in the network data streams 2023. Current network security protocols have no way of measuring what portion of authentication traffic is "bad" such as authentications using weak protocols like NTLM, use of weak encryption like Rivest Cipher 4 (RC4), or even outright authentication forgeries like Golden Tickets or Golden SAML. This is true of any given IdP but even more striking when considering the common federation of Microsoft's® Active Directory and various IdP and SP infrastructure in modern enterprises. Without knowing the proportion of "good" versus "bad" authentications, it is not possible to determine what level of network "toxicity" is operationally acceptable to ensure that a network (or a process within a network) is generally safe and within the enterprise risk tolerance given the range of potential attack and disruption paths, For forgeries of Kerberos or SAML in modern systems the acceptable level may be approaching zero in much the same way that zero is the only acceptable level of lead in drinking water. However, for NTLM most enterprises have some level or risk tolerance for its use on the network as much as they would like to be rid of it. Regardless of what the imposed limit for network "contaminants" should be, the first step is measuring and monitoring the authentication contaminants in real-time with periodic snapshots/indexing of such data to support appropriate reporting and analysis. A network toxicity analysis 2026 such as that described herein below would produce the necessary information 2027 about network toxicity, for example, that the network has 1% actual toxicity versus 2% allowable toxicity. The levels of allowable toxicity will depend on a number of factors such as the type of computer network, the sensitivity of information on the computer network, the types of computing devices involved, other security measures that may be in place, and other factors.

Figure 21:
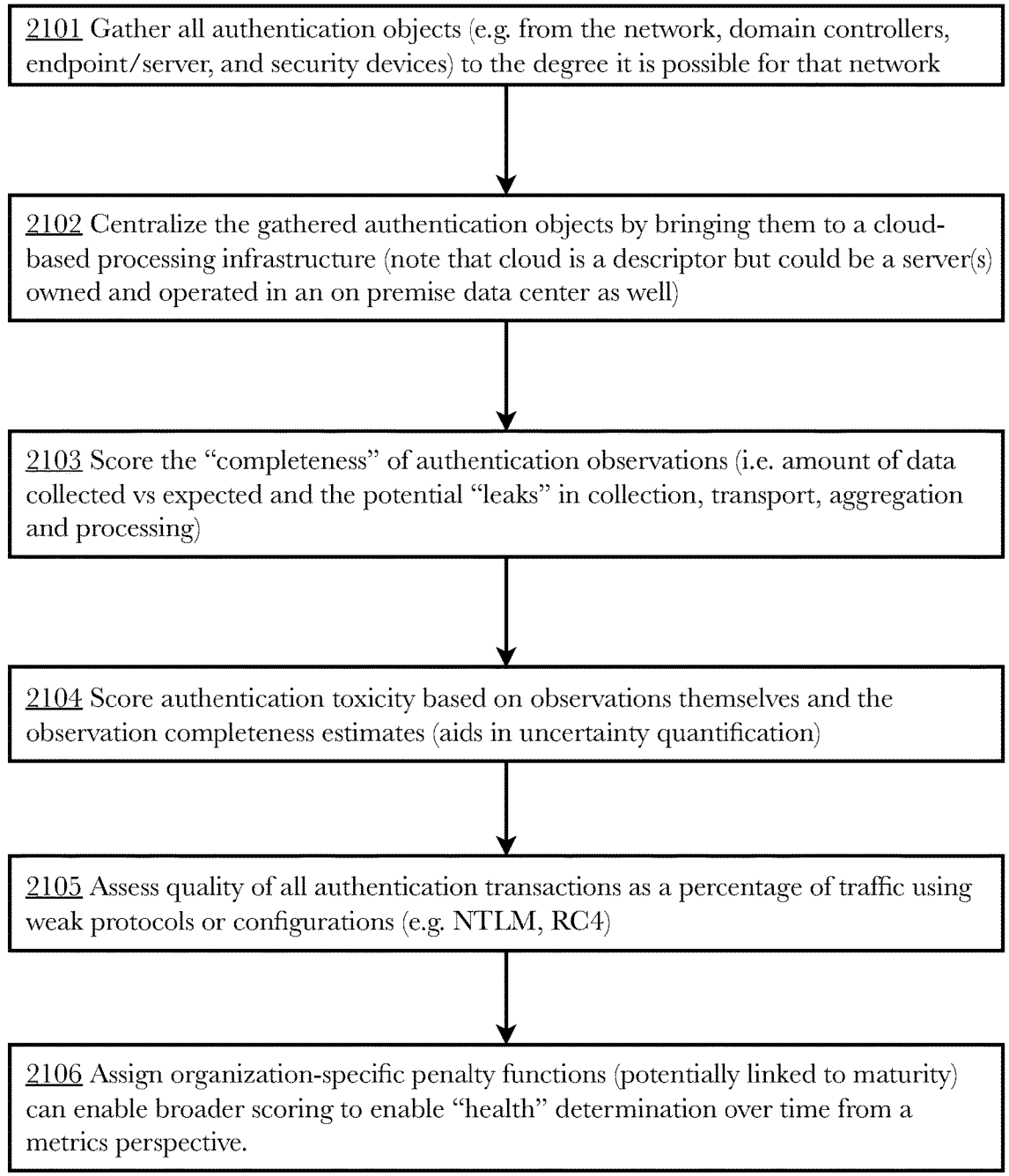
FIG. 21 is a flow diagram illustrating an exemplary method for performing authentication transaction toxicity scoring.

FIG. 21 is a flow diagram illustrating an exemplary method for performing authentication transaction toxicity scoring. At step 2101, all authentication objects are gathered from the computer network (e.g., from the network, endpoint/server, and security devices) to the degree it is possible. The amount and quality of gathered objects may vary by organization or network.

At step 2102, the gathered authentication objects are centralized by bringing them to a cloud-based processing infrastructure. Note that while this embodiment uses a cloud-based processing infrastructure, other configurations are possible, including fully on-premise solutions (such as a central office location having its own server network), and hybrid solutions wherein certain components are located on-premise and others are cloud-based.

At step 2103, an authentication observation completeness score is assigned to the "completeness" of authentication observations (i.e., amount of data collected vs expected and the potential "leaks" in collection, transport, aggregation and processing).

At step 2104, an authentication toxicity score is assigned based on observations of "good" versus "bad" authentication objects in the centralized database of gathered authentication objects. The authentication toxicity score may also take into account the authentication observation completeness score, which adjusts for uncertainty in the quality of gathered authentication objects. Inclusion of an adjustment for authentication observation completeness is particularly important for certain authentication objects as ticket granting ticket (TGT) issuances which compound the importance of those authentication objects by allowing proliferation of new authentication objects based on them. TGT issuance as a proportion of authentication objects is particularly important, so that quality of data gathered for them is important to assessing authentication toxicity. The levels of allowable toxicity will depend on a number of factors such as the type of computer network, the sensitivity of information on the computer network, the types of computing devices involved, other security measures that may be in place, and other factors. Referring again to the water quality analogy, water ppm requirements for a hospital would be more stringent than those a residential home. The balance between security and functionality is similar to water quality requirements, where 100% purity is likely impossible or unfeasible, but contamination rates are managed down to meet specific quality and observability goals based on intentional sampling.

At step 2105, the quality of all authentication transactions is analyzed as a percentage of traffic using weak protocols or configurations (e.g., NTLM, RC4), or as a percentage of known bad authentication objects, or both. Examples of notifications to network administrators would include examples such as "90% of your authentication transactions were verified as good (non-toxic)" and "1.5% of authentication objects have been detected as fraudulently issued." In some cases, a certain level of authentication contextual evidence with additional triggers/acceptance of actions may be required (e.g., requiring users with suspected bad AOs to confirm their requests for access to network resources). For example, biometrics, device IDs, operating systems, browsers, and other contextual evidence may be stored in a supplemental audit log (in a manner similar to workflows like Imprivata for hospitals involved in Opiate prescription/dispensing processes). In some cases, alerts may be triggered when levels of bad AOs exceed a given threshold.

At step 2106, organization-specific and/or network-specific penalty functions (potentially linked to maturity) may be assigned as adjustments to the AO toxicity score. These adjustments enable broader scoring to enable "health" determination over time from a metrics perspective. For example, penalties and bonuses may be assigned based on the types of network security protocols detected in the gathering of authentication objects, as described in the exemplary matrix of organization-specific penalty functions shown in FIG. 22.

FIG. 22 shows an exemplary matrix of organization-specific penalty functions. Different network security protocols have different vulnerabilities. Thus, as AOs are gathered, their types can be determined, and bonuses or penalties can be applied to the authentication toxicity score. For example, an exemplary matrix of organization-specific penalty functions is shown at 2210, wherein the vertical axis 2211 of the matrix represents different types of security protocols for which AOs may have been gathered, and the horizontal axis 2212 of the matrix represents different settings within each security protocol. The intersections of the vertical and horizontal axes represent the penalties assigned for each combination of types and settings. Thus, the following bonuses and penalties are represented in the matrix:

NTLM without logging or visibility→−2 per event; NTLM with web express logons (WELs)→−1 per event Kerberos without logging or visibility→−0.75 per event; Kerberos with logging/heuristics→+1; Kerberos with stateful validation→+1.5

SAML without logging or visibility→−0.75; SAML with logging/heuristics→+1; SAML w/stateful validation→+1.5

In an embodiment, the bonuses and penalties may be represented as a fraction wherein the numerator is the sum of all transaction counts multiplied by the penalty per transaction, and the denominator is the sum of all transaction counts. This would result in a very poor score for an NTLM heavy network (dangerous) and a very good score in a fully instrumented Kerberos/SAML+stateful validation case. Thus, application of organization-specific or network-specific bonuses and penalties enables exploration of the correlation between authentication toxicity levels within network topologies and network hosts.

Figure 23:
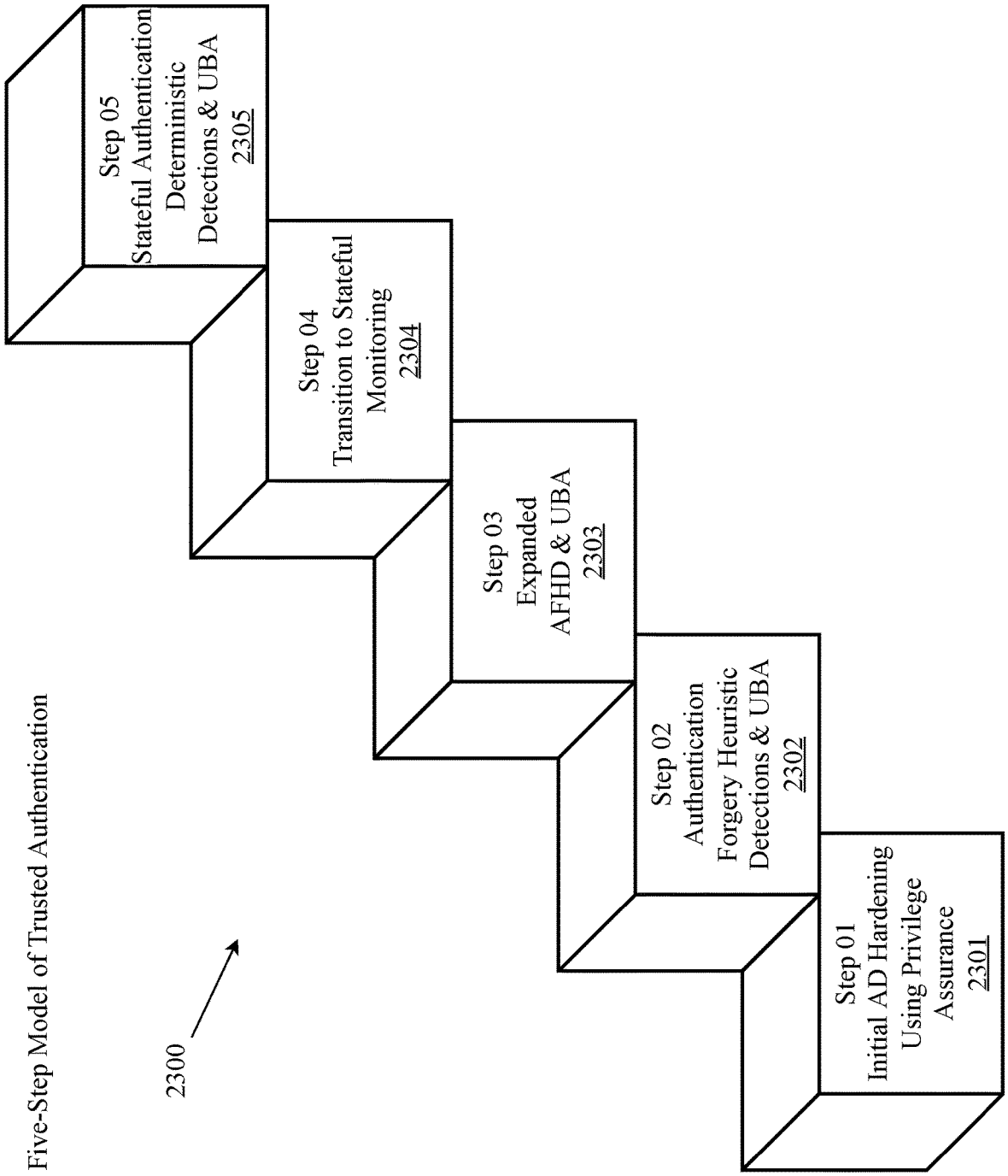
FIG. 23 is a diagram illustrating an exemplary five-step model of trusted authentication for computer networks.

FIG. 23 is a diagram illustrating an exemplary five-step model of trusted authentication for computer networks. Step 01 2301 of the model comprises initial Active Directory (AD) hardening with privilege assurance protections. Here, Active Directory and federated identity environments are mapped using a privilege assurance engine. This ensures that a comprehensive map of users, groups, hosts, domains, etc. is available and identifies the assets and trust relationships that should be considered. Since integrated indicators of exposure and compromise and remediation steps are provided, this can provide cost and time effective improvements to security posture as part of an organization's network security initiatives.

Step 02 2302 of the model comprises enabling authentication forgery heuristic detections and user behavioral analysis (UBA). With a clear map in hand from Step 01 2301, focused teams can now make intelligent decisions about how to approach instrumenting their environment. The map provides an understanding of critical assets and their relationships, but more information is needed to view and understand the nature of ongoing interactions between all system components. The highest value initial component analysis requires identifying and understanding the nature and location of all protocols, encryption types, and trusts used across the holistic identity environment. To gain insight into how authentication works in reality, collection of Windows Event Logs, Kerberos and SAML transaction data is needed to provide the network with identity assurance, which complements the privilege assurance of Step 01 2301 by providing real-time collection and analysis of the identity information.

Step 03 2303 expands coverage of authentication forgery heuristic detections and UBA from Step 02 2302. Once domain controllers have been configured to feed behavioral analytics and protocol information to network administrators to provide visibility into network security, the steps toward trusted authentication can begin. At this Step 03, all domain controllers are instrumented with identity assurance collectors and all web express logons (WELs) are available. This enables comprehensive visibility into Tier0 infrastructure from a security and availability perspective and allows for enhanced detections of NTLM, Kerberos, and SAML based attacks.

Step 04 2504 starts the transition to stateful monitoring of authentication forgery detections. With comprehensive visibility across the entire Kerberos and SAML authentication transaction stream, the identity assurance implementations of previous steps enable network administrators to maintain a real-time view of all valid tickets in Kerberos or tokens in SAML. By keeping track of every valid request for a ticket or token and every valid issuance of a ticket or token, these identity assurance implementations enable a centralized "ledger" of valid credentials. This allows for stateful validation of Kerberos and SAML at the protocol level and aids in identifying and modernizing (and eventually sunsetting) NTLM. This trusted authentication of continuously validated Kerberos and SAML systems in standalone and federated configurations coupled with complementary behavioral analysis, detection analytics, indicators of exposure, indicators of compromise and known attack signatures is a substantial improvement in gaining and sustaining control over network security.

Step 05 2305 involves full stateful authentication forgery deterministic detections and UBA. This provides substantially greater protection than existing network security protocols. As an example, silver ticket (ST) attacks are increasingly common in advanced attacks and ransomware events, and stateful authentication forgery detection allows all six basic elements of a Kerberos handshake to be fully observed and cataloged. This additional information is useful in rapidly detecting attacks in even simple Active Directory (AD) environments but even more so in complicated configurations (e.g., networks using trusts and delegations)

where the basic 6-way handshake is more complicated and involved (e.g., across trusts or with delegations).

Figure 24:
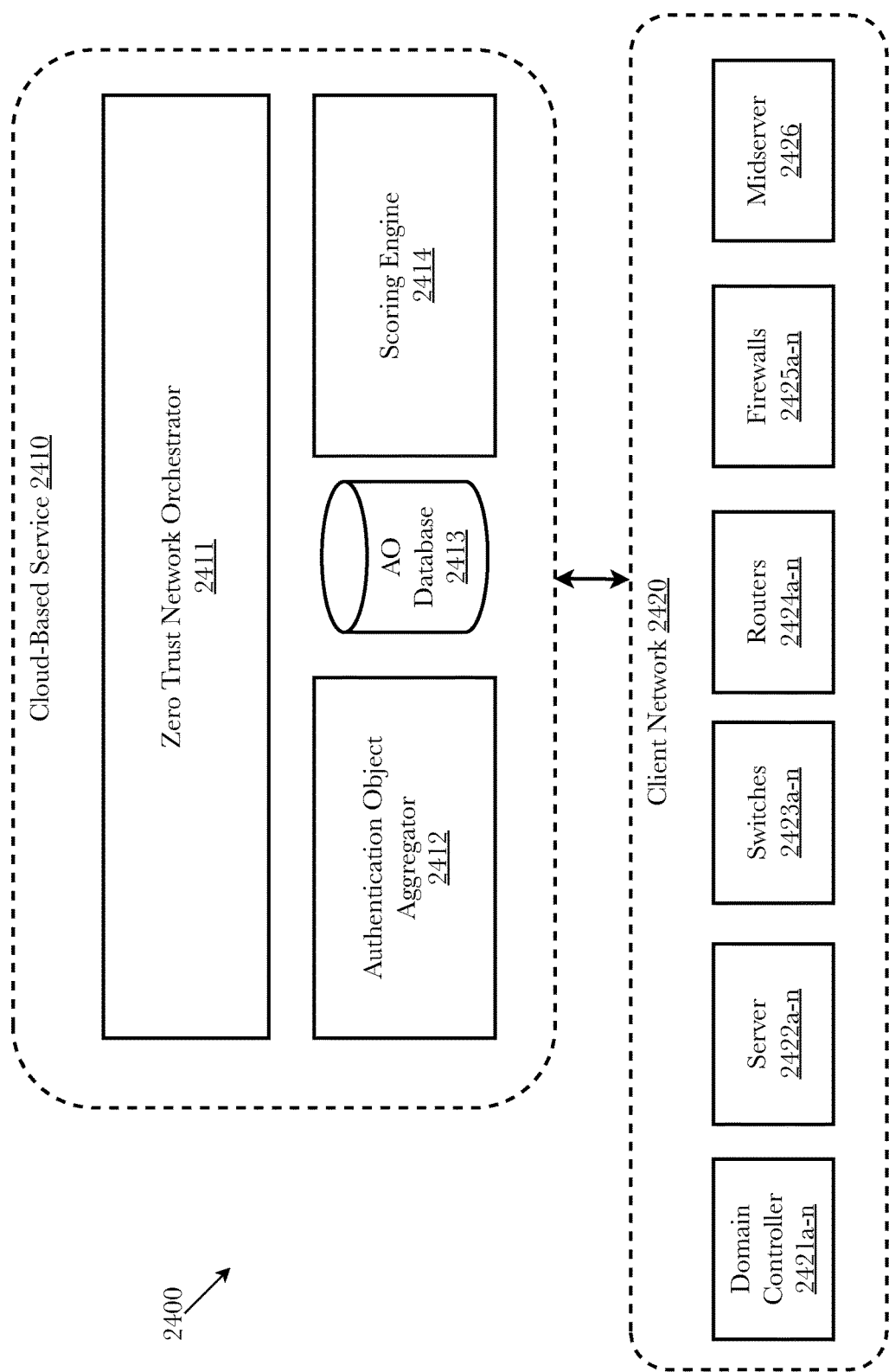
FIG. 24 is a block diagram illustrating an exemplary system architecture for providing dynamic authentication attack detection and enforcement at the network, application, and host level, according to an embodiment.

FIG. 24 is a block diagram illustrating an exemplary system architecture 2400 for providing dynamic authentication attack detection and enforcement at the network, application, and host level, according to an embodiment. The system is configured to provide a zero trust network architecture and cybersecurity paradigm by implementing stateful authentication protocol, heuristic, and behavioral analysis utilizing multiple sources of stateful data sourced from a client network 2420 including domain controllers 2421a-n, member servers 2422a-n, endpoints and network devices such as switches 2423a-n, routers 2424a-n, and firewalls 2425a-n. Further, system improves upon existing policy-based zero trust network architectures by continuously collecting, monitoring, and measuring network device state information. Device state feeds into the system security state estimation of the device used for authentication and the state of a given user or service account. This can include, for example, but not limited to, local account information and privileges, historical usage/application connectivity, which users and associated privileges access the device, vulnerabilities and defensive tooling/observation capabilities on the device, and/or the like.

According to the embodiment, the system may comprise a cloud-based service 2410 which can provide an authentication object aggregator 2412 which monitors and collects all authentication objects associated with a client network 2420 and creates an authentication object database 2413 or ledger which can be used to provided deterministic authentication and identity assurance by providing an immutable records of all authentication objects (e.g., Kerberos tickets, SAML tokens, RADIUS attributes, etc.) which are valid within a given network. A zero trust network orchestrator 2411 (ZTNO) is present and configured to process massive streams of data (e.g., network, host, application, and device state data), analyze the stateful information in real-time, and perform dynamic authentication attack detection and enforcement at the network, application, and/or host level. A scoring engine 2414 is present and configured to determine various scores associated with authentication objects such as a dynamic authentication risk score and a dynamic privilege risk score, which can be used to inform ZTNO 2411 processes and actions. The risk scores are dynamic in that they are based on currently available state data and can change as data is gathered and the network monitored.

A zero trust network orchestrator 2411 (ZTNO) is present and configured to process massive streams of data, analyze the stateful information in real-time, and perform dynamic authentication attack detection and enforcement at the network, application, and/or host level. In some implementations, ZTNO 2411 utilizes a distributed processing engine for stateful computations over unbounded and bounded data streams. A stream event may be the plurality of stateful authentication transactions that are occurring at any given moment in a client network 2420 and may be collected from various host-based mechanisms (e.g., custom hardware, firmware, etc.) and/or other methods. For example, ZTNO 2411 support for distributed processing can enable chains of Kafka topics and Flink stages for analysis of authentication transaction data, enable maintenance of in-memory state of authentication tickets and tokens for Kerberos and SAML, respectively, and can enable dynamic publication of the entire, or subset, of valid (or suspicious) or some combination of tickets and tokens to devices on the network.

In some implementations, ZTNO 2411 may provide dynamic triggers of more expensive and invasive analytics based on one or more cursory stream processing or manual actions (e.g., looking for leaks in the "stateful" processing pipelines in situations where the data completeness drops below thresholds of interest. Similarly, looking at detailed audit log changes in active directory from lightweight directory access protocol change detection stream following detections around suspicious user actions. Part of this analysis may include looking at such modification histories to dynamically triggers deeper analytics in an automated manner with results sent directly to an enterprise analyst or administrator.

In some implementations, ZTNO 2411 may leverage a cyber physical graph to generate "routing tables" for subsets of the ticket/token publication scheme which can enable sufficiently efficient approaches to distributing the combined authentication "knowledge" across network operations and defense devices for defensive purposes. Again, this can include authentication specific elements or broader risk-based elements that can include the additional device or user state or posture information that could be optionally influenced by historical behaviors of the device, user or both. This can include the concept of specific interventions alongside one or more of the tickets, users, accounts, etc. Such that a "report only" or "actively disrupt/drop" kind of intervention can be suggested or required. Additionally, applications of this by Group or other "tags" used in the CPG which enable various (even conflicting) policies for active reporting or response to be determined in the cloud and then condensed and sent as targeted instructions to devices.

According to an embodiment, system 2400 is configured to periodically provide asynchronous updates (e.g., instructions) to network 2420 or host devices with an intervention list of credentials which may be of interest, potentially malicious, or known to be malicious. This can enable a variety of potential interventions on the endpoint or network devices including "sinkholing" the associated requests affiliated with such a credential alongside reporting back on the attempted use of the credential. It may also be advantageous to let the credential be used and to track/instrument the resulting behavior of the network or impacted computer to gain information about the threat actor's goals or intent (or to gain evidence for prosecution).

Application-specific integrated circuits (ASICs) are custom designed hardware components built for specific tasks, allowing them to perform these tasks more efficiently than general-purpose CPUs. Such ASICs may be used by network devices to accelerate packet processing and deep inspection of network traffic. Such ASICs can be leveraged to inspect packets and identify authentication objects, such as Kerberos, SAML, RADIUS, or NTLM, by performing various steps.

In some implementations, client network 2420 may comprise a mix of host and network based sensors. For example, sensors could be placed (e.g., span port or Gigamon style devices) or could be integrated into hardware at the network/switch layer. In at least one embodiment of the disclosed system, active measures on the network and/or host devices to potentially take blocking actions or "sinkhole" traffic associated with traffic that is identified as malicious. This can occur at higher level processes or directly at the network interface card (NIC) endpoints. Similarly, for switches and firewalls, this could leverage existing IDS/IPS/firewall hardware or software or could rely on a new auxiliary logic circuit (e.g., a new dedicated ASIC or FPGA device on new hardware) that could be responsible for specifically decrypting Kerberos, NTML, and SAML/Oauth2 related authentication objects and taking action or modifying them.

Network detection and response (NDR) solutions are designed to detect and respond to threats within a client network 2420 by analyzing network traffic and identifying anomalies or signs of malicious activities. However, they may fail to observe all authentication exchanges (e.g., Kerberos, SAML, NLTM, and RADIUS) due to the following reasons: highly varied routing, encrypted traffic, and distributed architecture. To overcome these limitations, organizations can employ host-based agents to efficiently capture all authentication data. Host-based agents can be installed on the relevant servers, such as service principal names, key distribution centers, active directory federation services, AD connect, SAML identify provider, and service provider servers, to name a few. This approach ensures comprehensive monitoring of authentication exchanges, as the agents can directly access the data on the host systems.

By combining host-based agents with NDR solutions or capabilities embedded inside networking hardware at the switch, router, firewall and access points, organization can achieve a more comprehensive and efficient monitoring of authentication exchanges, enhancing their overall security posture and ability to detect and respond to potential threats.

According to an embodiment, a scoring engine 2414 is present and configured to determine (e.g., compute, calculate, derive, infer, etc.) one or more risk scores associated with an authentication object, network, application, host, and/or enterprise based on various contexts including, stateful information associated with a network device, user, or service, IP history, user behavior, device history, application usage history, cyber reconnaissance data, and/or the like. Scoring engine 2414 may be configured to determine an authentication risk score associated with an authentication object, a network device, an application, and/or a host. Authentication risk measures deviation from a user's typical behavior during a sign-in request, classifying it as low, medium, or high risk. In some implementations, an authentication toxicity score or scoring model may be used as an input when determining an authentication risk score. In addition, scoring engine 2414 can be configured to determine an application risk score. An application risk score may be generated by determining the sensitivity of an application and its stored data to a potential attack.

Scoring engine 2414 can also be configured to compute a privilege risk score associated with an authentication object, a network device, an application, and/or a host. Privilege refers to the level of access or authority granted to a user, process, or system within network environment. It determines the actions a user or system can perform and the resources they can access. It may generally be expressed through user roles, permissions, or levels of authority. In some implementations, a cyber physical graph (CPG) may be created and referenced as a component when determining a privilege risk score. A CPG represents an organizations entire network and provides a visual and navigable graph representation of a network's devices, applications, users, groups, protocols, etc. as well as additional context about the relationships between and among said network components.

In various implementations, ZTNO 2411 may receive, retrieve, or otherwise obtain one or more of an authentication risk score, a privilege risk score, and a cybersecurity risk score associated with an authentication object, a network device, an application, and/or a host. ZTNO 2411 may compare the received one or more risk scores with a predetermined threshold value and based on the comparison determine whether to intervene in an authentication transaction. The predetermined threshold value may be set by an organization based on its appetite risk. For example, the privilege risk score associated with a device is calculated to be 0.6 and an organization has set a policy which indicates a privilege risk score of 0.5 as the threshold value, wherein if that threshold value is exceeded, then an intervention should occur. In some implementations, the interventions may be based on whether the intervention is occurring at the network, application, or host level. In some implementations, an intervention may be directed to creating and sending a report about the suspicious behavior. In other implementations, an intervention is directed to actively disrupting or dropping authentication transactions such as, for example, credential blocking, sinkholing an authentication event, terminating an application session, blocking or stopping a process on the impacted host or server, and/or the like.

The aggregate "risk score" applied to any authentication event enables comprehensive scoring of the Kerberos, SAML/Oauth2, NTLM, or remote authentication dial-in user service (RADIUS) authentication protocols.

RADIUS is a client-server protocol primarily used for network access control. It enables access servers to authenticate users and authorize their access to the requested system or service. RADIUS is considered a stateless protocol, as it does not maintain a continuous connection between the client and server during the authentication process. Each request and response are treated as independent transactions. Some common attacks against RADIUS include brute-force attacks, dictionary attacks, replay attacks, and man-in-the-middle attacks.

Protocol monitoring using packet capture is a technique for capturing and analyzing network traffic in real-time or from stored data. This method can be employed to detect RADIUS attacks by monitoring and analyzing the traffic between RADIUS clients and servers. By inspecting the packets transmitted between these devices, potential security threats and anomalies can be identified. There are a few ways protocol monitoring using packet capture can detect RADIUS attacks including, but not limited to, unusual traffic patterns, suspicious packet content, unusual source or destination IP addresses, replay attacks, and insecure or outdated protocol usage. Monitoring the packet capture can reveal abnormal traffic patterns, such as a sudden increase in RADIUS requests or a high rate of failed authentication attempts, indicating a potential brute-force or dictionary attack. By analyzing the content of RADIUS packets, system can identify unusual or malicious attributes. For example, a packet with the incorrect or unexpected RADIUS shared secret, a malformed attribute, or an unknown RADIUS message type might indicate an attempt to compromise the RADIUS server. Monitoring the packet capture can reveal traffic originating from or directed to unexpected IP addresses, indicating potential unauthorized access attempts or man-in-the-middle attacks. By analyzing timestamps and sequence numbers of RADIUS packets, the system can detect replay attacks, in which an attacker captures and retransmits a valid RADIUS packet to gain unauthorized access. Packet capture analysis can identify the use of insecure or outdated RADIUS protocols, which may be more susceptible to attacks. By detecting and alerting on these outdated protocols, organizations can take steps to update their systems and improve their security posture.

To effectively detect RADIUS attacks using packet capture, it is important to establish a baseline of normal RADIUS traffic patterns and behaviors. This baseline can be used to identify deviations and anomalies that may indicate an attack. Additionally, using network intrusion detection and prevention systems (IDS/IPS) in conjunction with packet capture analysis can further enhance the detection and mitigation of RADIUS attacks.

According to the embodiment, zero trust network orchestrator (ZTNO) 2411 may provide credential revocation as an intervention method to maintain security and enforce zero trust principles. ZTNO can provide credential revocation at various levels including at the host, KDC, network, and application levels. At the host level, the system 2400 monitors the local authentication events and detects anomalies, forgeries, tampering, or misuse of credentials. By ensuring that only validly issued, recorded, and authorized credentials are used to access resources at the host level, the ZTNO 2411 prevents unauthorized access and maintains the integrity of the system. In case of any detected compromise, ZTNO 2411 can revoke the affected credentials, effectively stopping any potential security breaches.

At the key distribution center (KDC) level the KDC is responsible for managing and distributing cryptographic keys within the Kerberos authentication protocol. Authentication object aggregator 2412 and AO database 2413 build and maintain a real-time ledger of valid Kerberos tickets (e.g., or SAML tokens or other authentication objects.), ensuring that only legitimate tickets are accepted by the KDC. By continuously validating the tickets and monitoring the KDC's interactions, the system can detect and revoke compromised credentials, thus preventing attackers from gaining unauthorized access to resources within the network.

At the network level, the system collects and analyzes authentication transaction data across various protocols, including (but not limited to) NL™, Kerberos, and SAML. This allows system 2400 to identify potential attacks, such as encryption downgrade or pass-the-ticket attempts, and respond accordingly. By revoking the compromised credentials at the network level, the system stops attackers from exploiting the network infrastructure to gain unauthorized access to resources. This process can be supported using network authentication toxicity scoring as a context when analyzing authentication transaction data to identify potential attacks. Applications that use authentication protocols like SAML and OAuth2 can benefit from the system's stateful validation and heuristic detection techniques. By monitoring the authentication events and tokens at the application level, the system can identify, and revoke forged or stolen tokens, ensuring that only authorized users can access the application. This helps to maintain a secure application environment and enforces the zero trust principles at the application level. Credential revocation techniques at the host, KDC, network, and application levels provide a comprehensive security approach that enforces zero trust principles. By continuously monitoring, validating, and revoking compromised credentials across various layers, system 2400 ensures a strong foundation for a secure and reliable authentication process.

A result of this ability to send Kerberos transaction revocation instruction to a KDC or to drop them at the network level and force a new attempt for a ticket (e.g., a ticket granting ticket) means that the composite approach also reduces the potential for false positives and can enforce stateful validation. The ability to trigger new Kerberos transactions enable the system to enforce reauthentication meaning the system can reduce potential challenges associated with missed or dropped tickets/exchanges at the KDC or service or user endpoint. It can also address potential for data loss between collection and cloud processing as an additional resilience measure to enhance confidence in gaining stateful validation/enforcement of the protocol.

A particular use case for system 2400 is directed to the detection and response of damaging attacks such as NTLM relay. TLM relay can be difficult to detect overall because NTLM is largely insecure with respect to authentication protocols. At its core NTLM relay is a man-in-the-middle attack. The way it works is an attacker wants to gain access to something and doesn't have permissions, but other systems on the network do have access. NTLM relay is a technique of standing between a client and a server to perform actions on the server while impersonating the client. Just as authentication object aggregator can create a ledger of authentication objects, the ZTNO 2411 can be configured to curate a dynamic list of approved domain controller (DC) accounts or hostnames. The dynamic in-memory list of active DC hostnames (with optional archiving as snapshots during change events, like an audit trail) is used for detections and the list may be accessed via a rules pipeline. The DC controller list is dynamically maintained and used to detect NL™ relay attacks on domain controllers in a client network.

According to some implementations, a midserver 2426 may be present and configured for collecting, aggregating, analyzing, filtering, transforming, and securely transmitting data, data transfers, and interactions with a cloud-based service 2400, typically co-located with the enterprise domain controller (or Active Directory (AD) server) 2421*a-n* for exploration of network-enabled directories and to control access to and authenticate security requests on the network for other connected servers 2422*a-n*. In cases where network devices are capable of feeding data to midserver 2426 or directly to a cloud service edge, the additional telemetry data provided by midserver can be incorporated into risk score calculations, authentication toxicity computations, and cyber threat analysis. A midserver 2426 in this implementation may be used for streamlined communications with a cloud-based service 2410 including a single point of connectivity with the service, a ticket form of security adding further security to such a connected system, and a batch method of data transfer, allowing numerous other servers 2422*a-n* or endpoints or log sources to communicate with midserver 2426 which then collates data for transfer to a cloud-based service 2410 (e.g., ZTNO 2411, authentication object aggregator 2412, etc.), which may further collate data received from the cloud-based service 2410, for case of analysis and which allows for other forms of network optimization to take place which are not present in systems where numerous endpoints and servers maintain individual connections to a cloud-based service 2410, also allowing for new data sources including servers 2422*a-n* and endpoints to be added swiftly and integrated into the system for connection to the cloud-based service rapidly and easily due to midserver 2426 acting as an interface between the service 2410 and the other possible client network 2420 components. For more detailed information on midserver and its applications, please refer to U.S. patent application Ser. No. 18/186,605 the entirety of which is incorporated herein by reference.

In some implementations, system 2400 may perform one or more functions to perform uncertainty quantification wherein the system (e.g., data stream management engine 120) secks to "approximate" non-observed data via intentional sampling from continuously observed data as well as periodically observed data (e.g., packet capture using a system tool or a third party tool such as Wireshark) for a period of time.

Figure 25:
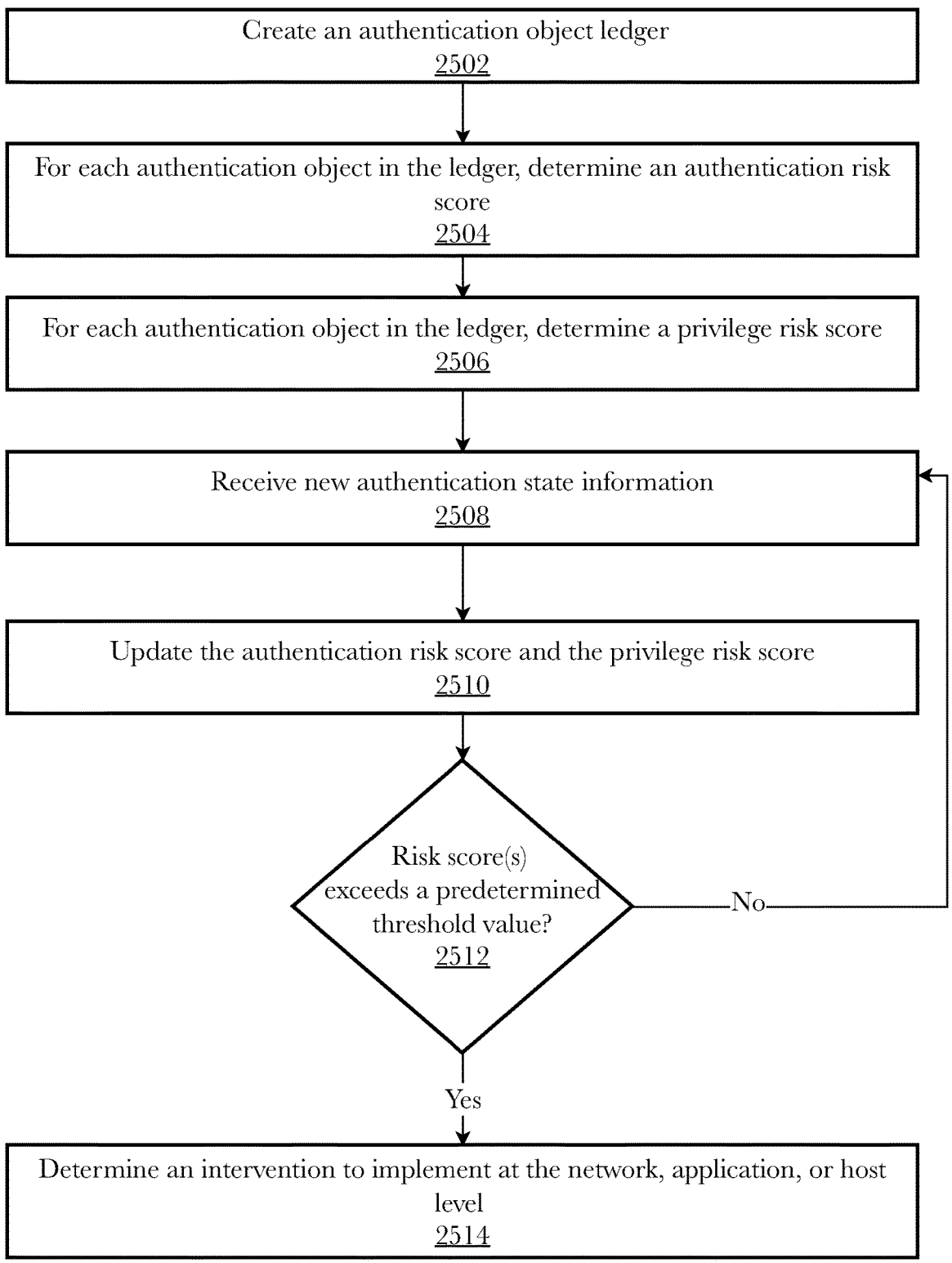
FIG. 25 is a flow diagram illustrating an exemplary method for providing dynamic authentication attack detection and enforcement, according to an embodiment.

FIG. 25 is a flow diagram illustrating an exemplary method for providing dynamic authentication attack detection and enforcement, according to an embodiment. According to the embodiment, the process may be carried out using one or more of the various system components illustrated in FIG. 24. According to the embodiment, the process begins at step 2502 when an authentication object aggregator 2412 collects a plurality of authentication transaction data and creates an authentication object ledger. The ledger may store a plurality of authentication objects (e.g., tickets, tokens, attributes, etc.). For each authentication object in the ledger, at step 2504, determine an authentication risk score using scoring engine 2414. Likewise, for each authentication object in the ledger, determine a privilege risk score at step 2506. At step 2508 ZTNO 2411 receives new authentication state information from various sources such as, for example, midserver 2426, host-based monitoring agents, and custom hardware (e.g., ASIC) integrated on network devices. This new state information can be used by scoring engine 2414 to dynamically updated one or more of the authentication risk score, the privilege risk score, and the overall network cyber threat risk score at step 2510. Because ZTNO 2411 supports highly scalable distributed processing and in combination with host-based agents, it is capable of continuous monitoring and data aggregation, which in turn lends itself to dynamic risk scoring used to inform network authentication transaction intervention implementations. At step 2512 the updated risk scores are compared against one or more predetermined threshold values, which may be set by an organizational administrator. If the threshold value has not been exceeded, then the process continues to step 2508 as new information is received so are the risk scores updated. If instead, the risk score does exceed the threshold value, then the process continues to step 2514 wherein ZTNO 2411 determines an intervention to implement at the network, application, or host level based on available information such as, for example, authentication transaction details, attack paths associated with a network device, and organizational policy.

Figure 26:
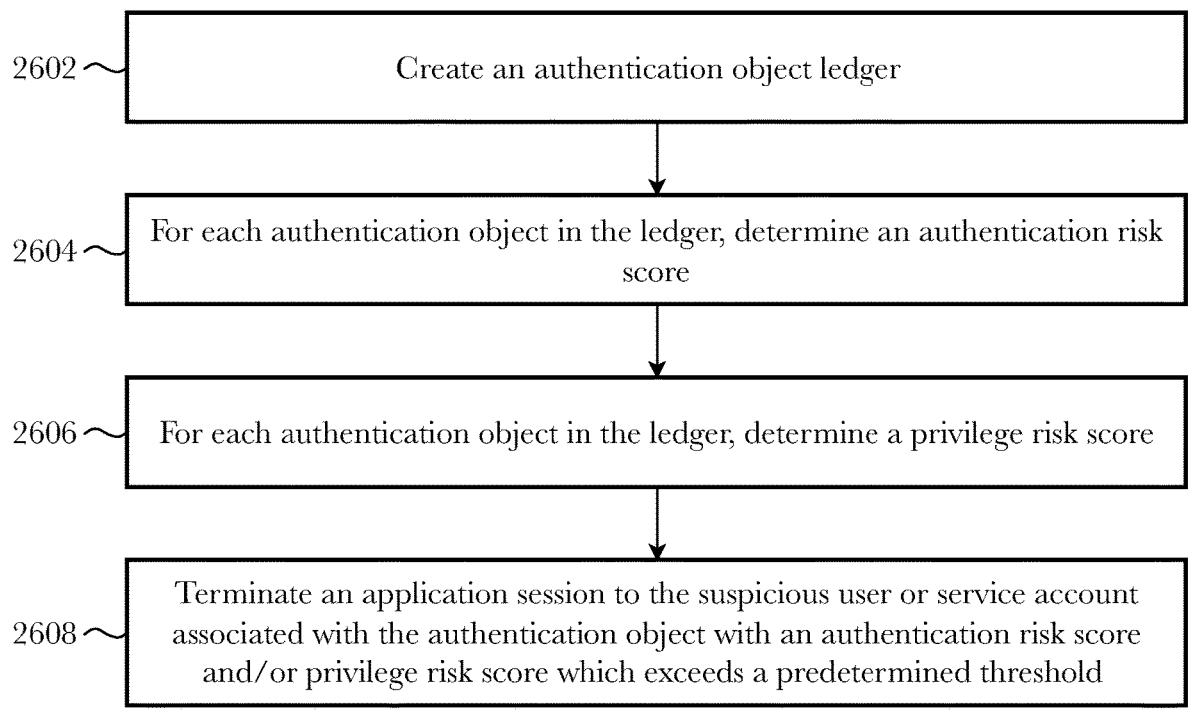
FIG. 26 is a flow diagram illustrating an exemplary method for providing an intervention at the application level, according to an embodiment.

FIG. 26 is a flow diagram illustrating an exemplary method for providing an intervention at the application level, according to an embodiment. According to the embodiment, the process begins at step 2602 when an authentication object aggregator 2412 collects a plurality of authentication transaction data and creates an authentication object ledger. The ledger may store a plurality of authentication objects (e.g., tickets, tokens, attributes, etc.). For each authentication object in the ledger, at step 2604, determine an authentication risk score using scoring engine 2414. Likewise, for each authentication object in the ledger, determine a privilege risk score at step 2606. At step 2608, ZTNO 2411 determines an authentication risk score and/or privilege risk score has exceeded a predetermined threshold value and determines the risk is associated with an application authentication transaction and selects an appropriate intervention. For example, ZTNO 2411 can terminate an application session to the suspicious user or service account associated with the authentication object whose risk score(s) exceeded a threshold value.

Figure 27:
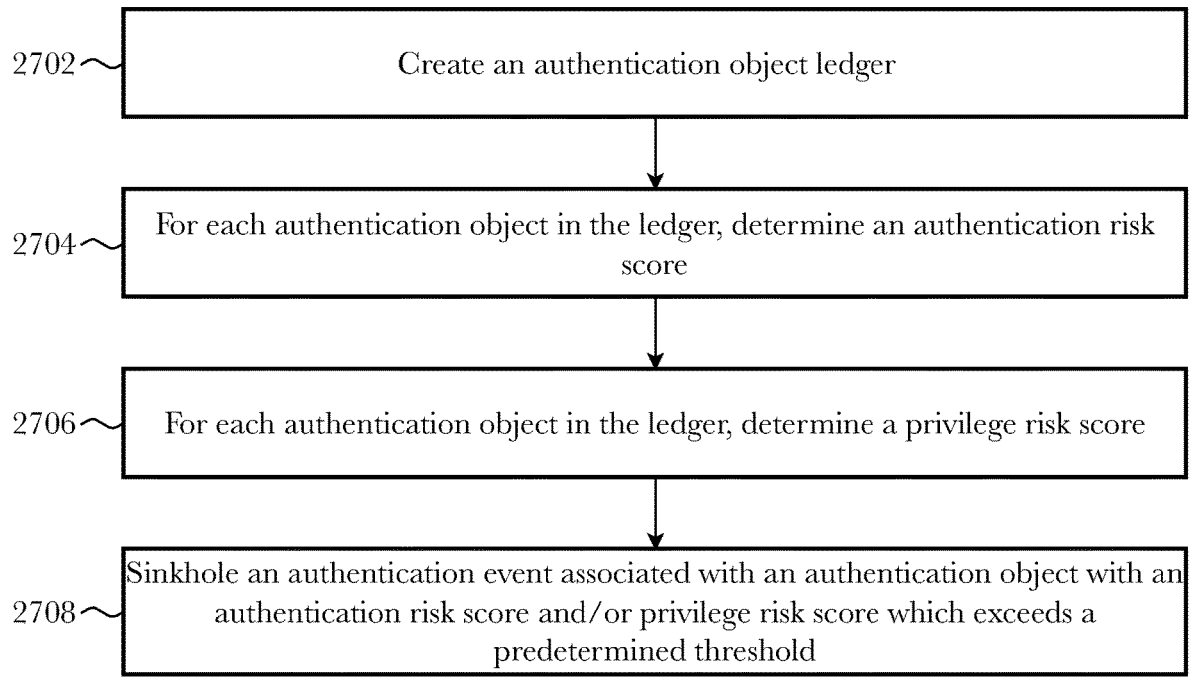
FIG. 27 is a flow diagram illustrating an exemplary method for providing an intervention at the host level, according to an embodiment.

FIG. 27 is a flow diagram illustrating an exemplary method for providing an intervention at the host level, according to an embodiment. According to the embodiment, the process begins at step 2702 when an authentication object aggregator 2412 collects a plurality of authentication transaction data and creates an authentication object ledger. The ledger may store a plurality of authentication objects (e.g., tickets, tokens, attributes, etc.). For each authentication object in the ledger, at step 2704, determine an authentication risk score using scoring engine 2414. Likewise, for each authentication object in the ledger, determine a privilege risk score at step 2706. At step 2708, ZTNO 2411 determines an authentication risk score and/or privilege risk score has exceeded a predetermined threshold value and determines the risk is associated with a host's authentication transaction and selects an appropriate intervention. For example, ZTNO 2411 can sinkhole an authentication event associated with the authentication object whose risk score(s) exceeded a threshold value.

Figure 28:
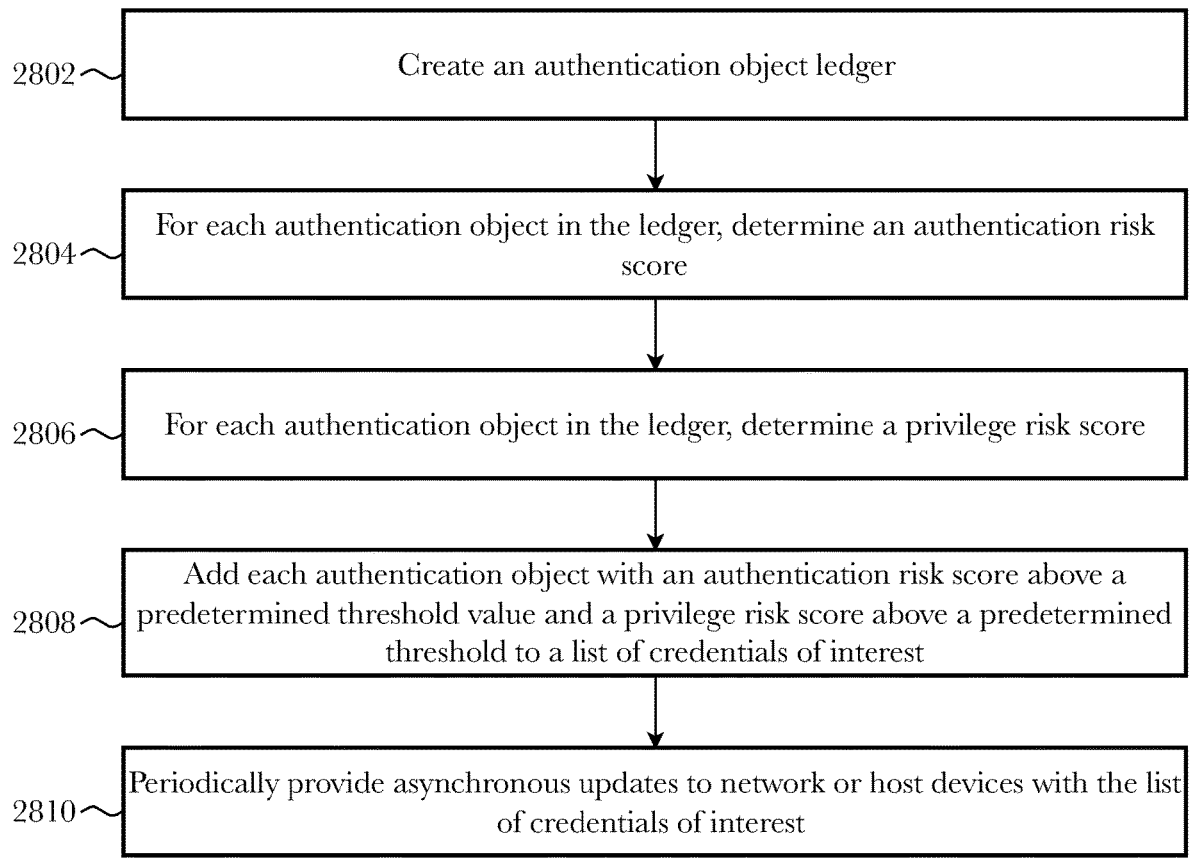
FIG. 28 is a flow diagram illustrating an exemplary method for providing an intervention list to network or host devices, according to an embodiment.

FIG. 28 is a flow diagram illustrating an exemplary method for providing an intervention list to network or host devices, according to an embodiment. According to the embodiment, the process begins at step 2802 when an authentication object aggregator 2412 collects a plurality of authentication transaction data and creates an authentication object ledger. The ledger may store a plurality of authentication objects (e.g., tickets, tokens, attributes, etc.). For each authentication object in the ledger, at step 2804, determine an authentication risk score using scoring engine 2414. Likewise, for each authentication object in the ledger, determine a privilege risk score at step 2806. At step 2808, ZTNO 2411 determines an authentication risk score and/or privilege risk score has exceeded a predetermined threshold value and adds the authentication object to an intervention list of credentials of interest. At step 2810, ZTNO 2411 may periodically provide updates to network or host devices with the list of credentials of interest. This list may be used by custom hardware integrated with network hosts or devices to perform packet capture and comparison schemes, according to an embodiment.

Figure 29:
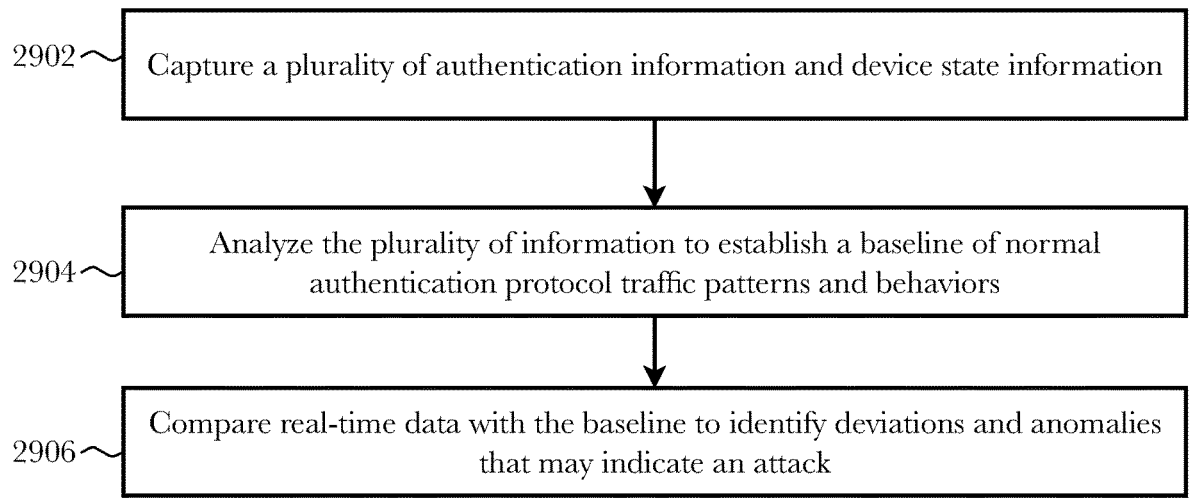
FIG. 29 is a flow diagram illustrating an exemplary method for determining if an intervention is required using a baseline comparison, according to an embodiment.

FIG. 29 is a flow diagram illustrating an exemplary method for determining if an intervention is required using a baseline comparison, according to an embodiment. The process begins at step 2902 when ZTNO 2411 captures, receives, retrieves, or otherwise obtains a plurality of authentication information and device state information from multiple sources of data. Such information can include local account information and privileges, historical usage/application connectivity, which users and associated privileges access the device, vulnerabilities or defensive tooling/observation capabilities on the device, and/or the like. At step 2904 ZTNO 2411 can analyze the plurality of information to establish a baseline of normal authentication protocol traffic patterns and behaviors. This step may be applied to specific authentication protocols (e.g., Kerberos, SAML, RADIUS, etc.) wherein there is a baseline establish for each of the applicable authentication protocols. At step 2906, ZTNO 2411 compares real-time data with the baseline to identify deviations and anomalies that may indicate an attack. Identified anomalous activity may be flagged for further intervention. In some embodiments, this process of establishing a baseline and comparing said baseline with real-world data may be used in place of a previously disclosed predetermined thresholds.

Figure 30:
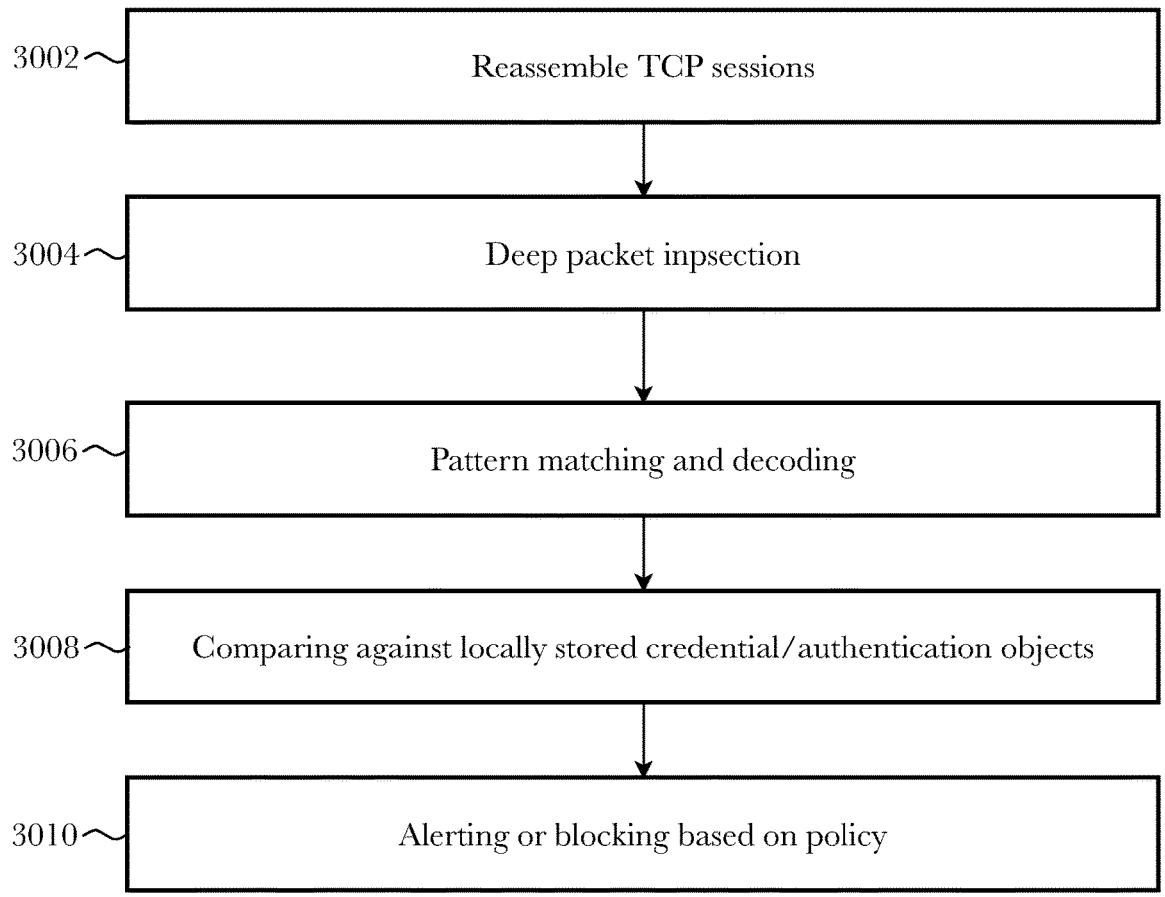
FIG. 30 is a flow diagram illustrating an exemplary method for using custom-designed hardware on network devices to inspect packets and identify authentication objects, according to an embodiment.

FIG. 30 is a flow diagram illustrating an exemplary method for using custom-designed hardware on network devices to inspect packets and identify authentication objects, according to an embodiment. In an embodiment of the system, the system comprises custom-designed hardware such as ASICs or FPGA boards integrated with network devices (e.g., switches, routers, etc.) and configured to provide efficient packet capture and inspection in real-time in order to detect potential authentication attacks and to take some intervening action if a potential attack is detected. According to the embodiment, the process begins at step

3002 by reassembling the transmission control protocol sessions. The ASIC accelerates the process of reassembling TCP sessions by offloading the task from the main CPU. This allows the network devices to analyze the complete flow of data with the session, including authentication objects and other relevant information. As a next step 3004, the ASIC is designed for deep packet inspection, enabling the network devices to analyze the content of the packets at the application layer. By inspecting the payloads of packets, the ASIC can identify specific authentication objects (e.g., Kerberos tickets, SAML assertions, RADIUS attributes, or NTLM tokens). As a next step 3006, the network device performs pattern matching and decoding. Pattern matching may utilize various information sources using various data storage methods including, but not limited to, time-series databases, graph databases, relations databases, NoSQL databases, and vector databases. Once the authentication objects are identified, the network devices can use pattern matching and decoding algorithms to extract relevant information from these objects. This may include usernames, passwords, session identifiers, or other data required for authentication.

At step 3008, a comparison against locally stored credentials/authentication objects is made. Network devices can maintain a local database of credentials or authentication objects of interest, which can be optionally salted and hashed for increased security. By comparing the extracted information from the inspected packets with the locally stored credentials, the network devices with the integrated ASIC can verify the authenticity of the authentication objects. As a last step 3010, the network devices may generate an alert, or an intervention based on policy. If the comparison reveals a mismatch or any suspicious activity, the network device can generate alerts or block the traffic based on the configured security policy. This can help prevent unauthorized access or attacks targeting authentication protocols. By utilizing ASICs (or similar) on network devices and updating those network devices with target lists from the zero trust network orchestrator 2411, the network devices can efficiently inspect packets and identify authentication objects in real-time, enabling organizations to monitor, analyze, and secure their network traffic more effectively.

Figure 31:
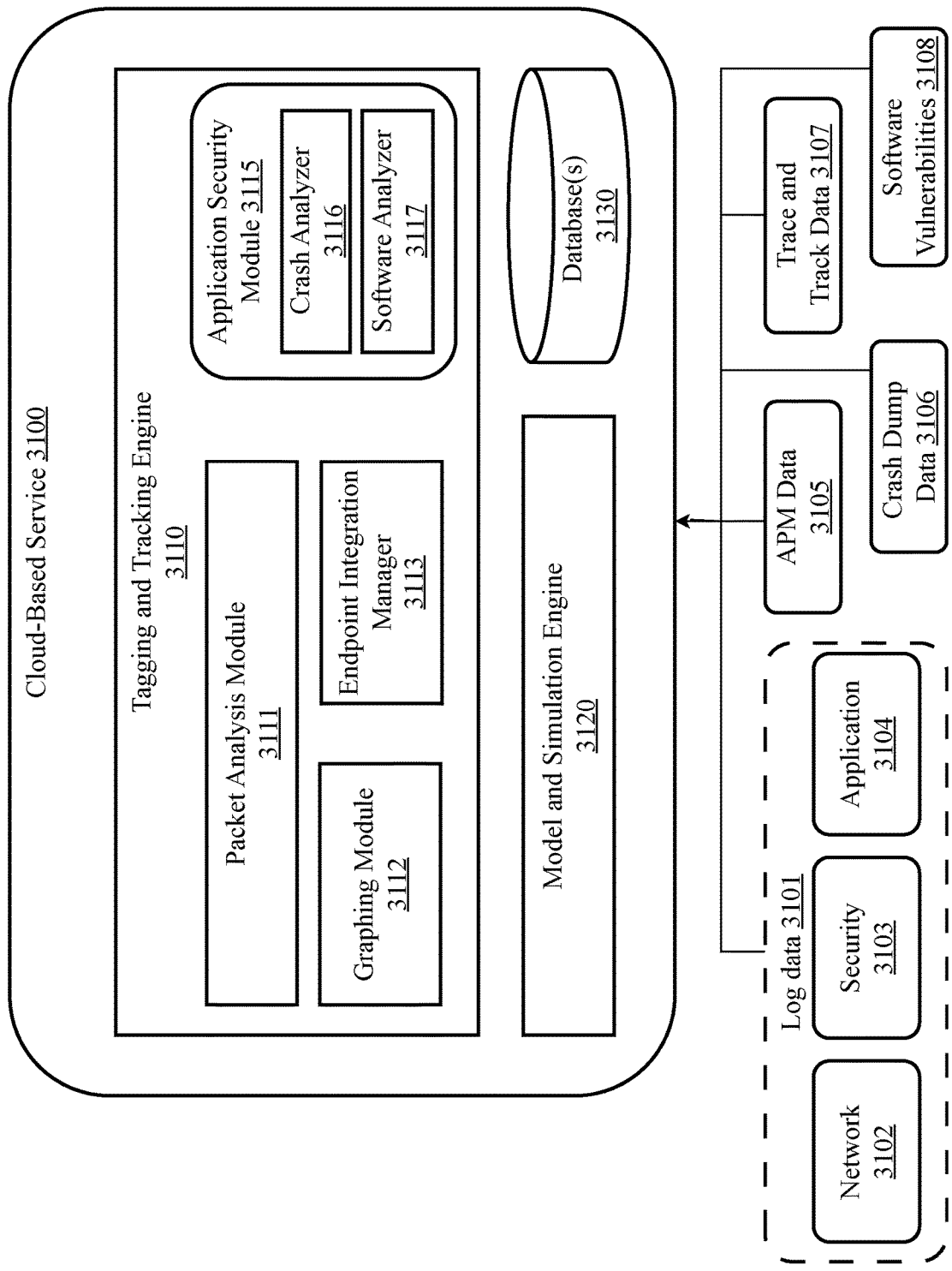
FIG. 31 is a block diagram illustrating an exemplary system architecture of a cloud-based service for providing user and entity behavior analysis utilizing network layer track and trace, according to an embodiment.

FIG. 31 is a block diagram illustrating an exemplary system architecture of a cloud-based service for providing user and entity behavior analysis utilizing network layer track and trace, according to an embodiment. The system may be configured to receive, retrieve, or otherwise obtain a plurality of network, compute, process, user, and software information, to selectively evaluate the likely utilization of data and to sample from various locations and sources for natural language processing and other techniques (including vectorization and vector databases) that can support identification of data of interest or relating to a specific risk, compliance, reporting, or handling processes (e.g., personal identifying information, HIPPA, PCI, etc.). The system may obtain a plurality of data associated with a network such as, for example, application performance monitoring (APM) data 3105, various log information 3101 (e.g., network log 3102, security log 3103, application log 3104, etc.), software vulnerability data 3108, crash dump data 3106, and trace and track data 3107 at the application level, combined with session level authentication information and network level traces through physical and logical segments of a complex system (e.g., computing system) to create a dataset from which to construct a user-level dependency map and behavioral analysis.

According to an embodiment, a tagging and tracking engine 3110 is present and configured to analyze various obtained network packets (e.g., streams of network flow data) and perform metadata tagging one the network packets based on the results of the analysis. Further, tagging and tracking engine 3110 can be configured to obtain and analyze application performance information (e.g., APM data 3105) from various sources such as, for example, third-party software monitoring/tracing tools, crash dump data 3106, software vulnerability data 3108, and/or the like. The results of the analysis of such data may be used to enrich a dataset of track and trace data which can be used to create one or more graph representations of a network and its users and processes. In some implementations, the graph representation may be a user-level dependency graph. In an aspect of an embodiment, the user-level dependency graph is created based on at least a subset of a track and trace dataset comprising one or more of application trace data, tagged packet tracking data, APM data, crash dump data, software vulnerability data, authentication object data, and network log data (e.g., security and application log data).

A user-level dependency graph (or map) is a visual representation of the dependencies between different software components or modules at the user of application level. It provides a high-level view of how different components within a network interact and rely on each other to fulfill user or application requirements. The user-level dependency graph focuses on the relationships between and among components from the perspective of user interactions or application flows. It helps in understanding the dependencies between different features, functions, or modules of an application and how they contribute to the overall functionality. The graph visually represents the dependencies between different components, allowing stakeholders (e.g., enterprise security analysts) to understand the flow of data, control, or functionality with an application. By analyzing user-level dependency graphs, it becomes easier to identify critical paths or dependencies that are crucial for the functioning of an application (and it some cases, therefore, the entire network). This can lead to prioritizing efforts, optimizing performance, and ensuring the reliability of the network.

According to an embodiment, a packet analysis module 3111 is configured to receive, retrieve, or otherwise obtain a plurality of network packets from a plurality of network sources, analyze the network packets to determine a protocol associated with the packets, and apply a metadata tag to a network packet, wherein the metadata tag allows tagging and tracking engine 3110 track/trace the network packet as it moves through the network from source to destination. The result is a track/trace dataset associated with tagged network packet which can be used for various purposes including, but not limited to, analysis to determine a network flow associated with the network packet, as an input for a graphical representation of the network, analysis for malicious behavior or activity, and for cyber risk scoring.

Packet analysis module 3111 may analyze a received packet to determine a protocol associated with the packet. In some embodiments, packet analysis module 3111 captures the packet and inspects the packet's header to identify the ethernet header to extract the ethernet type value. The network layer protocol (e.g., IPv4, IPv6, ARP, etc.) may be determined based on the extracted ethernet type value. If the packet is an IP packet, the IP header is then examined to identify the transport layer protocol (e.g., TCP, UDP, ICMP, etc.) used in the packet. Once the proper protocol has been determined, the packet may be tagged with metadata that allows tagging and tracking engine 3110 to track the packet as it traverses the network to its destination. The system determines the protocol first so that it can apply the metadata tag to the appropriate field in the packet, which varies from protocol to protocol. In some embodiments, the metadata may be associated with a specific user or group of users by using a unique value or object which represents the user or group. For example, the device used by a user to access a network has a unique identification number which can be obtained and used to track that specific user as they interact with the network. In some embodiments, a verified authentication object associated with a user may be used as an identifier and implemented as a metadata tag on a network packet. An authentication object database 3130 may be present and configured to store a plurality of all authentication objects as they are created by the appropriate entity (e.g., ticket granting service) thereby providing a verified record of all active authentication object currently in use within a network. The uniqueness of the stored authentication objects makes them good candidates to be implemented as metadata tags on network packets which allows for user-linked network tracing as the packet traverses the network. This provides a novel enhancement to user-level tracking through a network because of both the uniqueness and verified nature of the stored authentication objects.

Packet analysis module 3111 may tag a network packet or process with metadata associated with a particular user in order to track the user's behavior and path as the user engages with and traverses a network. To tag a packet to trace it through network infrastructure, various methods may be used including, but not limited to, network taps, port mirroring, and network detection analytics (NDA). Network taps are hardware devices that provide access to network traffic in a non-intrusive manner. Network taps can be installed at strategic points in a network infrastructure, such as between switches or routers. Taps mirror the traffic passing through them and send it to a network analyzer, which can then capture and analyze the packets. Port mirroring is a software-based technique that copies the traffic from one or more ports on a switch or router to another port. This can be useful for monitoring network traffic without disrupting network operations. NDA is a method of analyzing network traffic to identify potential security threats. NDA can be used to tag packets by assigning metadata to them based on the type of traffic, source, destination, and other factors. This metadata can use used to trace packets through the network and identify the source of a security incident.

Tagging and adding metadata to a network packet or software process involves attaching additional information or context to the network packets or processes as they traverse a network. In some embodiments, header extensions, which are supported by various network protocols, may be used for the inclusion of metadata. For example, in Internet Protocol (IP), options fields can be used to add custom metadata. Similarly, in transmission control protocol (TCP) and user datagram protocol (UDP), option or payload fields can be utilized for added metadata for tagging and tracking purposes. Some protocols have specific fields dedicated to carrying metadata. For instance, in the Domain Name System (DNS), the "Additional Information" section can be used to include additional data related to DNS queries or responses. Virtual LAN (VLAN) tagging is a method used to add metadata to Ethernet frames. It involves adding an additional tag to the Ethernet frame header, which carries information about the VLAN ID, or other metadata related to the virtual LAN. In some implementations, deep packet inspection techniques may be implemented by tagging and tracking engine 3110 to inspect the content of network packets, including the payload, to extract metadata and/or add metadata. In other embodiments, instead of attaching metadata to individual packets, flow-based metadata can be added at the flow level. Flow-based metadata provides information about the aggregate behavior of a sequence of packets sharing common characteristics, such as source and destination IP addresses, ports, and protocol.

There are various metadata fields that can be used to tag a packet for tracing, such as the source and destination IP addresses, port numbers, protocol type, and timestamp. This metadata can be used to track the packet as it moves through the network infrastructure, allowing the system to identify the path it took and any potential issues that may have occurred along the way. This process is applicable to various network flow protocols such as, for example, NetFlow, sFlow, or IPFIX. In various implementations, system 3100 leverages authentication object aggregation and verification capabilities and the inherent uniqueness of the authentication object data (e.g., ticket, hash, token, etc.) to tie a network flow to an identity using deep packet analysis network infrastructure. This may yield an enriched dataset referred to herein as sessionized authentication enriched netflow (SAEN). This represents an improvement upon the current state of the art as the system is configured to provide enrichment with authentication flows from key distribution centers, SAML IdPs/SPs, SPNs, various endpoints (e.g., EDR systems, WEL/Sysmon or Linux equivalent, etc.), and multifactor authentication services and identify access management gateways/identify provider proxies to create bijective associations between user sessions and network flow traces. In some implementations, all of, or a subset of, SAEN data may be incorporated into the enriched trace and track dataset and then used to create one or more user-level dependency graphs.

According to an embodiment, tagging and tracking engine 3111 may combine the authentication sessions with packet tags by embedding additional metadata into packets associated with sessions between users and applications that relate to targeted tickets or tokens of interest. The system may leverage its authentication object aggregation and verification capabilities to produce an authentication object database 3130 comprising at least a plurality of verified authentication objects. Each of the authentication objects may be associated with a particular user. The uniqueness of each of the authentication objects (e.g., authentication data) can be used to logically link a flow to a user identity. This allows the system to "track and trace" behaviors through both time and topology. This may be extended into application space via tracing and APM extensions to network, log, and host telemetry to offer the ability to construct exceedingly accurate details of interactions on the network. Track and trace data may be stored in database 3130. In some implementations, database 3130 is a vector database and obtained data is vectorized prior to being stored in the vector database.

According to an embodiment, an endpoint interaction manager 3113 may be present and configured to dynamically interact directly with various endpoint tools (e.g., Tanium) or to other tools (e.g., system center configuration manager/systems center operations manager, Windows management instrumentation query language, etc.) to change system or device configurations, attributes, and/or operating states. For example, system can change the registry settings for the location to where crash dumps should be sent (e.g., to a midserver) and to potentially change the "depth" or decision to pass along a dump at all (i.e., local filter) such that prior to sending large amounts of data to a midserver (or some other location), they can be evaluated based on some (or none) local criteria that might indicate potential information gained from a defender's perspective. Crash dump data 3106 may be obtained by tagging and tracking engine 3110 and analyzed by an application security module 3115.

Present in this embodiment is an application security module 3115 comprising a crash analyzer 3116 and a software analyzer 3117. Crash analyzer 3116 may be configured to detect security threats in applications by using static and dynamic analysis of application crash dumps. Performing automated static and dynamic analysis of application crash dumps involves analyzing the information captured during a crash or failure of an application. Crash dumps, also known as core dumps or minidumps, are diagnostic files generated by operating systems or applications when they encounter an unexpected error or crash. By performing automated static and dynamic analysis of application crash dumps, tagging and tracking engine 3110 can gain insights into the root cause of the crash, identify bugs, memory issues, or security vulnerabilities, and take appropriate measures to address them. In some embodiments, the results of the analysis such as potential security vulnerabilities may be added to the enriched trace and track dataset and used in part to create one or more graphical representations of the network.

Static analysis involves examining the crash dump file without executing the code. It focuses on the metadata and data structures within the dump file. Some key activities involved in static analysis of crash dumps are: parsing and extraction wherein the crash dump file is parsed to extract relevant information such as memory addresses, register states, stack traces, and exception details; symbol resolution wherein symbolic information, such as function names and variable names, is resolved by matching memory addresses to their corresponding code symbols which helps in identifying specific functions or modules responsible for the crash; code analysis wherein the code sections within the crash dump can be analyzed to identify potential coding errors, memory corruption, or security vulnerabilities, and may involve examining the assembly instructions, examining memory regions, or analyzing specific data structures; and memory analysis wherein memory regions and object states captured in the crash dump can be analyzed to identify memory leaks, access violations, or uninitialized memory issues.

Dynamic analysis involves executing the crash dump in a controlled environment to observe the behavior and identify the cause of the crash. Some activities involved in dynamic analysis of crash dumps are: crash reproduction wherein the crash dump is loaded into a debugging environment or specialized tools that can reproduce the crash which allows for controlled execution and analysis of the faulty code path; step-by-step execution wherein the code within the crash dump is executed step-by-step, allowing analysts to observe the program state at each step and identify the exact point of failure; memory inspection wherein dynamic analysis tools can inspect memory contents during execution to identify memory corruption, buffer overflows, or invalid memory access; and resource monitoring wherein various system resources such as CPU usage, memory usage, and file system access can be monitored during the dynamic analysis to identify any abnormal behavior or resource-related issues.

Software analyzer 3117 may be configured to perform data-flow and control analysis of software programs. In some embodiments, software analyzer 3117 may insert tracking code into a software program to detect and report on a variety of memory safety issues, such as buffer overflows, use-after-free errors, and other memory corruption vulnerabilities that could be exploited by attackers. Software analyzer 3117 is configured to work with a wide range of programming languages including C, C++, Rust, and WebAssembly. It also can support multiple operating systems, including Linux, macOS, and Windows. In various implementations, software analyzer 3117 may provide low-level virtual machine (LLVM) execution analysis that instruments programs to track which bytes of an input file are operated on by which functions. In some embodiments, it inserts specialized instructions and data structures (e.g., code snippets, hooks, etc.) into the program's code to track memory allocations, deallocations, and accesses. It may output a database comprising the data-flow information (e.g., data sources, data paths, data transformations, data sinks, data dependencies, etc.), as well as a runtime trace. A runtime trace may comprise information such as, for example, a record of events or actions that occur during execution of program or software system. It captures information about the sequence of operations, function calls, variable values, and other relevant data as the program runs. In some embodiments, this output database may be added in part, or in whole, to the enriched trace and track dataset and used to create one or more user-level dependency graphs.

According to the embodiment, a graphing module 3112 is present and configured to create various graphical representations of a network under analysis. In some embodiments, graphing module 3112 may create one or more composite graphs that graphically represent the relationships between files, domains, IP addresses, execution instructions, and other entities related to a given malware analysis. The graph may be enriched with crash dump data obtained from application security module 3115 and user behavior and analytics based on track and trace data. The enriched graph can enable the consideration of relationships and processes such as direct network connections which can address capabilities such as, for example, developers ssh'ing into production infrastructure and bypassing change control processes.

In other embodiments, graphing module 3112 is configured to create one or more user-level dependency graphs using various types of data from a plurality of sources. Examples of data which may be used as part of the dataset to create a user-level dependency graph can include, but are not limited to, various log data, APM data, trace and track data, software vulnerability information, crash dump data, data-flow information, runtime trace data, application trace data, and authentication object data, and/or the like.

According to the embodiment, a model and simulation engine 3120 is present and configured to provide model creation and management as well as simulation capabilities using various datasets such as, for example, the enriched trace and track dataset. In some implementations, crash dump data alongside all other data sources described herein may be used for the emulation of both successfully executed software and crashed software to build large-scale threat models of potentially executable attack paths. This can be leveraged to provide automated generation of ongoing potential security threats as processes occur throughout a network.

Figure 32:
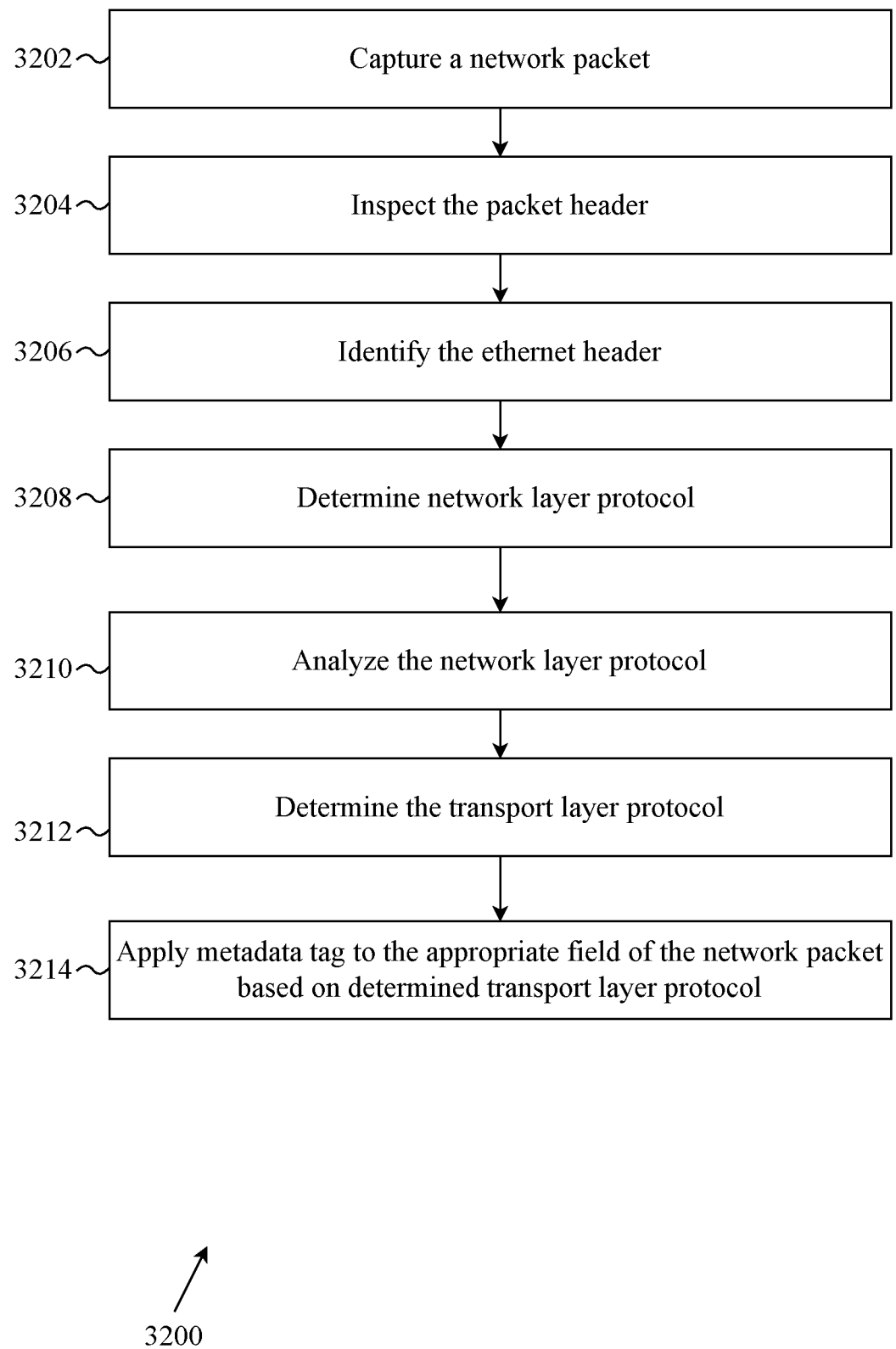
FIG. 32 is a flow diagram illustrating an exemplary method for capturing, analyzing, and tagging network packets, according to an aspect of an embodiment.

FIG. 32 is a flow diagram illustrating an exemplary method 3200 for capturing, analyzing, and tagging network packets, according to an aspect of an embodiment. The process may be implemented as machine readable instructions and executed by a computing device comprising at least a processor and a memory. According to the embodiment, the process begins at step 3202 when packet analysis module 3111 captures (e.g., receives, retrieves, or otherwise obtains) a network packet. At step 3204 the module may inspect the packet details to identify the header. At step 3206 the packet header is inspected to identify the ethernet header and then extract the ethernet type value from the header. At step 3208, packet analysis module 3211 can determine the network layer protocol based on the extracted ethernet type value. Some common network layer protocol values include IPv4, IPv6, and address resolution protocol (ARP). At step 3210, the network layer protocol is analyzed to determine at step 3212 the transport layer protocol (e.g., TCP, UDP, ICMP, etc.) and thus the protocol associated with the captured network packet. As a last step 3214 packet analysis module 3111 applies a metadata tag to the appropriate field of the network packet based on the determined transport layer protocol. In some implementations, the metadata tag may be associated with an authentication object associated with a network user. In some implementations, the tagged network packet may be tracked as it traverses the network to form a trace and track dataset which can be used in part, or in its entirety, to create one or more graphical representations of a given network, application, process, or some combination thereof.

Figure 33:
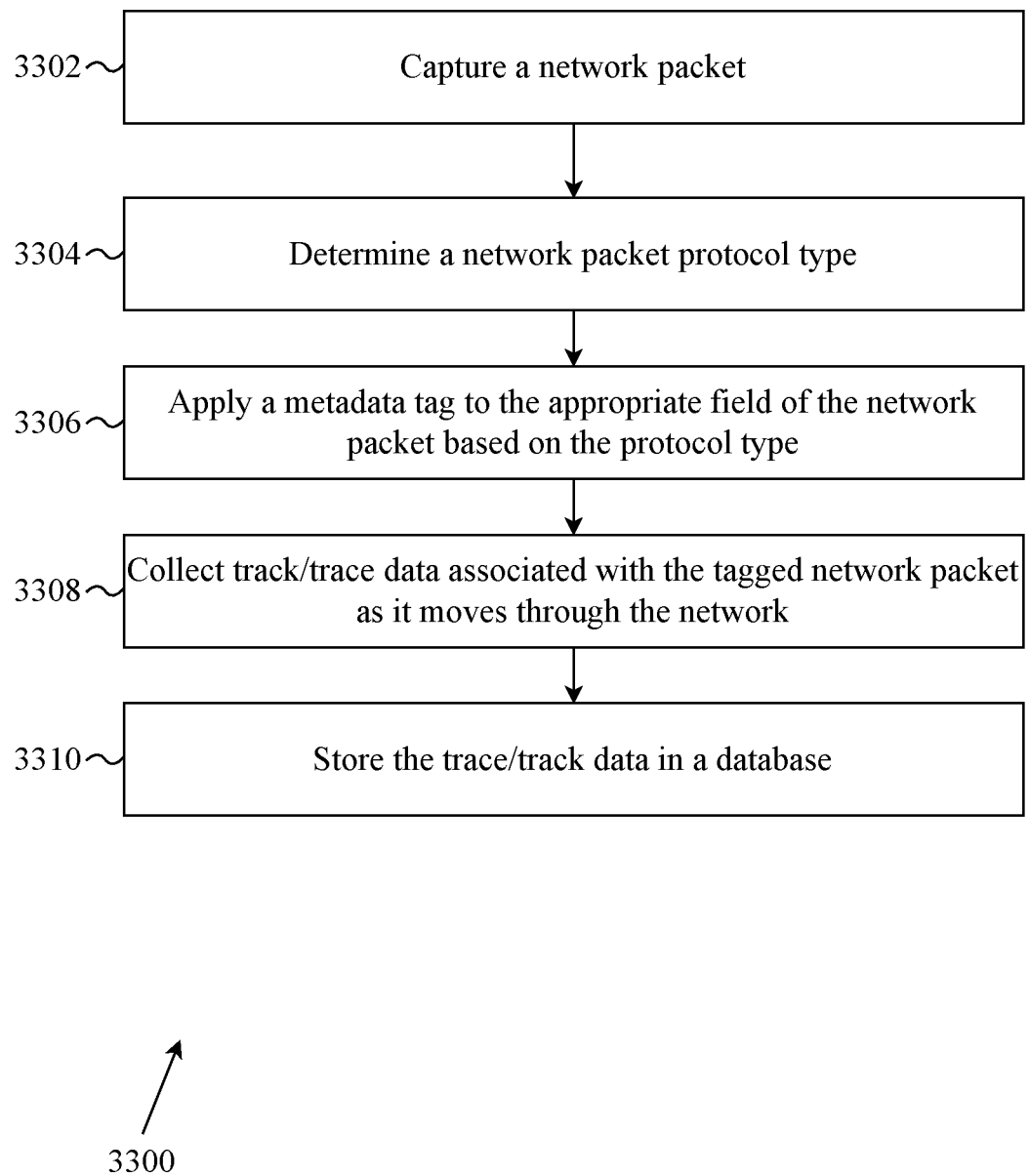
FIG. 33 is a flow diagram illustrating an exemplary method for creating a trace and track dataset, according to an aspect of an embodiment.

FIG. 33 is a flow diagram illustrating an exemplary method 3300 for creating a trace and track dataset, according to an aspect of an embodiment. According to the aspect, the process begins at step 3302 when packet analysis module 3111 captures (e.g., receives, retrieves, or otherwise obtains) a network packet. As a next step 3304, packet analysis module 3111 may determine a network packet protocol associated with the captured network packet. At step 3306, a metadata tag is applied to the captured network packet. The metadata tag may be logically or physically linked to network user. Tracing and tracking the movement of the tagged network packet as it traverses the network can produce user-level network trace information. This information and various other information may be collected as the tagged network is monitored by tagging and tracking engine 3110 as it moves through the network at step 3308. This may result in a trace and track dataset comprising various user-level trace information including, but not limited to: tagged network packets or events generated by an application during its execution (e.g., source/destination IP addresses, port numbers, protocols used, packet timestamps, and payload data); data related to application interactions with a network such as communication flows, requests and responses, and other network-related activities initiated by a user/application/process; protocol analysis information; and performance of network interactions from an application perspective. As a last step 3310, tagging and tracking engine 3110 may store the trace and track dataset in a database storage system. In various embodiments, this trace and track dataset may represent a baseline or initial dataset which can be used to create a user-level dependency graph. In such embodiments, the initial dataset may be enriched with other information from various sources including, for example, potential security vulnerabilities related to software applications as determined by analysis of crash dump data, data-flow information, and runtime trace data, to name a few types of data that can be used to enrich the trace and track dataset.

Figure 34:
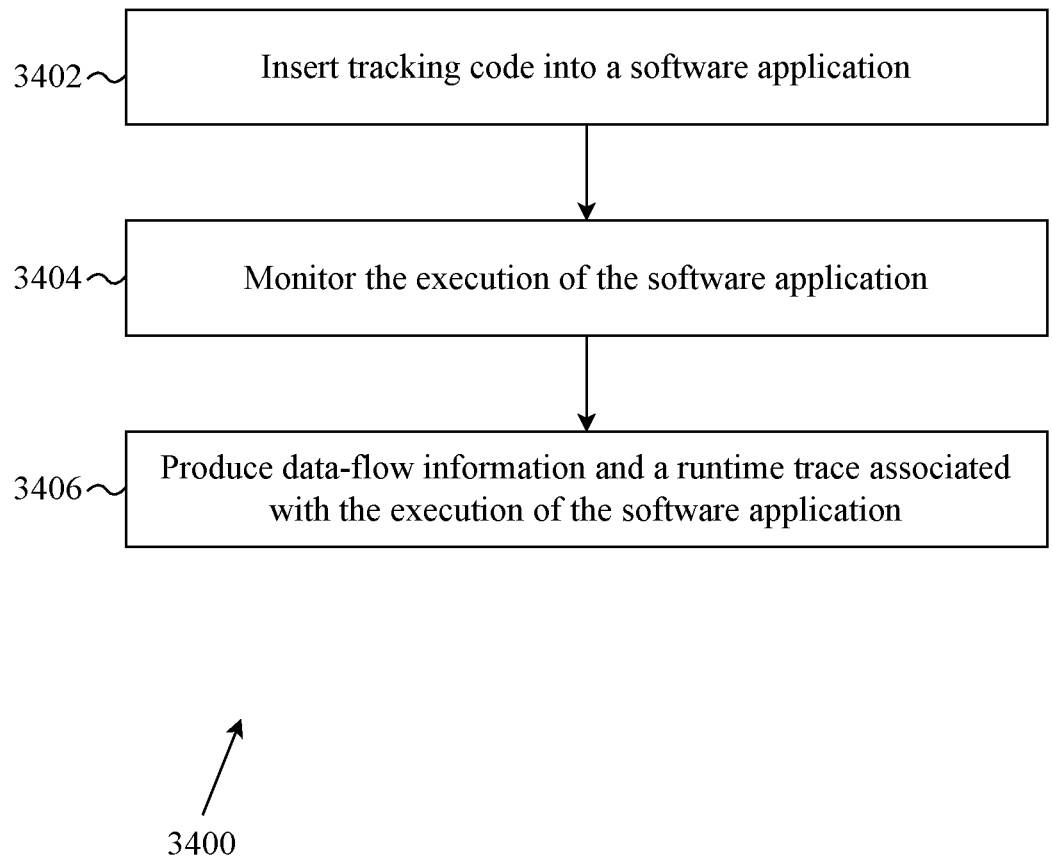
FIG. 34 is a flow diagram illustrating an exemplary method for obtaining data-flow information and runtime trace data, according to an aspect of an embodiment.

FIG. 34 is a flow diagram illustrating an exemplary method 3400 for obtaining data-flow information and runtime trace data, according to an aspect of an embodiment. According to the aspect, the process begins at step 3402 when software analyzer 3117 receives a software application to process and inserts tracking code into the software application. Once the tracking code has been implemented, the next step 3404 is to monitor the execution of the software application. This may be done in a controlled environment (e.g., sandbox, virtual machine, simulation, emulation, etc.). During and after monitoring the execution of the software application, software analyzer 3117 collects data-flow information and runtime trace data associated with the execution of the software application at step 3406. This information may be stored in a database 3130.

Figure 35:
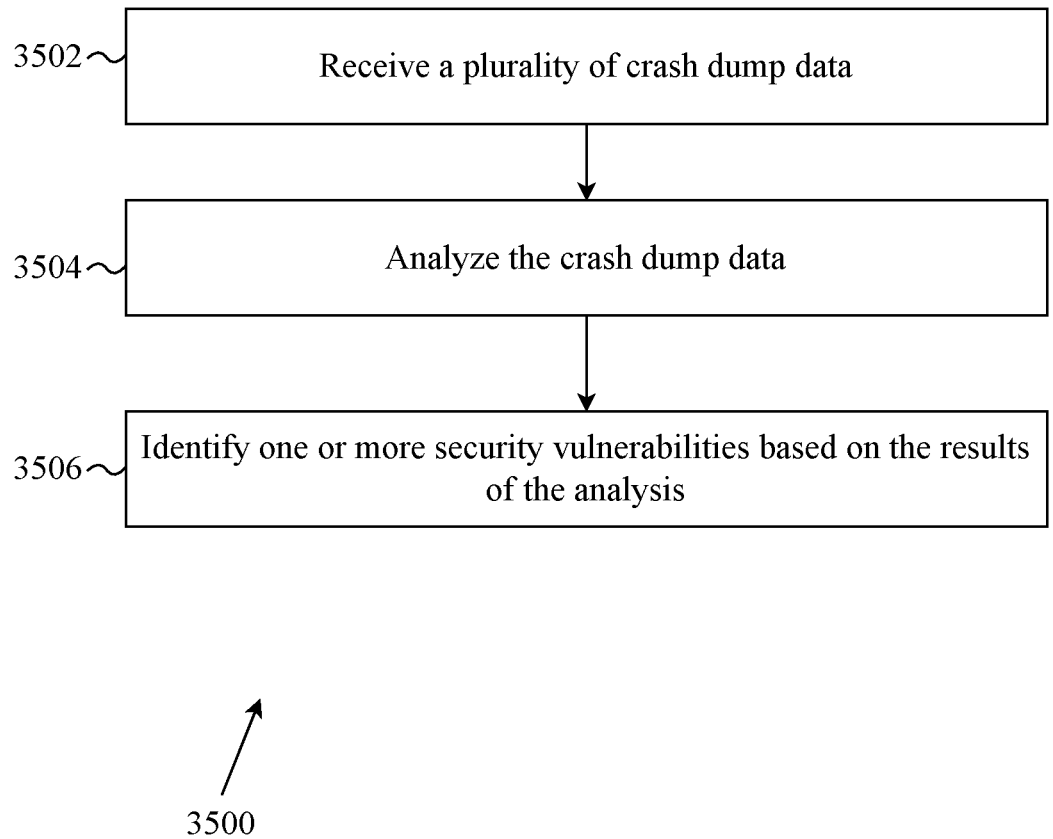
FIG. 35 is a flow diagram illustrating an exemplary method for identifying one or more potential security vulnerabilities based on crash dump data analysis, according to an aspect of an embodiment.

FIG. 35 is a flow diagram illustrating an exemplary method 3500 for identifying one or more potential security vulnerabilities based on crash dump data analysis, according to an aspect of an embodiment. According to the aspect, the process begins at step 3502 when crash analyzer 3116 receives a plurality of crash dump data associated with an application or process that has experienced a crash during runtime/execution. In some implementations, crash dump data can include, but is not limited to, exception information, stack trace data, register values at the time of a crash, memory contents at the time of a crash, and system information (e.g., OS version, hardware configuration, loaded modules or libraries, etc.). At step 3504 crash analyzer 3116 analyzes the plurality of crash dump data. Various techniques for performing crash dump analysis may be implemented, according to the embodiment. For example, crash root cause analysis may be performed by examining the exception information, stack traces, and register values, the system can identify the specific point in the code where the crash occurred. This can help to identify potential vulnerabilities such as buffer overflows, null pointer references, or other memory-related issues that can lead to crashes or security breaches. Another type of crash dump analysis may involve memory corruption analysis by examining memory contents and analyzing suspicious values, unexpected data, or overflows, the system can identify memory corruption vulnerabilities like use-after-free or format string vulnerabilities. Yet another type of crash dump analysis that may be used is fuzzing and crash reproduction schemes. Crash dump data can be used as input for fuzzing or automated vulnerability discovery techniques. By replaying the crash-inducing inputs or creating variations of them, the system can attempt to reproduce the crash and trigger similar vulnerabilities. Fuzzing techniques can help in identifying input-driven vulnerabilities like buffer overflows, format string vulnerabilities, or SQL injection. These and other techniques may be used by themselves, or in some combination to perform crash dump data analysis. As a last step 3506 crash analyzer 3116 may identify one or more potential security vulnerabilities based on the results of the analysis. The identified security vulnerabilities may be stored in a database.

Figure 36:
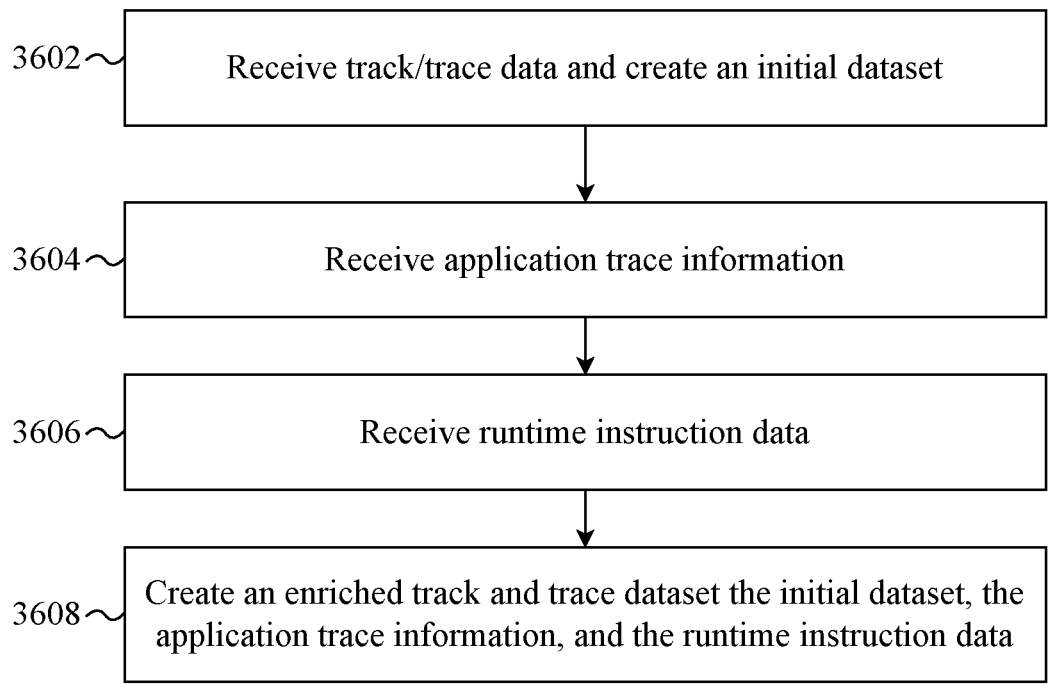
FIG. 36 is a flow diagram illustrating an exemplary method for creating an enriched trace and track dataset, according to an aspect of an embodiment.

FIG. 36 is a flow diagram illustrating an exemplary method 3600 for creating an enriched trace and track dataset, according to an aspect of an embodiment. According to the aspect, the process begins at step 3602 when tagging and tracking engine 3110 receives trace and track data from packet analysis module 3111 and forms an initial trace and track dataset. At step 3604 tagging and tracking engine 3110 obtains application trace information from software analyzer 3117. In some embodiments, the application trace information comprises data-flow information, runtime trace data, or both. At step 3606 tagging and tracking engine receives runtime instruction data from crash analyzer 3116. In some embodiments, the runtime instruction data may comprise crash dump data and potential security vulnerabilities. As a last step 3608 tagging and tracking engine 3110 creates an enriched trace and track dataset by combining the application trace information and the runtime instruction data with the initial dataset. According to the aspect, a subset of this enriched trace and track dataset may be used to create one or more user-level dependency graphs.

Figure 37:
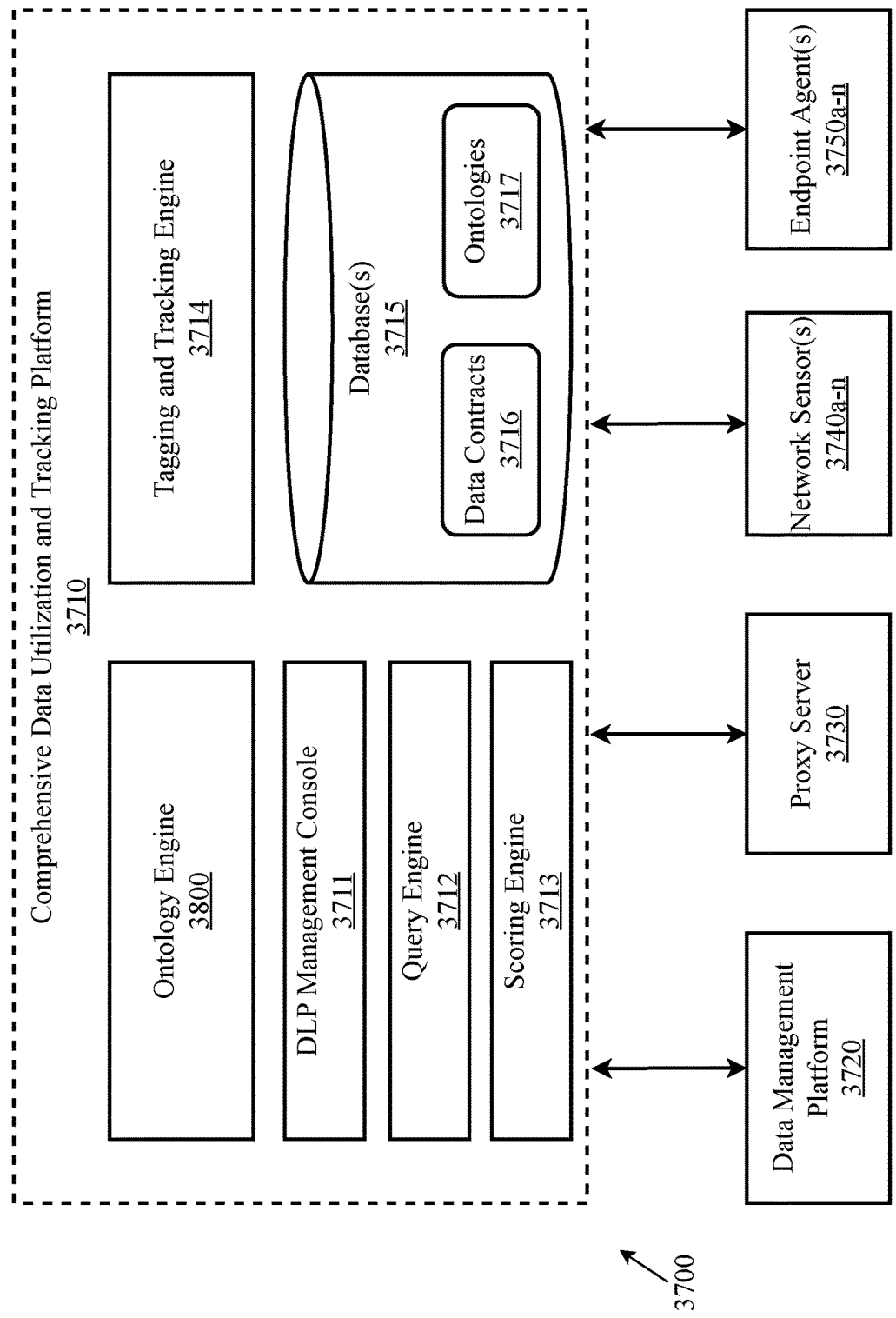
FIG. 37 is a block diagram illustrating an exemplary system architecture for providing comprehensive data utilization tracking throughout enterprise networks, according to an embodiment.

FIG. 37 is a block diagram illustrating an exemplary system architecture 3700 for providing comprehensive data utilization tracking throughout enterprise networks, according to an embodiment. To achieve comprehensive data utilization tracking, the system may implement one or more ontologies to better contextualize data utilization. Understanding data utilization in an ontologically useful way means interpreting and analyzing data utilization patterns and behaviors in alignment with underlying ontology or domain (industry)-specific knowledge structure. It may involve applying ontological concepts, relationships, and properties to gain deeper insights into how data is utilized within a specific domain or context. An ontologically useful understanding of data utilization involves leveraging the concepts and relationships defined in the ontology to analyze data usage patterns. It enables linking data utilization events to the relevant concepts and identifying relationships and dependencies between different data entities.

By aligning data utilization with the ontology, it becomes possible to semantically interpret the meaning and context of data usage. This allows for a more nuanced understanding of how data is employed, revealing implicit relationships, dependencies, and contextual information that may be crucial for decision-making or knowledge discovery. An ontologically useful understanding of data utilization involves associating rich metadata with data usage events. Metadata can capture additional contextual information about the data, including its source, quality, purpose, and dependencies, based on the ontology. This enriched metadata provides a more comprehensive view of data utilization and facilitates effective data management and analysis.

An ontologically useful understanding of data utilization can contribute to building or enriching knowledge graphs. By linking data utilization events with relevant ontology concepts, relationships, and properties, organizations can create a connected knowledge representation that captures the semantics and dependencies of data usage. This, in turn, supports advanced analytics, inference, and reasoning.

According to the embodiment, the system may comprise an ontology engine 3800 configured to create and/or curate a plurality of industry-specific ontologies based on various types of information sources. Examples of information sources that may be used to create or curate an industry specific ontology may include, industry specific data contracts, data marketplaces, existing ontologies (e.g., Financial Industry Business Ontology, etc.), APIs, databases, and data provided by organizations. Ontology engine 3800 may analyze the obtained data structures, schemas, and formats of each data source to identify commonalities and differences in the way data is organized, including entities, attributes, and relationships present in each source. Ontology engine 3800 may further look for recurring entities and their attributes across the data sources and then extract these concepts to serve as the basis for the ontology. Ontologies may be refined and iterated over time to improve based on feedback, domain expertise, and the specific needs of the embodiment. Ontology engine 3800 is configured to publish and maintain a plurality of data contracts and/or ontologies. Ontology engine 3800 may store data contracts/schemas 3716, data models, and various ontologies 3717 in one or more databases 3715. In some embodiments, one or more of these components may be implemented on a universal computing asset registry as set forth in U.S. application Ser. No. 16/945,698 which is incorporated herein by reference.

According to the embodiment, comprehensive data utilization and tracking platform 3710 may comprise and/or integrate with an existing data management platform 3720 configured to provide a single place to access data via APIs or self-service queries, with built-in governance. In some implementations, platform 3710 may utilize information obtained from data management platform 3720 to create and/or curate an industry specific ontology. Data management platform 3720 may further provide various data models and data contracts specific to a particular industry or standard, which foster a common data vocabulary and ontological understanding of the data. Data models can connect to various types of data and ensure data quality by design. Furthermore, automated data lineage captures how data is transformed as it moves through a network or moves through a business pipeline or process. An example of a type of data management platform that may be integrated with platform 3710 is the Legend Project by FINOS which provides a unified view of data lineage and usage across all systems and applications, enabling users to understand the context of data as its used throughout an enterprise. By integrating with the tracking and tracing capabilities, data management platform can provide a comprehensive view of data utilization, including who accessed the data, when they accessed it, and how they used it.

According to the embodiment, tagging and tracking engine 3714 can be used to tag network packets with authentication objects and other types of metadata in order to trace them through the network, allowing platform 3710 to track data utilization across various systems and applications. This can be particularly useful for identifying potential security threats and unauthorized access to sensitive data. For example, if an unauthorized user attempts to access sensitive data, tagging and tracking engine 3714 can tag the packets and trace them though the network, while platform 3710 can provide a comprehensive view of the data lineage and usage, allowing security teams to quickly identify the threat and take appropriate action. Various network sensors 3740a-n and endpoint agents 3750a-n may be configured to identify the tagged data (e.g., network packets which contain various types of data) as it traverses the network, providing information about the data lineage at the user access level.

In some embodiments, tagging and tracking engine 3714 may be configured to analyze an obtained network packet to identify an ontology or data contract associated with network packet. A first tag may be applied to the network packet, the first tag comprising an authentication object. A second tag may be applied to the network packet, the second tag comprising metadata associated with the identified ontology or data contract. The second, ontological metadata tag can enhance data utilization tracking in enterprise network in various ways. First, an ontological tag can provide metadata about the content or purpose of the network packet. By tagging packets with relevant ontological information, such as the type of data, application, or service associated with the packet, network administrators can classify and categorize packets based on their content. This classification can help in understanding the nature of the data being transmitted and its intended use. Further, ontological tags enable granular monitoring of network traffic. By associating tags with packets, network monitoring tools can filter and analyze packets based on specific ontological criteria. For example, tags can be used to focus monitoring efforts on specific applications, protocols, or data types, allowing administrators to track the utilization of different types of data more effectively. Ontological tags provide insights into the nature and importance of the data being transmitted. Network administrators can leverage this information to allocate resources more efficiently. For instance, by tagging packets with different levels of importance or priority, administrators can prioritize the processing, routing, or bandwidth allocation of packets accordingly. This helps in optimizing network resources and ensuring that critical data receives appropriate treatment. Ontological tags can assist in enforcing security policies and access controls. By associating security-related metadata with network packets, such as classification of sensitive data or the source of the packet, administrators can apply appropriate security measures. This allows for better tracking and control of sensitive or critical data utilization, aiding in the prevention and detection of security breaches. Finally, ontological tags can facilitate compliance monitoring and reporting. By tagging packets with information related to compliance requirements or data governance policies, organizations can track and report on the utilization of specific types of data. This helps in demonstrating adherence to regulatory requirements and internal data management guidelines.

Data lineage and usage play a significant role in evaluating the potential cyber risk of a network, and ontological tags used in combination with user specific data tags (e.g., tagging network packets with authentication objects) can provide rich information with respect to data lineage and usage. They provide critical insights into the origin, movement, and handling of data within an organization's network infrastructure. By understanding data lineage and usage, cybersecurity professionals can assess the potential vulnerabilities, threats, and risks associated with the network and take appropriate measures to mitigate them. Data lineage helps identify the path and transformations that data undergoes within the network. It enables cybersecurity professionals to understand how data moves across systems, applications, databases, and network segments. Analyzing data flow highlights potential weak points, such as insecure communication channels, unauthorized access points, or unencrypted data transfers that could be exploited by attackers. This is enhanced with the network packet tagging capabilities provided by tagging and tracking engine 3714 by providing information about the user who accessed the data and when the accessed it. Data lineage and usage data can be correlated with vulnerability assessment findings to determine the potential impact of a successful cyberattack. By understanding how data is accessed, processed, and stored, security professionals can evaluate the potential consequences of an attacker gaining unauthorized access or compromising critical data points. Data lineage and usage assist in evaluating the effectiveness of data protection measures, such as encryption, data loss prevention (DLP) systems, or access monitoring mechanisms. By tracking how data is protected throughout its journey, security professionals can identify any gaps or weaknesses in data security controls and implement appropriate measures to strengthen the overall cybersecurity posture. In the event of a cybersecurity incident, data lineage and usage information can provide valuable insights for incident response and forensic investigations. They help trace the movement of data, identify potential points of compromise, and understand the impact and extent of a breach, aiding in timely response and mitigation.

The combination of the tagging and tracing capabilities with data contracts and ontological libraries can provide a powerful set of tools for tracking data utilization and identifying potential security threats within enterprise networks.

Ontology engine 3800 can utilize tagging and tracking engine 3714 to trace utilization of the data to do contract enforcement in a multi-party data ownership situation. Data contracts may also be decentralized and stored in a (decentralized) database 3715. This approach promotes flexibility and timely evolution of data products for teams with diverse data needs or multiple engineering teams. Decentralized ownership and implementation of contracts may occur at the producer level. Producers are industry organizations or stakeholders who contribute to an industry standard. Producers bear the responsibility for enforcing data contracts. As an industry grows and changes, so too will its associated data contracts and by extension its specific ontology, which needs to be captured and integrated into new ontologies. Without producer-side enforcement, contracts become unreliable for downstream teams. Furthermore, contract data may be accessible to all consumers, allowing transparent access to schema and structure. This ensures that other services can consume versioned contract data and data descriptions separately from the data itself. Data contracts should be publicly available to authenticated and authorized users and services. To support evolving contracts without disrupting downstream consumers, implementation must include versioning and robust change management, starting with the producer. Data contracts must encompass both schemas and semantics. At the most basic level, contracts address the schema of entities and associated events, while avoiding backward-incompatible changes. Contracts should also include metadata beyond the schema, such as descriptions and value constraints.

According to the embodiment, a query engine 3712 is present and configured to provide federated search and/or query capability across multiple databases 3715. According to the embodiment, query engine 3712 may utilize one or more open source distributed query engines such as, for example, Apache Presto or Trino, to support federated search or querying by allowing users to perform queries that span multiple data sources or systems. Query engine 3712 may utilize a connector-based architecture that enables integration with various data sources. Connectors are plugins that provide the necessary logic to communicate with specific data systems such as databases, file systems, NoSQL stores, or APIs. Each connector understands the data source's query language, data model, and access mechanisms. When a federated query is submitted, query engine 3712 analyzes the query and determines which data sources need to be accessed to satisfy the query. Query engine 3712 identifies the relevant connector for each data source and creates an optimized execution plan to fetch and process the data from the distributed sources. The coordinator node takes charge of query coordination. It distributes query execution plans to the worker nodes responsible for accessing and retrieving data from the corresponding data sources. The coordinator also consolidates the results received from different workers and presents a unified result to the user. Query engine bb has mechanisms for discovering metadata and schema information from the connected data sources. This allows the query engine to understand the structure and available data within each source, enabling users to query and join data across multiple systems seamlessly. Because data contracts have standardized schema and possible metadata fields, this ability allows query engine 3712 to quickly search the various industry-specific ontologies that may be stored in database(s) 3715.

In use cases where applications have mutual TLS enabled with TLS/SSL inspection, a proxy server 3730 may be deployed to effectively man in the middle or proxy application data requests. Combining a proxy server 3730 with the tagging and tracking capabilities of platform 3710 enables true end-to-end data traceability for all data inspection proxy compliant applications while still performing selective validation and auditing of non-compliant modes. For example, a compliant file store/file share or CRM which might also see repeated downloads of content to the user desktop can gain inspection capabilities in the data inspection proxy layer which disintermediates the web applications/services for data requests through the secure proxy inspection layer that can add to enforcement of data access and keywords (e.g., even for issues like classified information tagging/validation). This can be further enhanced by injecting beacons or watermarks (e.g., tags) in the files themselves (e.g., either in metadata or in stenography-like approaches) that can add additional information about a file's history, locations, or serve as a means of later identification for exfiltrated or shared content. This enables more efficient breach isolation and hunting actions and can be used as a deception technique to build evidence against an illicit actor-internal or external to a target organization.

In some embodiments, platform 3710 may be configured to provide distributed data loss prevention (DLP) capabilities utilizing a plurality of endpoint agents 3750*a-n* and network sensors 3740*a-n*. In some implementations, endpoint agents 3750*a-n* are software agents installed on individual devices or endpoints (such as laptops, desktops, servers, mobile devices) that monitor and control data activity on those devices. Network sensors 3740*a-n* are sensors that are strategically placed on network gateways, switches, or routers to inspect data traffic passing through the network, applying DLP policies and detecting potential data breaches. In some implementations, a central management console 3711 may be present and configured to provide a unified interface for administrators to configure polices, monitor the system, and manage incidents. It allows administrators to define rules and policies for data protection, data contract/schema compliance and/or compatibility configurations, specify what types of data are considered sensitive, and set up appropriate actions when violations occur. Platform 3710 can employ predefined or customizable policies to identify sensitive data based on various factors such as content, context, metadata, or user behavior. Policies can include rules for data classification, encryption, access controls, data masking, or blocking unauthorized transfers. When a potential data breach or policy violation is detected, the distributed DLP system generates alerts or triggers predefined actions to mitigate the risk. This may include notifying administrators, blocking data transfers, encrypting or redacting sensitive information, or quarantining suspicious files.

In some embodiments, comprehensive data utilization tracking information may be combined with UEBA (e.g., user level dependency graph, etc.) to generate even better risk scores. A scoring engine 3713 may be configured to receive a plurality of information including, UEBA data, network packet tracking data, software, hardware, and/or firmware data, data utilization tracking information, cybersecurity risk data, industry-specific ontology data, log data 3101, and/or the like to determine one or more cyber risk scores. In some implementations, scoring engine may receive data utilization tracking information and UEBA information to determine a data utilization risk score, wherein the data utilization risk score can be associated with a risk of unauthorized access, with a risk of data exposure, with a risk of insider threat (e.g., improper use of user privileges, etc.), with a risk of a data leak, with the risk of malware distribution, and/or with the risk of a denial of service attack. In such implementations, the UEBA information may comprise at least in part a user-level dependency graph created from tracking tagged network packets as they traverse the network.

Figure 38:
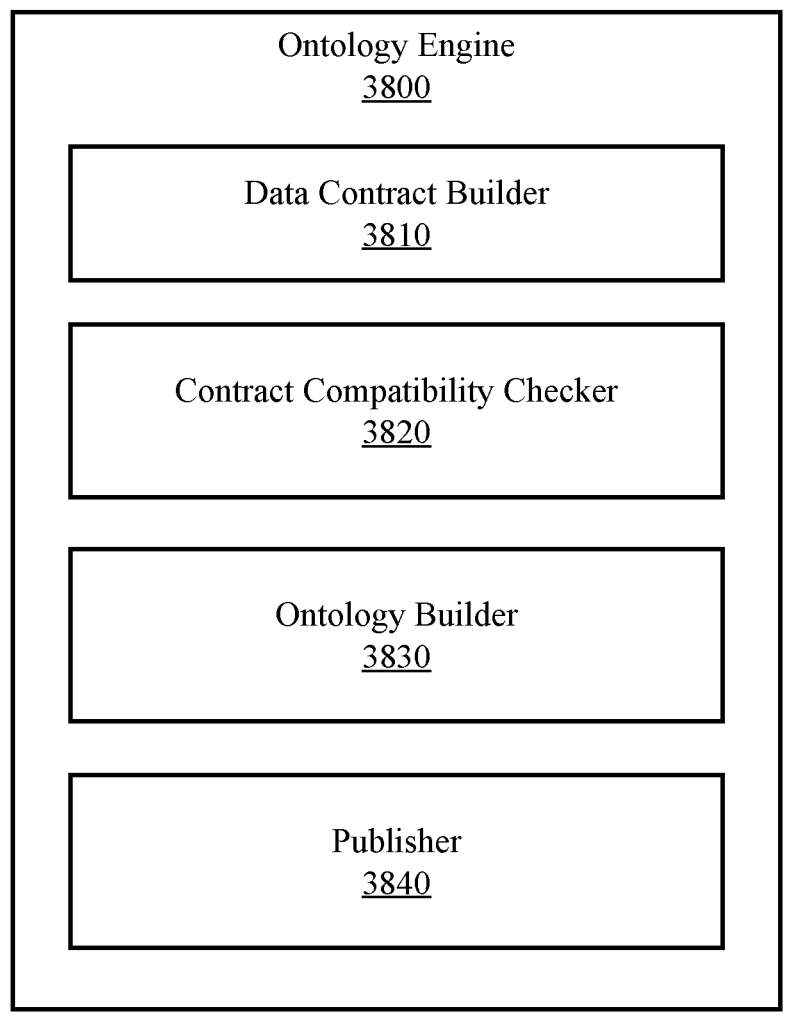
FIG. 38 is a block diagram illustrating an exemplary architecture for an aspect of a system for comprehensive data utilization and tracking, an ontology engine.

FIG. 38 is a block diagram illustrating an exemplary architecture for an aspect of a system for comprehensive data utilization and tracking, an ontology engine 3800. According to the aspect, ontology engine 3800 may comprise a data contract builder 3810, a contract compatibility checker 3820, an ontology builder 3830, and a publisher 3840. Ontology engine 3800 may be configured to operate as a centralized data contract (e.g., data schema) management system which allows for the creation and curation of industry specific data contracts/schemas which can be used to build various industry specific ontologies. The data contract defines the structure of the message payload, including names and types of fields, their constraints, and any hierarchical relationships or nesting. It serves as a contract between producers and consumers, specifying how the data should be structured and interpreted. Creating an industry specific ontology supported by standardized schemas allows tagging and tracking engine 3714 to more accurately track data utilization across an enterprise network by providing more depth of knowledge about each piece of data that flows through the enterprise network. In other words, tagging and tracking engine 3714 can provide information about which user was accessing data and the inclusion of ontological tags and the implementation of data contracts can provide information about why the user was accessing the data and what their intentions may be.

According to the aspect, data contract builder 3810 is present and configured to construct data contracts/schemas based on various inputs such data contracts provided by industry partners, data that may have been processed through machine learning algorithms to determine patterns within the data, and business rules or logic. In some implementations, data contract builder 3810 may utilize Protocol Buffers Interface Definition Language (IDL) to define the structure and contract of data models in Protocol Buffers. Protocol Buffers (protobuf) is a language-agnostic binary serialization format designed for efficient data interchange between different systems and languages.

According to the aspect, data compatibility checker 3820 is present and configured to provide compatibility checks to ensure that schema changes do not introduce breaking changes for existing users. It supports compatibility modes such as backward compatibility (new schema can read old data), forward compatibility (old schema can read new data), and full compatibility. Data compatibility checker 3820 can enforce data contract compatibility policies to ensure that only compatible data contract changes are allowed. It can provide mechanisms to configure compatibility rules, such as requiring backward-compatible data contract changes or allowing only specific contract evolution strategies.

According to the aspect, ontology builder 3830 is present and configured to analyze a plurality of obtained data structures, schemas, and formats of each data source to identify commonalities and differences in the way data is organized, including entities, attributes, and relationships present in each source. Next, a common vocabulary or terminology that will be used across the ontology is established. This step involves mapping and aligning the terms used in different data sources to ensure consistency and coherence. This step may further involve identifying key concepts and relationships that are relevant to the associated domain. Ontology engine 3800 may further look for recurring entities and their attributes across the data sources and then extract these concepts to serve as the basis for the ontology. In some implementations, a natural language processing (NLP) system may be used to determine relationships between identified concepts or entities. Ontologies may be designed using a formal ontology representation language such as OWL or RDF.

In some implementations, ontology engine 3800 acts as a repository where data contracts can be registered and stored. It can provide a RESTful API that allows organizations to submit their contracts/schemas for storage. In such implementations, a publisher 3840 may be present and configured to allow the system and/or organizations (producers) to publish data contracts utilizing a schema serialization format such as, for example, Avro or JSON Schema which have been tested and checked for compatibility. Ontologies may also be published and sent to a database 3715 where they may be stored in a decentralized manner and accessible by all users.

In some aspects of an embodiment, data contract builder 3910 is configured to facilitate the creation and curation of industry-specific ontologies and standards via data contracts. Such data contracts 3716 may be stored in a decentralized database(s) 3715. Data contracts can play a crucial role in defining the structure, semantics, and rules for data exchange and interoperability. Data contracts help ensure that data shared between different systems, applications, or organizations adheres to the established ontology and standards, promoting consistency and enabling seamless integration. Data contracts provide utility when tracking data lineage and usage by providing a searchable framework for tracking data utilization throughout and enterprise network.

In the healthcare domain, data contracts can be used to define the structure and format of medical records, patient information, or clinical data. For instance, a data contract might specify the required fields, data types, and coding standards for exchanging patient demographics, diagnoses, procedures, or medications between different healthcare systems. This promotes interoperability and enables accurate and consistent data exchange across healthcare providers, insurance companies, and regulatory bodies.

In the financial sector, data contracts can be employed to establish standards for financial transactions, reporting, or regulatory compliance. For example, a data contract might define the structure and rules for exchanging data related to payment transactions, account balances, or financial statements. This ensures that financial data is accurately interpreted and processed by different banking systems, payment processors, or regulatory agencies, supporting efficient data integration and compliance. The previously mentioned, open-source Legend Project supports the Financial Industry Business Ontology (FIBO) standard, which is a standard for defining financial industry concepts and relationships between them. The Legend Project includes a set of FIBO data models, as well as tools for generating code from FIBO models and integrating FIBO models into applications.

In the manufacturing domain, data contracts can be utilized to facilitate communication and data exchange between various systems involved in the production process. For instance, a data contract might specify the format and semantics of data shared between computer-aided design (CAD) systems, computer-aided manufacturing (CAM) systems, and product lifecycle management (PLM) systems. This promotes standardized data representation, interoperability, and seamless collaboration across different stages of the manufacturing lifecycle.

In the supply chain and logistics field, data contracts can define the structure and rules for exchanging data related to inventory management, shipment tracking, or logistics planning. For example, a data contract might specify the required data elements, data formats, and communication protocols for sharing information between different stakeholders, such as manufacturers, distributors, and retailers. This facilitates smooth data integration, improves visibility, and enables efficient coordination across the supply chain.

By employing data contracts in these industries (and various others), organizations can establish a common understanding and agreement on data structure, semantics, and rules, promoting standardized data exchange and enabling seamless interoperability between systems and stakeholders. Furthermore, the adoption and application of standard data contracts allows for semantic consistency, facilitates data integration, addresses regulatory requirements and reporting standards by providing a standardized model for representing a particular type of data, and can provide better business insight via better analysis. By leveraging industry-specific ontologies and standards, platform 3710 can ensure that the data models are consistent, interoperable, and widely understood.

When a tagged data packet is being tracked throughout a network, the packet may be compared against stored data contracts to identify the ontology the data packet is associated with. The identified ontology may be used as a basis to track data utilization by providing additional context about the data's structure and permitted use.

Some examples of frameworks and standards can include the Open Cyber Security Framework, Common Information Model (CIM) for utilities, the Business Process Model and Notation (BPMN) for business processes, and the Ontology for General IT Management (OGIT) for ITIL and IT management. In the cybersecurity domain, organization can leverage the Open Cyber Security Framework to create, store, and manage data models that define security concepts, relationships, and best practices. This framework can help organizations ensure that their security models are consistent and interoperable, allowing them to collaborate effectively and respond quickly to emerging threats.

The CIM is a standardized data model for the utilities industry, which defines concepts and relationships related to power generation, transmission, and distribution. Utilities organizations can use the CIM to create consistent data models that enable effective communication and collaboration across different systems and applications, ultimately improving the efficiency and reliability of power networks.

BPMN is a standard for representing business processes in the form of graphical models. Organizations can use BPMN to create and manage data models that define their business processes, enabling better understanding, communication, and optimization of these processes across the organization.

OGIT is an open-source ontology that provides a standardized set of concepts and relationships for IT management. It covers various IT domains, including application management, security management, and infrastructure management. By leveraging OGIT, organizations can create consistent and interoperable data models for IT management, enabling effective communication and collaboration across different systems and applications. This can ultimately improve the efficiency and effectiveness of IT operations, while reducing the risks associated with managing complex IT environments.

According to an aspect, data contract builder 3810 may be configured to manage, monitor, and/or enforce data usage compliance when handling multi-party data owners or shared owner concepts. The concept of multi-party data ownership often arises in situations where data is generated, collected, or managed by multiple stakeholders who contribute to or have a shared interest in the data. These stakeholders may include organizations, institutions, individuals, or even decentralized networks. In a multi-party data ownership model, each party involved shares the responsibility for the data and its management. They may have joint decision-making authority regarding data usage, access, sharing, or processing. Effective governance mechanisms are essential for managing multi-party data ownership. This involves establishing agreements, contracts (e.g., data, legal, etc.), or protocols that define the rights, obligations, and responsibilities of each party. Governance frameworks help address issues such as data access, security, privacy, consent, and data-sharing arrangements. Multi-party data owners often engage in collaborative efforts to utilize and derive value from the shared data. They may collectively contribute to data analytics, research projects, or innovation initiatives, leveraging the combined expertise and resources of all parties involved. Multi-party data ownership can raise complex legal and regulatory considerations. It may involve compliance with data protection laws, intellectual property rights, contractual obligations, or sector-specific regulations. Parties must ensure that data ownership rights and obligations are clearly defined and aligned with applicable legal frameworks.

Examples of multi-party data ownership scenarios can be found in various domains. Healthcare Research: In medical research, multiple healthcare institutions, universities, and research organizations may collaboratively contribute patient data for scientific studies. Each entity retains ownership of the data it contributes, while governance agreements and ethical considerations ensure responsible data sharing and protection. Supply Chain Management: In supply chain networks, multiple stakeholders, such as manufacturers, distributors, and retailers, may collectively own and manage data related to inventory, logistics, and transactions. Shared ownership allows for improved coordination, visibility, and efficiency across the supply chain ecosystem. Decentralized Networks: In blockchain or decentralized networks, data ownership can be distributed among multiple participants who contribute to maintaining the network and validating transactions. Each participant may have ownership rights over a portion of the data or the overall network.

Figure 39:
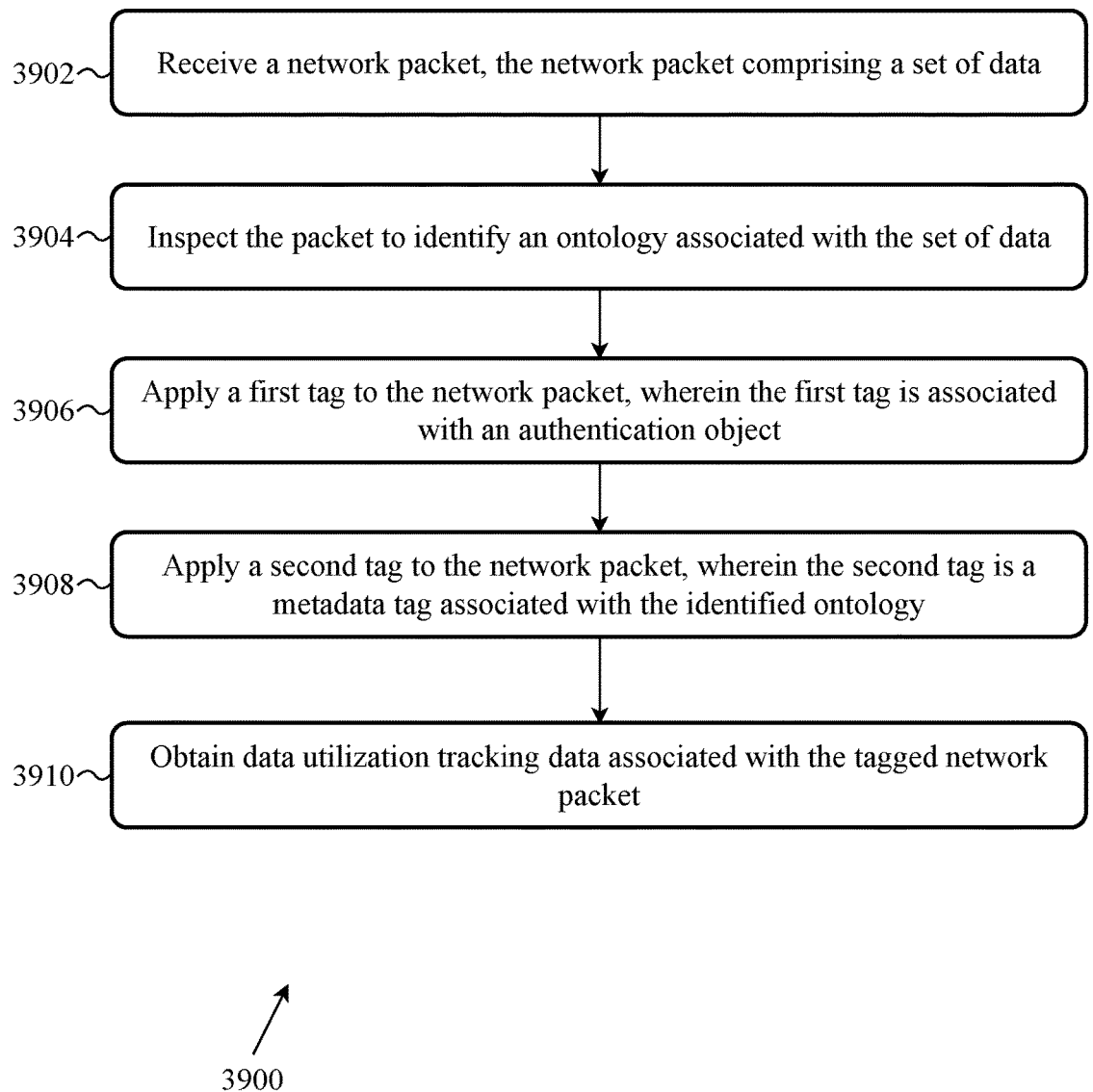
FIG. 39 is a flow diagram illustrating an exemplary method for obtaining data utilization tracking information, according to an embodiment.

FIG. 39 is a flow diagram illustrating an exemplary method for obtaining data utilization tracking information, according to an embodiment. According to the embodiment, the process begins at step 3902 when a comprehensive data utilization and tracking platform receives, retrieves, or otherwise obtains a network packet, the network packets comprising a set or subset of data. At step 3904, a tagging and tracking engine 3714 can inspect the network packet to identify an ontology associated with the set or subset of data. In some implementations, an ontology may be identified by inspecting the structure of the network packet to determine an underlying schema or data contract which the network packet is associated with. In some aspects, the ontology may be determined by performing anyone or more some combination of the following techniques: protocol analysis; payload inspection; application context; metadata analysis; semantic tagging; and domain knowledge. The next step 3906 tagging and tracking engine 3714 can apply a first tag to the network packet, wherein the first tag is associated with an authentication object. The authentication object can be selected from an authentication object database comprising a plurality of valid authentication objects, wherein the valid authentication objects are associated with a specific user. At step 3908, tagging and tracking engine 3714 can apply a second tag to the network packet, wherein the second tag is a metadata tag associated with the identified ontology. In some aspects, the metadata tag is an ontological tag associated with the identified ontology. Examples of ontological tags that may be applied to a network packet can include, but are not limited to data type tags (e.g., "text", "image", "audio", "video", "binary data", "structured data", etc.); application tags (e.g., "web browsing", "email", "IoT", "telemetry", etc.); domain tags (e.g., "finance", "healthcare", "manufacturing", "logistics", "education", etc.); security tags which indicate the security classification or sensitivity level (e.g., "confidential", "PII", "restricted", etc.); source/origin tags (e.g., "internal", "external", "trusted", "third-party", etc.); and contextual tags (e.g., "geolocation", "timestamp", "user identity", "transaction ID", etc.). The platform 3710 can track the tagged network packet as it traverses the enterprise network to obtain data utilization tracking information associated with the tagged network packet at step 3910. The data utilization tracking information can provide insights into the type, purpose, or domain of the data being utilized. Furthermore, the addition of ontological tags allows platform 3710 to use the ontological information to filter and extract packets based on specific ontological criteria. By aligning the ontological tags or concepts in the packets with a standardized ontology, platform 3710 can establish a common understanding of the data being utilized. Ontological information can help infer the data types and structure within the network packets. Ontological information can assist in detecting anomalies or deviations in data utilization. By establishing expected patterns of data utilization based on ontological concepts, you can identify unusual or unexpected data behaviors. Deviations from established ontological norms may indicate potential security threats or data misuse. In some implementations, a scoring engine 3713 may receive data utilization tracking information and use it an input to determine a cyber risk score associated with data utilization, among other risks.

Exemplary Computing Environment

Figure 40:
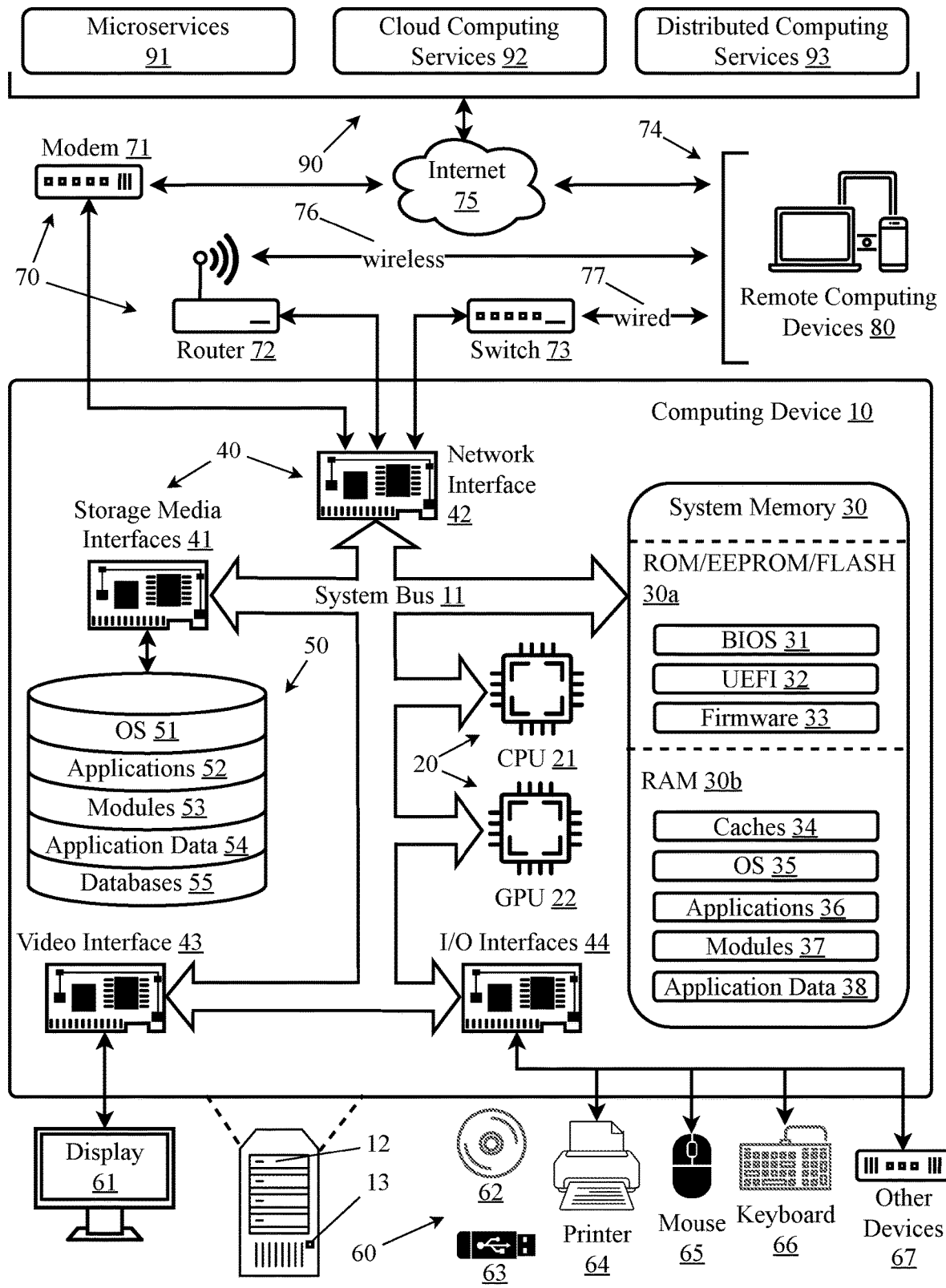
FIG. 40 illustrates an exemplary computing environment on which an embodiment described herein may be implemented, in full or in part.

FIG. 40 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A computing system, comprising a hardware memory, wherein the computer system executes software instructions stored on nontransitory machine-readable storage media configured to:
   capture a network packet in a network, the network packet comprising a payload;
   analyze the network packet to identify an ontology associated with the payload;
   maintain an authentication object database comprising a record of valid authentication objects issued by the network, each authentication object being associated with a user and an access session;
   validate the network packet by determining whether the network packet is associated with a valid authentication object from the authentication object database;
   when the network packet is associated with a valid authentication object from the authentication object database, add a first metadata tag to the network packet, the first metadata tag comprising the associated valid authentication object;
   add a second metadata tag to the network packet, the second metadata tag being associated with the identified ontology and indicating a semantic classification of the payload;
   obtain data utilization tracking information by tracking the tagged network packet as the tagged network packet traverses the network;
   obtain user entity and behavior analysis (UEBA) data associated with a specific user associated with the valid authentication object, wherein the UEBA data comprises behavioral risk indicators; and
   use the data utilization tracking information, the validated authentication object, and the UEBA data as inputs to determine a data utilization risk score for the network packet.

2. The system of claim 1, wherein the computer system is further configured to execute software instructions stored on nontransitory machine-readable storage media that:
   obtain a plurality of data contracts;
   analyze the plurality of data contracts to identify commonalities and differences in the way data is organized, wherein the commonalities comprise identified key concepts and relationships;
   create a common vocabulary by mapping and aligning terms used in the plurality of data contracts based on the identified key concepts and relationships; and
   store the common vocabulary as an ontology.

3. The system of claim 2, wherein the ontology is industry-specific.

4. The system of claim 2, wherein one or more ontologies are used to identify the ontology associated with the payload of the network packet.

5. A method for data utilization tracking, comprising the steps of:
- capturing a network packet, the network packet comprising a payload;
- analyzing the network packet to identify an ontology associated with the payload;
- maintaining an authentication object database comprising a record of valid authentication objects issued by the network, each authentication object being associated with a user and an access session;
- validating the network packet by determining whether the network packet is associated with a valid authentication object from the authentication object database;
- when the network packet is associated with a valid authentication object from the authentication object database, adding a first metadata tag to the network packet, the first metadata tag comprising the associated valid authentication object;
- adding a second metadata tag to the network packet, the second metadata tag being associated with the identified ontology and indicating a semantic classification of the payload;
- obtaining data utilization tracking information by tracking the tagged network packet as the tagged network packet traverses the network;
- obtaining user entity and behavior analysis (UEBA) data associated with a specific user associated with the valid authentication object, wherein the UEBA data comprises behavioral risk indicators; and
- using the data utilization tracking information, the validated authentication object, and the UEBA data as inputs to determine a data utilization risk score for the network packet.

6. The method of claim 5, further comprising the steps of:
obtaining a plurality of data contracts;
analyzing the plurality of data contracts to identify commonalities and differences in the way data is organized, wherein the commonalities comprise identified key concepts and relationships;
creating a common vocabulary by mapping and aligning terms used in the plurality of data contracts based on the identified key concepts and relationships; and
storing the common vocabulary as an ontology.

7. The method of claim 6, wherein the ontology is industry-specific.

8. The method of claim 6, wherein one or more ontologies are used to identify the ontology associated with the payload of the network packet.

* * * * *